US012572913B2

(12) United States Patent
Jones

(10) Patent No.: US 12,572,913 B2
(45) Date of Patent: *Mar. 10, 2026

(54) RADIO TRANSMITTER DEVICE FOR USE IN METHOD AND SYSTEM FOR MONITORING, CONTROLLING AND OPTIMIZING FLOW OF PRODUCTS

(71) Applicant: KegSpeed, LLC, Austin, TX (US)

(72) Inventor: Timothy Leonard Jones, Austin, TX (US)

(73) Assignee: KegSpeed, LLC, Austin, TX (US)

( * ) Notice: Subject to any disclaimer, the term of this patent is extended or adjusted under 35 U.S.C. 154(b) by 78 days.

This patent is subject to a terminal disclaimer.

(21) Appl. No.: 18/369,466

(22) Filed: Sep. 18, 2023

(65) Prior Publication Data

US 2024/0086884 A1 Mar. 14, 2024

Related U.S. Application Data

(63) Continuation-in-part of application No. 17/468,309, filed on Sep. 7, 2021, now Pat. No. 11,763,281, which is a continuation-in-part of application No. 17/013,761, filed on Sep. 7, 2020, now Pat. No. 11,593,779, which is a continuation of application No. 16/601,512, filed on Oct. 14, 2019, now Pat. No.
(Continued)

(51) Int. Cl.
*G06Q 20/20* (2012.01)
*B67D 1/04* (2006.01)
(Continued)

(52) U.S. Cl.
CPC ........... *G06Q 20/20* (2013.01); *B67D 1/0412* (2013.01); *B67D 1/0801* (2013.01);
(Continued)

(58) Field of Classification Search
CPC ........... G06Q 20/20; G06Q 10/063114; G06Q 10/06313; G06Q 10/08; G06Q 10/083;
(Continued)

(56) References Cited

U.S. PATENT DOCUMENTS 5,237,496 A 8/1993 Kagami
5,533,648 A 7/1996 Read
(Continued)

FOREIGN PATENT DOCUMENTS

WO 2018236758 12/2010

OTHER PUBLICATIONS

International Search Report and Written Opinion dated Jan. 22, 2021 from corresponding International Application No. PCT/US2020/ 055439.
(Continued)

*Primary Examiner* — Tuyen K Vo
(74) *Attorney, Agent, or Firm* — Outlier Patent Attorneys, PLLC

(57) ABSTRACT

A liquid product distribution network includes a container distribution monitoring and reporting apparatus associated with a container. The apparatus includes a radio transmitter device and sensing circuitry for sensing and communicating physical properties associating with the container. The apparatus includes a battery power supply unit fitted within and protected by the top or bottom chime. The apparatus further includes a unique identifier associated with the sensing and reporting device. The apparatus further includes a mobile communications device is configured to identify the container based on the unique identifier associated with the sensing and reporting device embedded therein, and receive and process the radiofrequency signals from the radiofrequency signal transmission circuitry of the identified container passively and without user interaction, for monitoring the physical properties and location of the container.

32 Claims, 38 Drawing Sheets

Related U.S. Application Data 11,068,871, which is a continuation of application No. 16/140,525, filed on Sep. 24, 2018, now Pat. No. 10,444,052, which is a continuation-in-part of application No. 15/602,029, filed on May 22, 2017, now abandoned, and a continuation-in-part of application No. 15/602,024, filed on May 22, 2017, now Pat. No. 10,083,431, said application No. 17/013,761 is a continuation-in-part of application No. 29/604,979, filed on May 22, 2017, now Pat. No. Des. 830,327.

(60) Provisional application No. 62/897,367, filed on Sep. 8, 2019, provisional application No. 62/363,643, filed on Jul. 18, 2016, provisional application No. 62/339,513, filed on May 20, 2016.

(51) Int. Cl.

| | |
|---|---|
| *B67D 1/08* | (2006.01) |
| *B67D 1/12* | (2006.01) |
| *G01F 15/061* | (2022.01) |
| *G01F 22/02* | (2006.01) |
| *G01F 23/18* | (2006.01) |
| *G01F 23/263* | (2022.01) |
| *G05B 15/02* | (2006.01) |
| *G06Q 10/0631* | (2023.01) |
| *G06Q 10/08* | (2023.01) |
| *G06Q 10/083* | (2023.01) |
| *G06Q 10/0833* | (2023.01) |
| *G06Q 10/087* | (2023.01) |
| *G06Q 10/20* | (2023.01) |
| *G06Q 20/14* | (2012.01) |
| *G07F 13/02* | (2006.01) |
| *G07F 13/06* | (2006.01) |
| *H04B 1/04* | (2006.01) |
| *H04B 1/16* | (2006.01) |
| *H04L 67/10* | (2022.01) |
| *H04L 67/125* | (2022.01) |
| *H04L 67/52* | (2022.01) |
| *G06K 7/10* | (2006.01) |

(52) U.S. Cl.
CPC ......... *B67D 1/0848* (2013.01); *B67D 1/0871* (2013.01); *B67D 1/0872* (2013.01); *B67D 1/0888* (2013.01); *B67D 1/12* (2013.01); *G01F 15/061* (2013.01); *G01F 22/02* (2013.01); *G01F 23/18* (2013.01); *G01F 23/268* (2013.01); *G05B 15/02* (2013.01); *G06Q 10/063114* (2013.01); *G06Q 10/06313* (2013.01); *G06Q 10/08* (2013.01); *G06Q 10/083* (2013.01); *G06Q 10/0833* (2013.01); *G06Q 10/087* (2013.01); *G06Q 10/20* (2013.01); *G06Q 20/145* (2013.01); *G07F 13/025* (2013.01); *G07F 13/06* (2013.01); *G07F 13/065* (2013.01); *H04B 1/04* (2013.01); *H04B 1/16* (2013.01); *H04L 67/10* (2013.01); *H04L 67/125* (2013.01); *H04L 67/52* (2022.05); *B67D 2001/0811* (2013.01); *B67D 2001/0822* (2013.01); *G06K 7/10861* (2013.01)

(58) Field of Classification Search
CPC .. G06Q 10/0833; G06Q 10/087; G06Q 10/20; G06Q 20/145; G06Q 10/0631; G06Q 10/06315; G06Q 20/14; G06Q 30/0201; G06Q 30/0202; G06Q 30/0251; G06Q 30/04; G06Q 30/0639; G06Q 30/0641; G06Q 50/12; B67D 1/0412; B67D 1/0801; B67D 1/0848; B67D 1/0871; B67D 1/0872; B67D 1/0888; B67D 1/12; B67D 2001/0811; B67D 2001/0822; B67D 1/1405; B67D 2210/00091; B67D 2001/1488; B67D 2210/00089; G01F 15/061; G01F 22/02; G01F 23/18; G01F 23/268; G01F 15/063; G01F 22/00; G01F 23/2965; G01F 23/2968; G01F 23/20; G01F 23/804; G05B 15/02; G07F 13/025; G07F 13/06; G07F 13/065; G07F 13/02; H04B 1/04; H04B 1/16; H04L 67/10; H04L 67/125; H04L 67/52; H04L 67/12; G06K 7/10861

See application file for complete search history.

(56) References Cited

U.S. PATENT DOCUMENTS

| | | | |
|---|---|---|---|
| 5,615,109 | A | 3/1997 | Eder |
| 5,712,985 | A | 1/1998 | Lee |
| 5,819,232 | A | 10/1998 | Shipman |
| 5,915,602 | A | 6/1999 | Nelson |
| 5,953,707 | A | 9/1999 | Huang |
| 5,988,859 | A | 11/1999 | Kirk |
| 6,580,357 | B1 | 6/2003 | Forster |
| 6,609,101 | B1 | 8/2003 | Landvater |
| 6,801,908 | B1 | 10/2004 | Fuloria |
| 6,976,001 | B1 | 12/2005 | Levanoni |
| 7,092,929 | B1 | 8/2006 | Dvorak |
| 7,280,882 | B1 | 10/2007 | Daoud |
| 8,610,536 | B2 | 12/2013 | Libby |
| 8,789,763 | B2 | 7/2014 | Hehlgans |
| 9,162,863 | B2 | 10/2015 | Till |
| 9,617,140 | B2 | 4/2017 | Hershberger |
| 10,083,431 | B2 | 9/2018 | Jones |
| D830,327 | S | 10/2018 | Jones |
| 10,087,063 | B2 | 10/2018 | Zimmerman |
| 10,444,052 | B2 | 10/2019 | Jones |
| 10,578,475 | B2 | 3/2020 | Flockenhaus |
| 10,648,843 | B2 | 5/2020 | Toner |
| 10,796,553 | B2 | 10/2020 | Carson |
| 2002/0049622 | A1 | 4/2002 | Lettich |
| 2002/0072956 | A1 | 6/2002 | Willems |
| 2002/0178077 | A1 | 11/2002 | Katz |
| 2003/0033179 | A1 | 2/2003 | Katz |
| 2003/0229550 | A1 | 12/2003 | DiPrima |
| 2004/0045623 | A1 | 3/2004 | Parker, III |
| 2004/0064350 | A1 | 4/2004 | Hanazato |
| 2005/0240466 | A1 | 10/2005 | Duggirala |
| 2006/0157148 | A1 | 7/2006 | Hillam |
| 2006/0201432 | A1 | 9/2006 | Pratt |
| 2007/0087756 | A1 | 4/2007 | Hoffberg |
| 2007/0292559 | A1 | 12/2007 | Garwood |
| 2008/0294488 | A1 | 11/2008 | Gupta |
| 2009/0271241 | A1 | 10/2009 | Pratt |
| 2012/0059513 | A1 | 3/2012 | Perkins et al. |
| 2013/0314244 | A1 | 11/2013 | Hershberger |
| 2015/0368086 | A1 | 12/2015 | Sacchetti |
| 2016/0264394 | A1 | 9/2016 | Hershberger |
| 2017/0109689 | A1 | 4/2017 | Lorkowski |
| 2017/0184443 | A1 | 6/2017 | Hershberger |
| 2017/0210610 | A1 | 7/2017 | Henson |
| 2019/0025108 | A1 | 1/2019 | Jones |
| 2019/0292037 | A1 | 9/2019 | Nicol |
| 2020/0056919 | A1 | 2/2020 | Jones |

OTHER PUBLICATIONS

International Search Report and Written Opinion dated Dec. 6, 2022 from corresponding International Application No. PCT/US2021/049303.

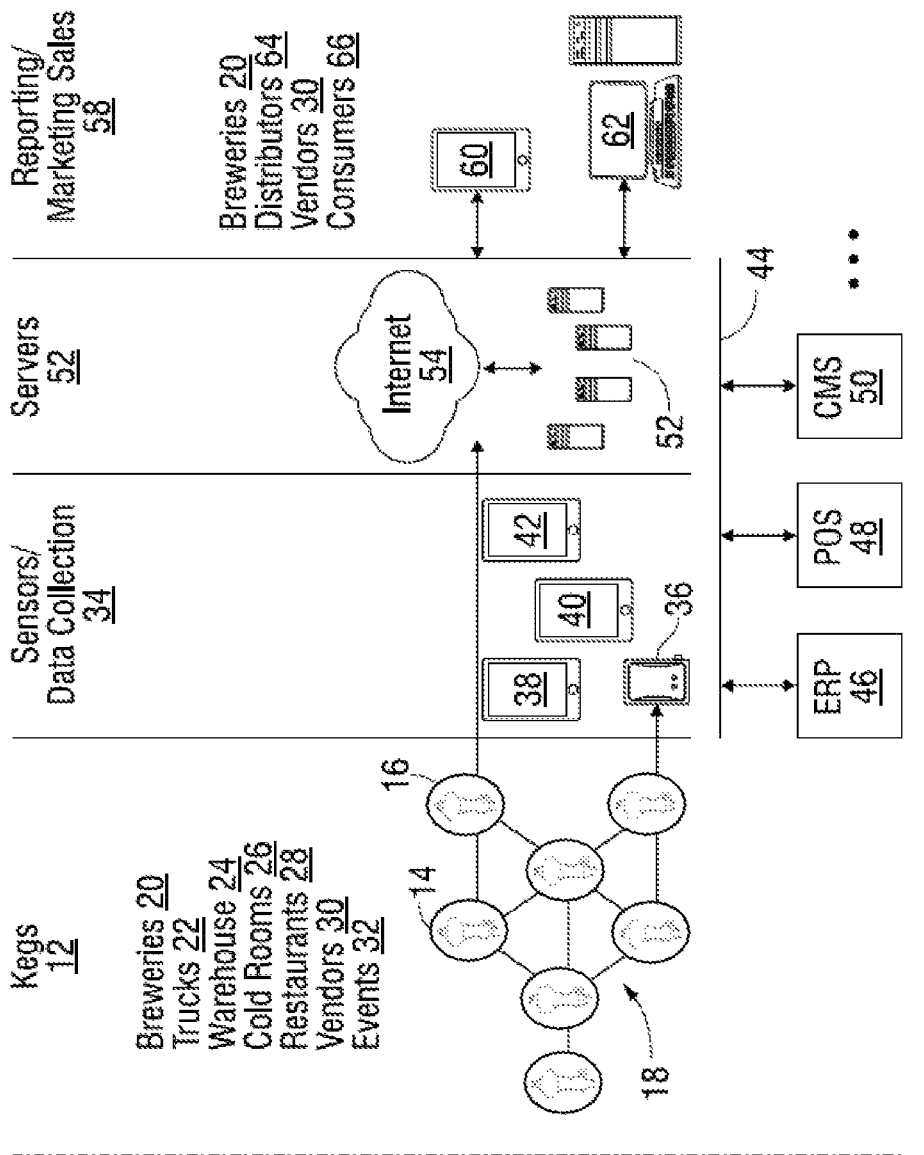
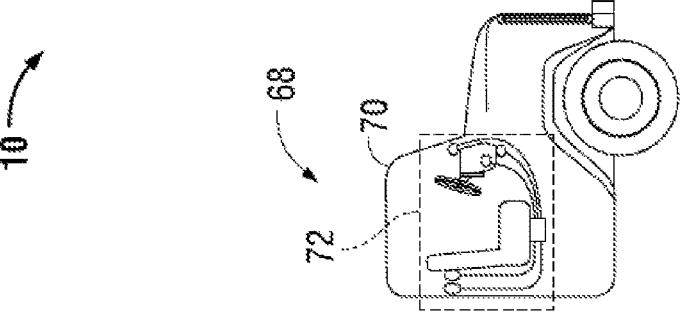
FIG. 1

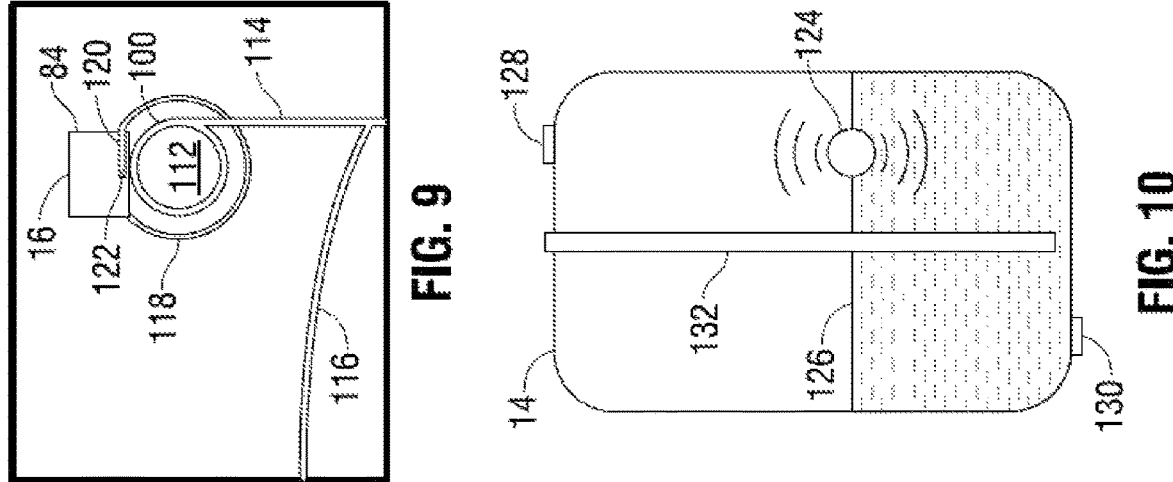
FIG. 9
FIG. 10
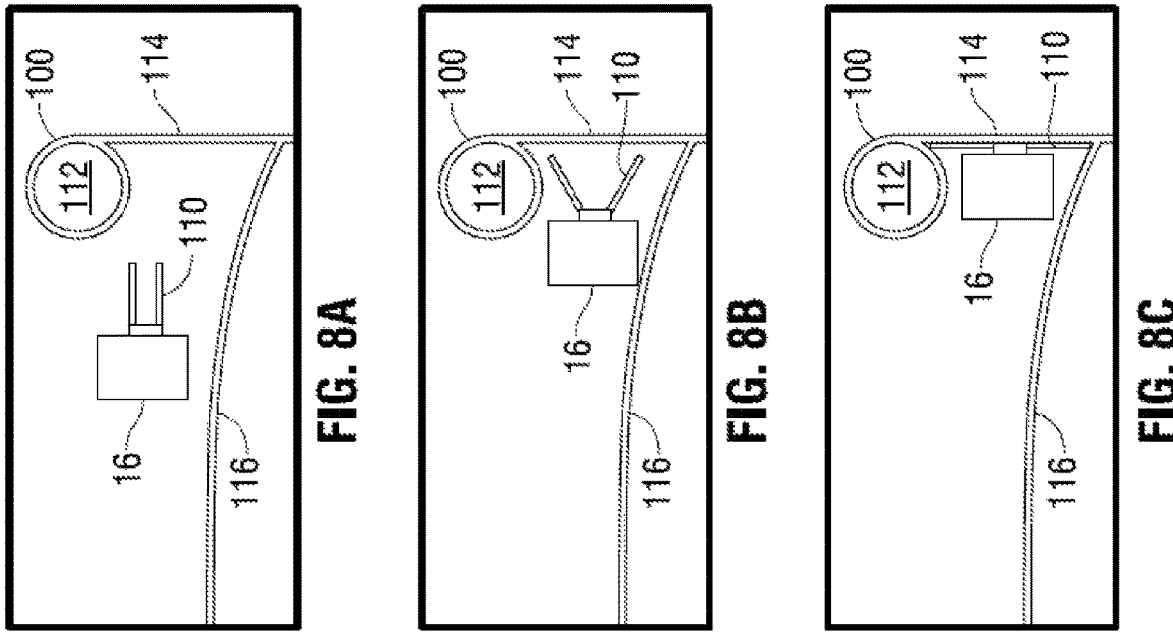
FIG. 8A
FIG. 8B
FIG. 8C

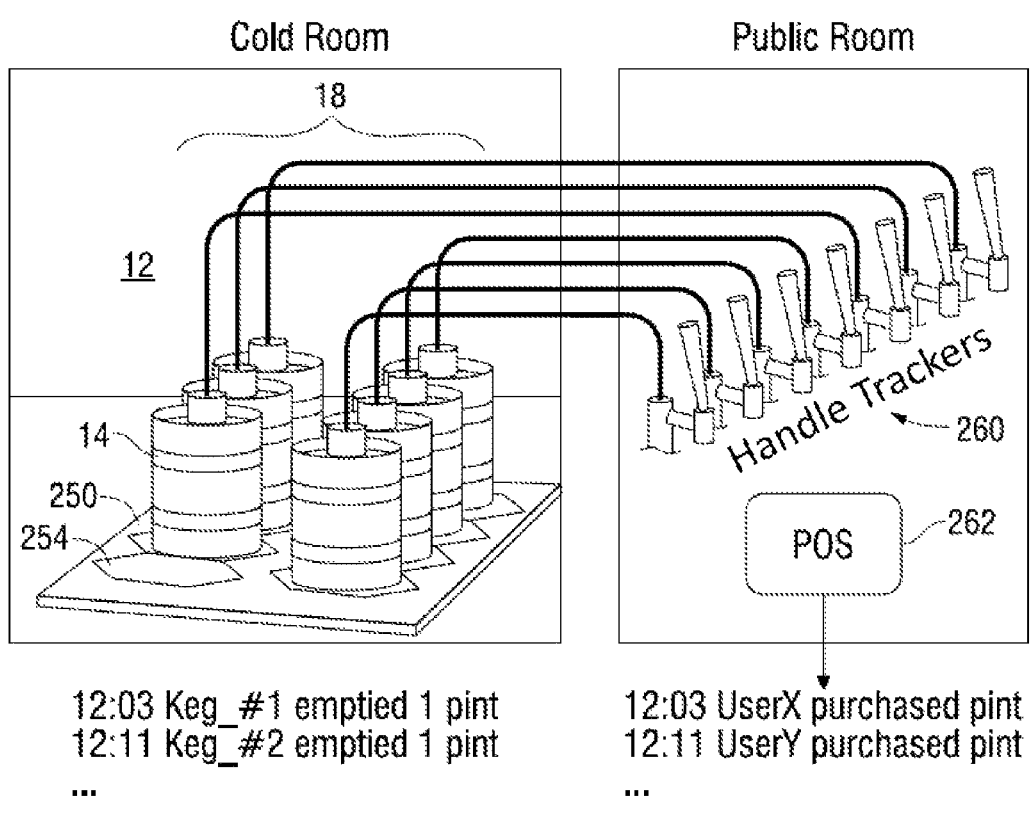
Cold Room        Public Room
12:03 Keg_#1 emptied 1 pint        12:03 UserX purchased pint
12:11 Keg_#2 emptied 1 pint        12:11 UserY purchased pint
...        ...
FIG. 17
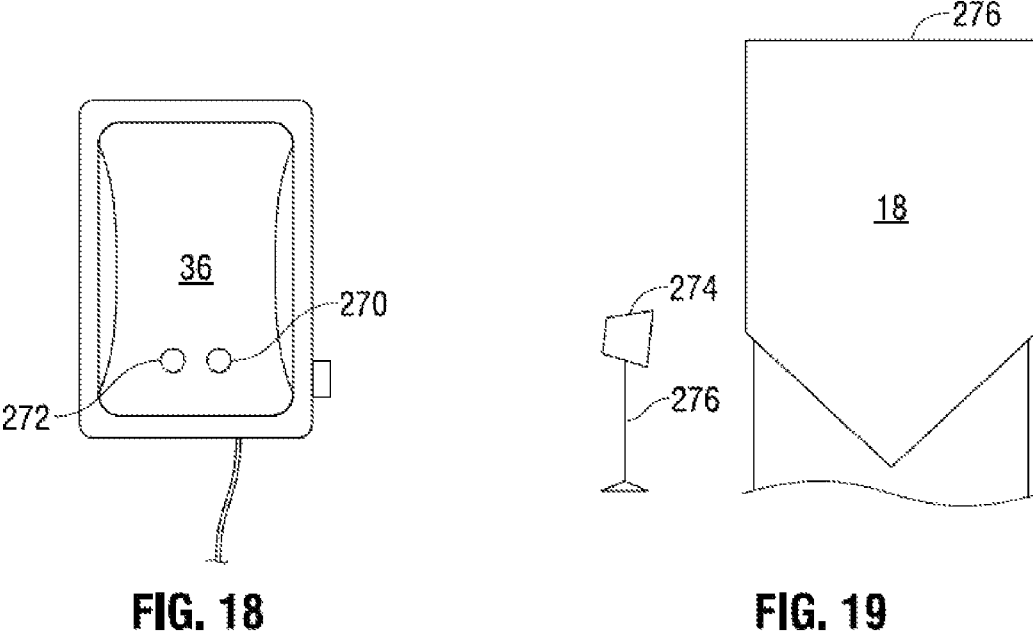
FIG. 18        FIG. 19

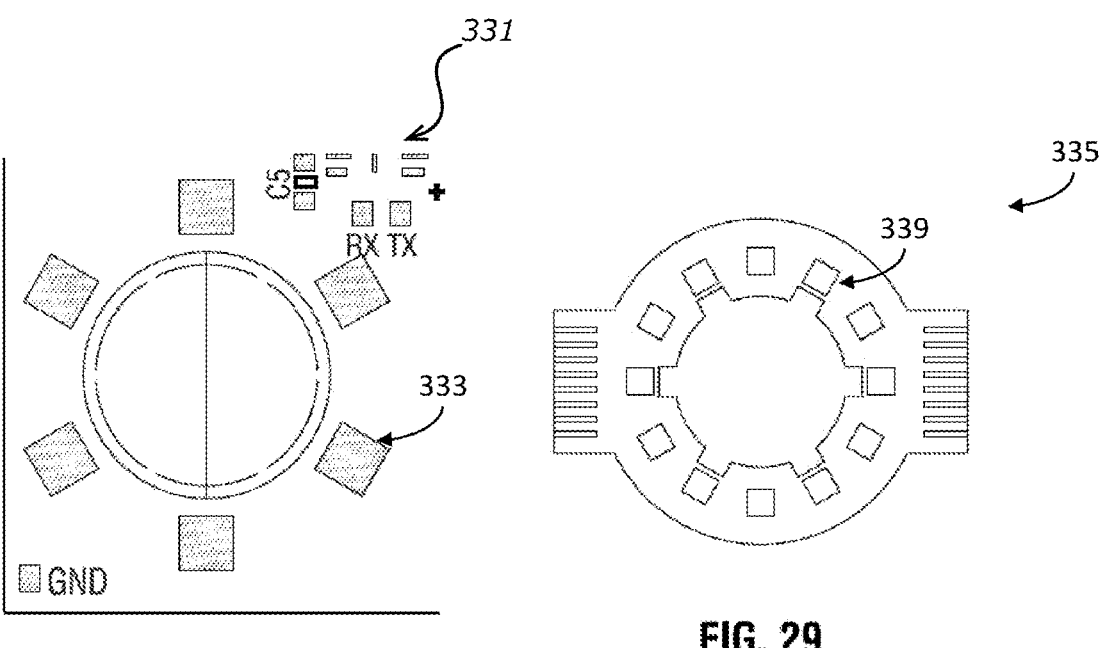
FIG. 28
FIG. 29
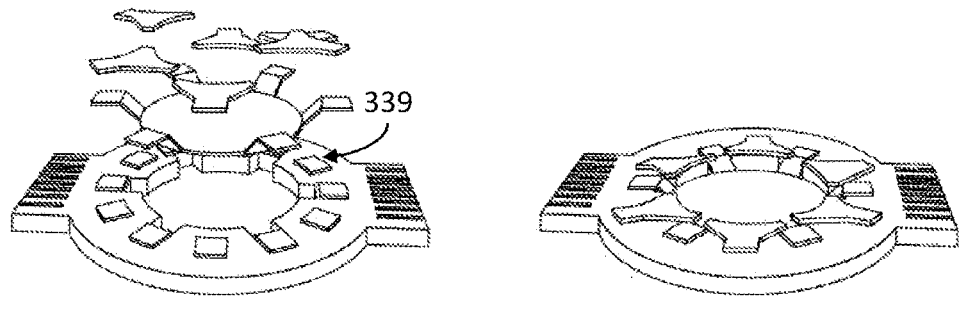
FIG. 30A                    FIG. 30B

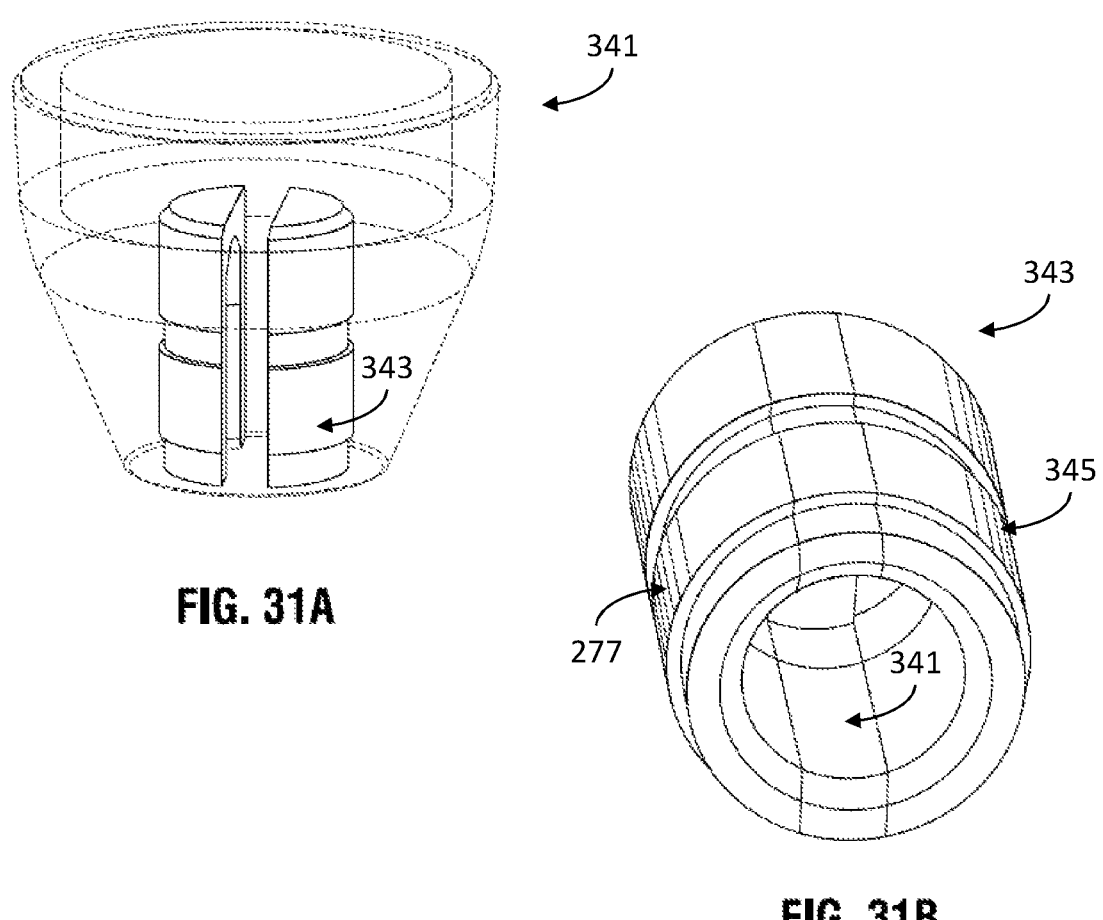
FIG. 31A
FIG. 31B
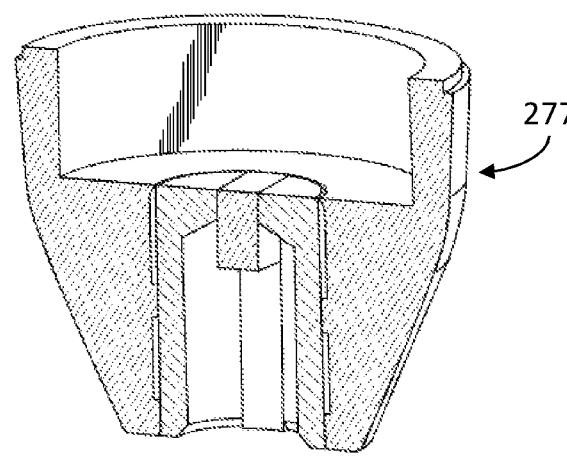
FIG. 31C

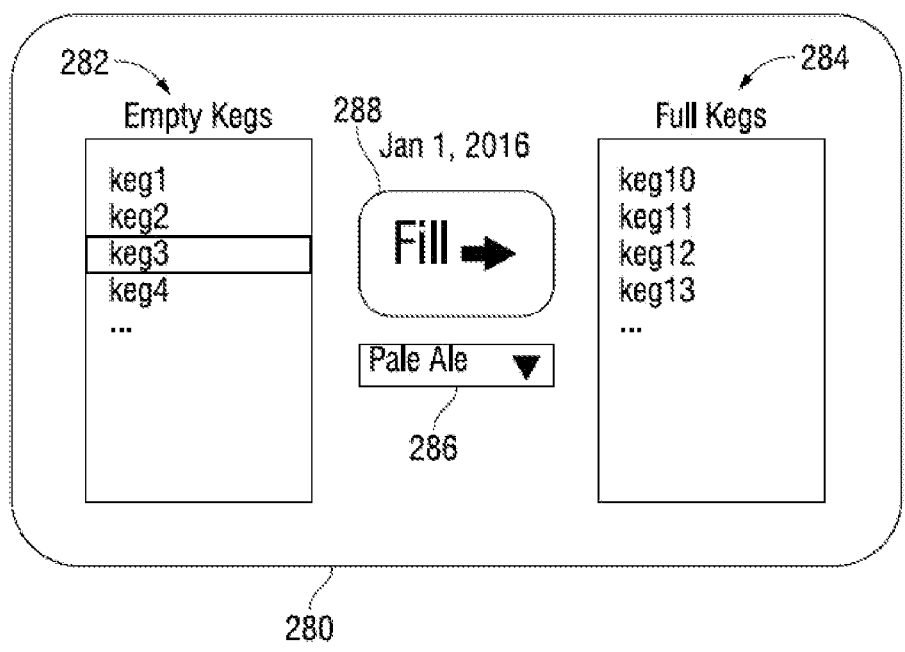
FIG. 37
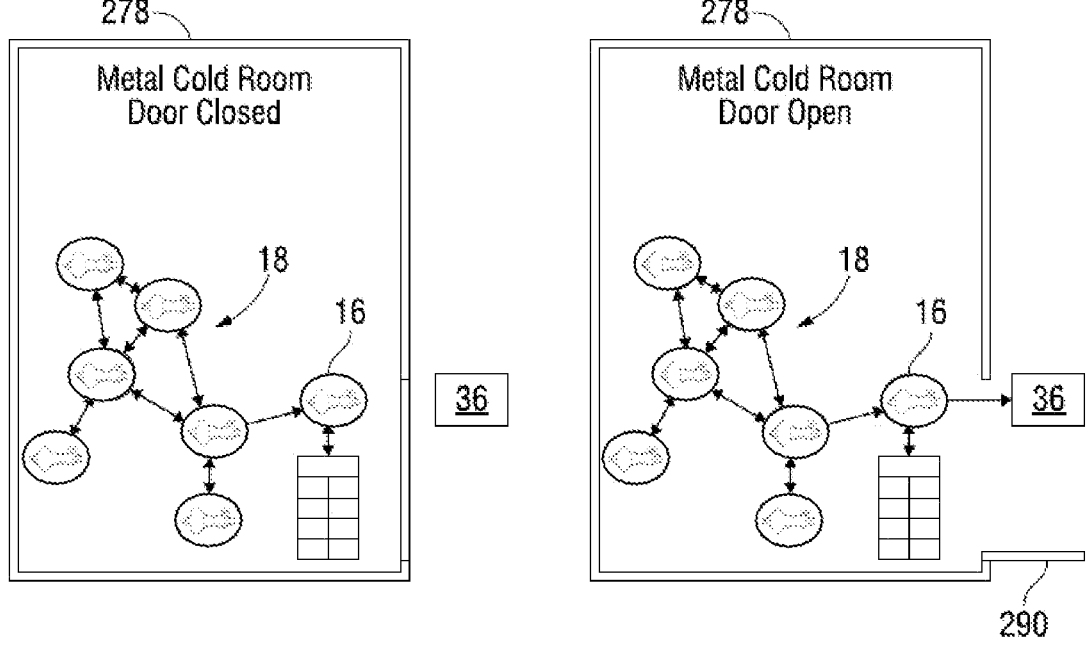
FIG. 38A            FIG. 38B

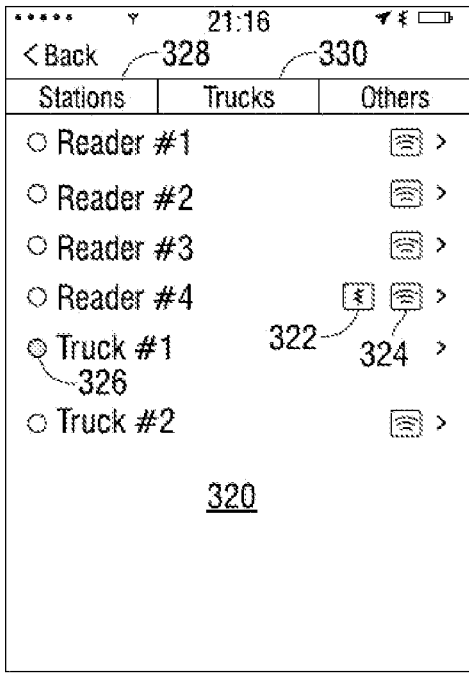
FIG. 43
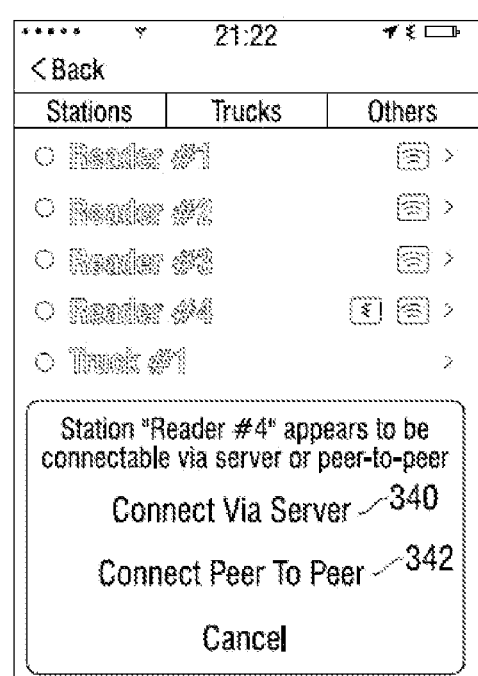
FIG. 44
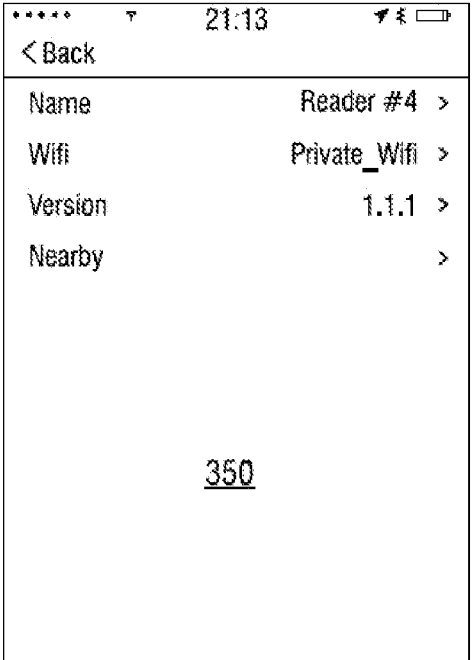
FIG. 45
FIG. 46

Reports: Inventory By Location

| Location | Full | Empty | 1-15 N Glebe Rd | Keg | Time Stamp | State | Client |
|---|---|---|---|---|---|---|---|
| 1-15 N Glebe Rd | 0 | 1 | Keg #008  1/6B  Swing Black (empty) | Keg #008 | 11/28/2016 10:00:40 EDT | Full At Brewery | iPhone #1 |
| 1012 King St | 1 | 0 | | Keg #008 | 11/28/2016 10:00:53 EDT | Full At Brewery | iPhone #1 |
| 1101 11th St NW | 1 | 0 | | Keg #008 | 12/07/2016 11:14:40 EDT | Empty At Brewery | Station #1 |
| 609 14th St NW | 1 | 1 | | Keg #008 | 01/13/2017 13:00:38 EDT | Empty At Brewery | iPhone #1 |
| 671 N Glebe Rd | 1 | 0 | | Keg #008 | 02/02/2017 14:00:41 EDT | Full At Brewery | iPhone #1 |
| 7310 Gambrill Rd | 7 | 41 | | Keg #008 | 02/03/2017 10:51:36 EDT | At Customer | iPhone #1 |
| 8195 Ship Ln | 10 | 5 | | Keg #008 | 02/03/2017 11:00:14 EDT | Full At Brewery | iPhone #1 |
| Cold Pressed | 4 | 2 | | Keg #008 | 02/03/2017 11:00:32 EDT | Full At Brewery | iPhone #1 |
| Mezcaleria #6 | 3 | 0 | | Keg #008 | 02/03/2017 11:00:39 EDT | Full At Brewery | iPhone #1 |
| Stadium | 0 | 4 | | Keg #008 | 02/03/2017 11:13:11 EDT | On Tap At Customer | iPhone #1 |
| County Pkwy | 0 | 1 | | Keg #008 | 02/03/2017 12:03:11 EDT | At Customer | iPhone #1 |
| Brew Works | 6 | 5 | | Keg #008 | 02/03/2017 12:03:38 EDT | Empty At Customer | iPhone #1 |
| I-95 N | 2 | 0 | | Keg #008 | 02/24/2017 11:58:03 EDT | On Tap At Customer | iPhone #1 |
| Keg Storage | 15 | 11 | | Keg #008 | 02/24/2017 16:31:24 EDT | Empty At Brewery | Station #2 |
| Main Line Blvd | 0 | 1 | | Keg #008 | 03/03/2017 10:52:09 EDT | Full At Brewery | iPhone #2 |
| Naval Station | 1 | 0 | | Keg #008 | 03/03/2017 13:27:49 EDT | At Customer | iPhone #2 |
| Point 44 | 0 | 2 | | Keg #008 | 03/17/2017 13:34:07 EDT | On Tap At Customer | iPhone #2 |
| Terminal Rd | 7 | 5 | | | | | |
| Thai Cafe | 1 | 2 | | | | | |
| Convention Center | 2 | 0 | | | | | |

Turns Report

| Started | Keg Id | Product | Days Full Brewery | Days Full Distributor | Days At Customer | Days Empty Distributor | Returned | Total Days |
|---|---|---|---|---|---|---|---|---|
| 12/31/2014 | Keg #38 | 1/48 | 0 | 30 | 6 | | 02/04/2015 | 36 |
| 12/31/2014 | Keg #33 | 1/48 | 0 | 30 | 6 | | 02/04/2015 | 36 |
| 12/31/2014 | Keg #23 | 1/48 | 0 | 65 | 1 | 0 | 02/04/2015 | 67 |
| 08/01/2015 | Keg #01 | 1/48 | 2 | 26 | 26 | 3 | 09/21/2015 | 58 |
| 08/03/2015 | Keg #15 | 1/48 | 2 | 18 | 53 | 7 | 10/15/2015 | 77 |
| 08/03/2015 | Keg #19 | 1/48 | 2 | 20 | 84 | 7 | 11/30/2015 | 118 |
| 08/03/2015 | Keg #07 | 1/48 | 2 | 26 | 72 | 7 | 02/16/2016 | 107 |

FIG. 51B

Inventory Report by Keg

| Keg | Location | Product | Days Full Brewery | Days Full Distributor | Days At Customer | Days Empty Distributor |
|---|---|---|---|---|---|---|
| Keg #01 | Distributing | 1/48 | 2 | 26 | 96 | |
| Keg #02 | Brewery | 1/48 | 20 | 12 | 66 | |
| Keg #03 | Customer | 1/48 | 2 | 41 | 191 | |
| Keg #04 | Distributing | 1/48 | | | | |
| Keg #05 | Distibutor | 1/48 | 127 | | 105 | 53 |

FIG. 51C

Daily Changes

| | | | |
|---|---|---|---|
| 03/25/2016 | 6:03 AM EST | Keg #31 | Delivered Full to Distributor |
| 03/24/2016 | 8:30 AM EST | Keg #12 | Delivered Full to Distributor |
| | 8:25 AM EST | Keg #21 | Delivered Full to Distributor |
| | 8:10 AM EST | Keg #25 | Delivered Full to Distributor |
| | 8:10 AM EST | Keg #09 | Delivered Full to Distributor |

FIG. 51D

| Invoice |
|---|
| 420 |

| Inventory 422 |
|---|
| Nearby ⌐424 ⌐426 ⌐428 |
| QB#3-005  6'  Pale Ale |
| Also Detected |
| HB#3-001  9'  Empty |
| HB#3-003  27'  Empty |
| HB#3-006  24'  Empty |
| QB#3-002  8'  Pale Ale |
| QB#3-004  12'  Empty |
| QB#3-007  15'  Pale Ale |
| QB#3-008  18'  Empty |

706

504A

705

502

504B

500

504A

708

502

504B

902

904

904

906

504A

502

504B

1306

1302

1304

1302

500

1316

1306

1312

1314

1410

1414

RADIO TRANSMITTER DEVICE FOR USE IN METHOD AND SYSTEM FOR MONITORING, CONTROLLING AND OPTIMIZING FLOW OF PRODUCTS

CROSS REFERENCE TO RELATED APPLICATIONS

This application claims benefit to the following provisional and non-provisional applications, all of which are here expressly incorporated herein by reference:

U.S. Non-Provisional patent application Ser. No. 15/602,024 entitled "METHOD AND SYSTEM FOR MONITORING, CONTROLLING AND OPTIMIZING FLOW OF PRODUCTS DELIVERED TO CUSTOMERS VIA CONTAINERS THAT FLOW IN A DISTRIBUTION NETWORK,", filed on May 22, 2017;

U.S. Non-Provisional patent application Ser. No. 15/602,029 entitled "DISTRIBUTION NETWORK FOR MONITORING, CONTROLLING AND OPTIMIZING FLOW OF LIQUID BEVERAGE PRODUCTS DELIVERED TO CUSTOMERS VIA CONTAINERS," filed on May 22, 2017;

U.S. Design patent application No. 29/604,979 entitled "COLLAR RADIO TRANSMITTER," filed on Jul. 16, 2016;

U.S. Non-Provisional patent application Ser. No. 16/140,525 entitled "RADIO TRANSMITTER DEVICE FOR USE IN METHOD AND SYSTEM FOR MONITORING CONTROLLING AND OPTIMIZING FLOW OF PRODUCTS," filed on Sep. 24, 2018;

U.S. Non-Provisional patent application Ser. No. 16/601,152 entitled "RADIO TRANSMITTER DEVICE FOR USE IN METHOD AND SYSTEM FOR MONITORING, CONTROLLING AND OPTIMIZING FLOW OF PRODUCTS," filed on Oct. 14, 2019;

U.S. Provisional Patent Application No. 62/897,367 entitled "LIQUID CONTAINER TRACKING DEVICE, SYSTEM AND METHOD," filed on Sep. 8, 2019;

U.S. Non-Provisional application Ser. No. 17/013,761 entitled "RADIO TRANSMITTER DEVICE FOR USE IN METHOD AND SYSTEM FOR MONITORING, CONTROLLING AND OPTIMIZING FLOW OF PRODUCTS," filed on Sep. 7, 2020; and U.S. Non-Provisional application Ser. No. 17/468,309 entitled RADIO TRANSMITTER DEVICE FOR USE IN METHOD AND SYSTEM FOR MONITORING, CONTROLLING AND OPTIMIZING FLOW OF PRODUCTS," filed on Sep. 7, 2021.

Further, expressly incorporated by reference in their entirety as if actually written here: Provisional Application 62/339,513 filed May 20, 2016, Provisional Application 62/363,643 filed Jul. 18, 2016, Provisional Application 62/551,779 filed Aug. 29, 2017, Provisional Application 62/664,315 filed Apr. 30, 2018, Utility application Ser. No. 15/602,024 filed May 22, 2017, Design application 29604979 filed May 22, 2017, Utility application Ser. No. 15/602,029 filed May 22, 2017 and Utility application Ser. No. 16/140,525 filed Sep. 24, 2018.

FIELD OF THE INVENTION

The present disclosure relates generally to monitoring, controlling and/or optimizing flow of products delivered to customers via containers that flow in a distribution network. Alternatively, disclosed subject matter includes a radio transmitter and methods of operation for monitoring, controlling and/or optimizing use of equipment and/or resources that are spread out in a geographic area, move between or among locations, and have usage, contents, or other associated state information. Moreover, the disclosed subject matter includes a container distribution monitoring and reporting apparatus associated with a container adapted for containing liquid product for distribution in a liquid product distribution network. In this disclosure, example liquids are beverages, such as beer; fuels such as gasoline or liquid propane; or other gasses shipped in liquid form such as carbon dioxide, oxygen, etc.

BACKGROUND

The beer industry in the United States and other countries involves a number of participants performing specific roles from brewing the beer, to distributing the beer, to vending the beer to consumers who finally drink and enjoy the beer in its many forms. While the United States has legal requirements for maintaining a three-tier system requiring all beer to pass through a distributor or wholesaler, for many reasons a three-tiered system is the most popular way of operating the beer industry in most other countries, as well. The distributor does the on-the-ground sales and marketing for the producer, and the distributors sell the beer to vendors who ultimately serve the beer consumer. Distributors also maintain refrigerated warehouses to store the beer, and fleets of trucks to ship the beer to ultimate destinations. The distributor also makes sure the retailers are always carrying fresh beer. In some states breweries are allowed to self-distribute, in which case the brewery takes on both production and distributing functions.

Of course, beer is sold to consumers in two primary ways, in bottles and through kegs. Beer kegs have a main body, and top and bottom chimes. Beer keg bodies are made of stainless steel, or less commonly, of aluminum. The chimes may be metal, rubber, or a plastic such as polyurethane. A keg has a single opening on one end, called a "bung." A tube called a "spear" extends from the opening to the other end. Most major breweries now use internally speared kegs. There is a self-closing valve that is opened by the coupling fitting which is attached when the keg is tapped. There is also an opening at the top of the spear that allows gas (usually carbon dioxide) to drive the beer out of the keg. The coupling fitting has one or two valves that control the flow of beer out of and gas into the keg. The keg must be in the upright position, that is, with the opening on top for the beer to be dispensed. A line is attached to the valve on the keg, and the line runs to a faucet with a tap handle where the beer is dispensed to customers.

Kegs are typically the second biggest asset a brewery has (the first is their production facility) and the asset is not under their control. The industry average keg loss is 4%-5% per year and usually owners do not know where and when they are losing them. Keg deposits are only $30-$50, while the cost of the keg is $100-$150. The deposit does not cover the cost of the keg. Correlating deposits between deliverer and recipient requires manual counting and is error prone. In order to track location of kegs, it is necessary to manually scan them at each location.

Kegs are often stolen or misplaced by vendors. So, when breweries need empty kegs, the required kegs are not available, because they have not yet been returned. Without visibility into where the kegs are and when they will return, it is difficult to predict and plan for needs.

Keg maintenance schedules also are very important to maintain product quality. But without knowing the exact history of each keg, it is impossible to determine specific schedules. Without good measurements, a brewery has little ability to optimize usage of their kegs. Keeping track of which kegs need to be serviced based upon number of uses in the field requires manual counting and is error prone. Keeping track of which kegs need which type of cleaning based upon number of uses also requires manual counting and is error prone.

When kegs are returned, it is necessary to manually scan them to determine batch number, beer type, dates, etc. When scanning individual kegs, as they go in and out of a warehouse, one mistake can make inventory inaccurate. Correlating keg serial numbers with deliveries requires manual labor and is error prone.

Keeping track of keg inventories in cold rooms, trucks, and warehouses requires manual counting and is error prone. Using cardboard labels to determine keg contents, fill dates, etc.—a usual practice—is error prone, because such labels frequently come off. A result is that a retail outlet may inadvertently run out of a particular style of beer.

Beer ages and some beers are better fresh and some are better aged. Unpasteurized beer must be kept below certain temperature thresholds to prevent spoilage. So, being sensitive to such product needs is an ongoing challenge for distributors and vendors, as errors here can affect a consumer's acceptance of a brewer's product.

The distributor's delivery truck is also a critical part of the beer industry, yet a place where human limitations and incomplete information can cause many problems. Inside a truck, it is difficult/impossible to tell exactly which kegs are in the truck. It is hard to manage a fleet of drivers, monitoring compliance, doing real-time route changes, etc. It is difficult to keep track of which kegs are in a truck from day-to-day and as the truck drives in delivers and pick-ups. Drivers may also try to disable tracking to hide unscheduled stops. It is difficult to capture mileage and speed data from a truck. It is hard to train new drivers on a route, and hard for drivers to learn the nuances of their consumers' requirements.

One way to solve these problems might be to use GPS tracking devices on the beer kegs. But, tracking devices are often removed by a person stealing a keg. Most GPS tracking equipment costs nominally $100, because it includes a cell radio, GPS radio, etc. GPS tracking equipment also is bulky and requires power to operate. Most GPS tracking equipment requires a cell data plan to communicate back to the owner. This monthly fee is prohibitive for a beer keg. This cost and the related complications make GPS trackers prohibitive for a beer keg.

Although a brewery/distributor sells a keg to a vendor (i.e., restaurant, bar, etc.) it does not mean the keg goes on tap (i.e., pints of it offered for sale). So, the brewery/distributor does not know if the vendor needs a new keg or not. It is necessary, therefore, for the brewery and distributor to visit the vendor account to check if a given keg is on tap. A brewery and distributor also wants to know if a keg is "full at restaurant," "empty at distributor" and other logical states and transitions. Gathering this information can be very time consuming and difficult, requiring several trips just to maintain the information.

Once a keg reaches a vendor, it is hard to determine when a line in the tap room might run out due to a keg in the cold room. A vendor would like to know how many servings they can sell, but POS tracking of keg levels is inaccurate due to variances in how the beer is served and when and how a keg is changed out. Flow meters which measure how much liquid is taken out of a keg (and thereby how full the keg is)

must be installed (1) in the line between the keg and the handle in the bar; or (2) inside the valve which is attached to the keg; or (3) inside the valve in the handle. Again, there is the problem of correlating keg changes with the flow meter measurements. Measuring the liquid level inside a container often requires breaching the container. Solutions for weighing the keg to determine how full it is also may require each keg to be weighed individually, and the scale may interfere with shelving and need to be transitioned between kegs. All of this unduly complicates the use of kegs and experience that vendors and consumers enjoy in the use of kegs.

There is also opportunity for improving the relationships between the brewery and the consumer. In the marketplace, it is difficult to determine marketing effectiveness for a specific beer. Consumers desire to engage with the beers they like. Consumers would like to know when their favorite beer is available nearby. When a favorite beer is not available, consumers would like to know recommendations of something else to try. When travelling, it is hard for a consumer to find a place and something they would like Breweries would like to gain the attention of new consumers. It is difficult to blindly determine a consumer's drinking preferences (i.e., type of beer). A vendor's point-of-sale terminal will often not distinguish which beer was sold. Consumers may want to engage a specific style of beer. Consumers also would like to know when promotions occur.

Considering the above factors, today's beer industry calls for significant improvement in the supply chain involving breweries, distributors, vendors, and consumers. There is the need to greatly improve the use and monitoring of beer kegs throughout the beer supply chain for both industry profitability and consumer protection and enjoyment. However, until the present disclosure, no such improvements have been effective in satisfactorily addressing these concerns and opportunities.

In many applications is it currently not possible or economically feasible to provide a fill level measuring device on a transportable fluid container, where remote determination of the fluid level inside the container from a third location is desired. This capability can be desired for a variety of reasons such as preventing supply from running out, optimizing delivery and distribution schedules and/or stock levels, analyzing fluid use over time, adhering to product freshness requirements, etc.

Due to pressure requirements, temperature requirements, or fluid content requirements, many transportable fluid containers are made from metal. Metal prevents radio and visible light detection systems from determining fluid level from outside the container. Thus, most fluid measurement systems for metal vessels require either penetrating the container (ultrasonic reflections, floats), are weight based (measuring weight of container), or flow based (measuring how much content has left the container). Each of these solutions has limitations.

Systems which penetrate the container are expensive to implement on existing containers. Also, some fluid containers (such as beer kegs) have strict cleaning requirements that any system inside the container must adhere to. When the contents are flammable (for example, propane) it is difficult to safely introduce electrical circuits inside the container. Systems which exist inside the container must survive in all the temperature extremes required of the container and its contents. Beer kegs require steam sanitization. Propane tanks require extreme cold as the liquid evaporates. These requirements make measurement systems that exist inside the container difficult to implement and expensive.

Systems which require ultrasonically measuring the location of the liquid/air boundary inside the container usually require a smooth boundary surface (not usually the case in a beer container), or close alignment of the transmitter and receiver to detect the bounce.

Alternatively, a container can adopt a weighing system on the outside of the main vessel. These types of systems are expensive and require modification of the containment vessel, since the measurement device must support the full weight of the vessel and its contents. Reliable operation of such devices on a variety of surfaces—from uneven floors to open wire shelves—is difficult to achieve. These types of fluid measuring systems are difficult to implement, heavy and expensive.

Flow based systems measure fluid as it leaves the vessel. If such a system is integrated into the container, it suffers the same difficulties listed above as any measurement system that penetrates the container. If such a system is on the outside of the container, established distribution methods, such as standardized couplings and sizes of containers, make modifying the container impractical. To achieve compatibility with existing fluid dispensing systems any such flow measuring device should not change the size, shape or required coupling of the container. In addition, the device should not be easily detached from the container. These requirements make flow based measurement devices impractical for use on a mobile container.

Flow based measurement systems are primarily used in the lines which are connected to a fluid container. When used this way, the flow based measuring device has difficulty distinguishing between full and partially full containers. These types of measurement devices have the limitation of not knowing which container they are attached to. Only measuring the amount of fluid that goes through the line may not give an accurate determination of container fill level, because it is not known how full the container was initially, how much of the flow to attribute to a one container vs another one. Beer kegs, in particular, can be connected and disconnected frequently (for example, for regular line cleaning) while the keg is still being drained, making keeping track of when a new container is attached to a line difficult.

Dispensing systems which maintain constant container pressure (such as beer keg dispensing systems) do not provide a means to directly measure fluid volume using pressure. Beer kegs are highly sensitive to bacterial contamination and any measurement system which is in contact with the fluid must be easy to sanitize and maintain. Flammable contents, such as propane tanks, make electrical connections inside a containment vessel difficult to safely achieve. Heat requirements (for example, steam sanitation) prevent many common fill level detection mechanisms that rely upon being inside the container.

Established distribution methods, such as standardized couplings and sizes of containers, make adding a fluid transfer measuring device to the container impractical if it would change the size, shape or required coupling of the container. Fluid measurement devices which are in line with the container coupling instead of attached to the container itself are unreliable. These types of measurement devices have the limitation of not knowing which container they are attached to. Only measuring the amount of fluid that goes through the line may not give an accurate determination of container fill level, because it is not known how full the container was initially, how much of the flow to attribute to a one container vs another one.

Many fluid measurement systems for pressurized containers are economically unviable in relationship to the value of the container and/or its contents. When containers are rotated frequently (beer kegs, consumer propane tanks) the supplier must consider the cost of loss or damage to the container. Measurement of fluid level is most valuable when it can be done remotely, without requiring ready access to the container. In addition to fluid level, remote identification of the given container and its particular contents is also valuable.

SUMMARY OF THE DISCLOSURE

Considering the above problems with the beer industry at each level of brewery, distributor, vendor and consumer, the present disclosure provides numerous innovations, improvements, and inventions relating to monitoring, controlling and/or optimizing flow of products delivered to consumers via containers that flow in a distribution network. The disclosed subject matter includes method and system for monitoring, controlling and/or optimizing use of equipment and/or resources that are spread out in a geographic area, move between or among locations, and have usage, contents, or other associated state information.

According to one aspect of the present disclosure a liquid product distribution network monitoring and reporting system includes a keg distribution monitoring and reporting apparatus for operation in association with a tap handle flow monitoring and reporting apparatus. The keg distribution monitoring and reporting apparatus include a radio transmitter device comprising a low-energy consumption radio/processing module. Sensing circuitry associates with the radio transmitter device for sensing and communicating to the radio/processing module physical properties associating with the keg. Radiofrequency signal transmission circuitry associates with the radio/processing module for transmitting radiofrequency signals without the use of geographic position or cell radio circuitry.

The tap handle flow monitoring and reporting apparatus includes circuitry for sensing flow of a liquid through a tap positioned to dispense a liquid from the keg. The tap handle flow monitoring and reporting apparatus includes a tap handle radio transmitter device for fitting within and being protected by a tap handle and comprising a low-energy consumption tap handle radio/processing module. The tap handle sensing circuitry associates with the tap handle radio transmitter device for sensing and communicating to the tap handle radio/processing module physical properties associating with liquid dispensed from the keg.

Tap handle radiofrequency signal transmission circuitry associates with the tap handle radio/processing module for transmitting radiofrequency signals from the tap handle flow monitoring and reporting apparatus without the use of geographic position or cell radio circuitry. A tap handle battery power supply fits within and protected by the tap handle and electrically powers the tap handle radio transmitter device.

A mobile communications device including geographic position sensing and cell radio circuitry for moving to a plurality of locations within the keg distribution network and configured to selectively receive and process the radiofrequency signals from the small form factor and reporting device and/or the tap handle flow monitoring and reporting apparatus passively and without user interaction. The mobile communications device further includes memory circuitry for storing data and computer processor executable instructions relating to the keg and the keg distribution network. The mobile communications device further includes computer processing circuitry for processing the data and executing the executable instructions for monitoring and reporting the physical properties and location of the keg within the keg distribution network, without otherwise using network uplink/gateway circuit device.

The keg distribution monitoring and reporting apparatus and the tap handle flow monitoring and reporting apparatus may operate independently or collaboratively for sensing and reporting the status of fluid storage, flow, and financial operations relating to the distribution of the liquid product throughout the liquid product distribution network.

The liquid product distribution network of the present disclosure includes a radio transmitter providing wireless communications for determination of exact kegs, even if they are not visible/accessible. The radio transmitter also makes possible exact keg inventory in a warehouse. The radio transmitter also makes possible automatic and real-time correlation of returned kegs, as well as determination of keg location, and cold room inventory. The radio transmitter makes use of normal mobile phones for detecting kegs within a 100' radius, in the background, without any manual interaction and at a distance without kegs being visible.

The radio transmitter permits automatically and accurately correlating keg serial numbers for correlating deposits and maintaining inventory. The radio transmitter and associated software permits easily looking up keg contents, fill dates, etc., and can use a normal mobile phone, as well as flag kegs for service based upon number of turns in the field.

Because the radio transmitter enables uniquely identifies a keg, as well as its distributor and brand, the status of the keg can be automatically relayed to the brewery/distributor. The distribution network mechanism for determining how full each keg attaches to the keg and does not require shifting of kegs on scales for weighing. The radio transmitter connects within the distribution network to automatically relay fill data to the correct brewery/distributor.

By leveraging a cell phone communication system, the radio transmitter does not need its own GPS and cell radios, allowing it to cost ten dollars or less. The radio transmitter also does not require a monthly cell data plan, has a small form factor, and can run five years on typical lithium battery cells. By operating nominally for five years, the radio transmitter aligns with the normal five-year service cycle of kegs. The distribution network includes a keg level measuring system that does not require penetration of the container. The keg level measuring system isolates acoustic measurements by: (1) using ambient noise cancellation; (2) timing measurements to correspond with the acoustic impulse generated by the immediate keg. The level measuring system is not continuous, saving power when not measuring, as well as does not require either penetration of lines or modification of handles/taps.

The distribution network includes a truck reader that allows real-time inventory of a delivery truck. By putting the antennas at the end of wires, the truck reader main unit can be hidden and/or made secure under the dash or seats. By connecting the ODB2 port in the delivery truck, the unit is easy to install and can collect mileage, speed and other data from the vehicle. By integrating a Wi-Fi antenna, the unit can "store and forward"—collect data during the day and automatically download it at night when the truck returns to base. The truck reader acts as a knowledge base for delivery drivers—keeping track of information they need to make deliveries—such as instructions on where to park, lock codes or access codes, best time of day to make deliveries, consumer contacts and instructions, etc.

The truck reader allows real-time monitoring of trucks and drivers. For example, the truck reader enables determining which driver is nearest to a required delivery, and whether drivers stay on their routes or make unscheduled stops, etc.

By collecting data on the location and history of kegs or handles, the distribution network determines state transitions for kegs. Some of the state transitions are determined retroactively. For example, a lack of readings after a period of time may retroactively determine a state transition that occurred at the beginning of the period. Hand-offs between sensing devices and locations can determine state changes. For example, a keg that was detected by a cold room reader, but then is no longer detected by that reader, then is detected by a truck reader, might cause a state change to "being delivered."

The distribution network may have determined a keg has been delivered to a vendor (i.e., consumer such as restaurant/bar), but may not know which vendor or exactly when. When a mobile sensor (such as a mobile phone) detects/contacts the presence of the keg at a location, the distribution network then determines which vendor the keg went to, and can retroactively determine the delivery schedule and other information because it now knows which vendor received the keg.

Using store and forward, the mobile sensor can download historical information from the radio transmitter 16 when it detects it at a vendor. Using the mesh network and store and forward at a vendor, an arriving keg can communicate its arrival to the other kegs at the vendor. When one of the older kegs leaves the vendor and returns to the brewery, it forwards the information from the keg that newly arrived while it was at the vendor.

The distribution network includes a weighing mat that can integrate branding so that a given type of keg is correlated to a place on the mat. A brewery can sponsor their portion of a mat, allowing the total area of the mat to build up over time. The mat determines wirelessly using the radio transmitter where kegs are on the mat, to determine which exact keg is being weighed. By correlating the decrease in keg levels with drink purchases, it is possible to determine which consumer purchased from which keg. Once the keg is determined, it is then known which brewery, type of beer, date brewed, etc.

By correlating consumer location against keg location, it is possible to notify the consumer (1) when a keg of their favorite beer goes on tap; (2) the nearest location to purchase a glass of beer; (3) how long the beer is likely to be on tap (i.e., how empty the keg is); (4) the keg is no longer available; (5) how fresh the beer is (i.e., when it was brewed). When a limited supply keg goes on tap, the action of going on tap can trigger alerts to consumers indicating the keg is now available.

The distribution network can indicate other beers currently available on tap that are similar to what the consumer likes/has purchased before/what their friend likes/what others are drinking/what is popular/what is freshest/what has aged longest/what is seasonal or special/what is from a local brewery/what is from a faraway brewery/what has special ingredients/what is of limited supply. The distribution network can indicate other beers currently available on tap that are similar to what the consumer likes/has purchased before/etc. thereby introducing the consumer to new breweries. Distribution network can indicate the brew date of each beer, how long it has aged, how long it has been on tap, etc.

By correlating consumer purchase of product against marketing done to the consumer, it is possible to determine marketing effectiveness, and thereby improve future marketing. A brewery can allow a consumer to "sponsor" a keg such that the consumer is notified where the keg travels, when it arrives at particular locations, etc. If the consumer wants to sponsor a keg with a certain type of beer only, a container can be allocated to his sponsorship at every brewing, so it appears he "owns" a specific keg, even if the actual container is different at each brewing. This allows a brewery to rotate their kegs normally while still allowing the consumer to perceive they are sponsoring a single keg.

The distribution network also comprises a system and mechanism for remotely determining the fill level of a fluid container. The present invention for remotely determining the fill level of a container addresses the above needs by working with metal containers, while being small and inexpensive to adapt to existing containers. Because the fill level does not penetrate the main container vessel, the advantage of not extending or modifying the container or its valves and couplings exists. The system and mechanism of the present disclosure does not directly contact the main vessel body or the fluid inside and does not need to be protected from heat of sterilization and cold of evaporation.

According to one aspect of the present disclosure a liquid product distribution network monitoring and reporting system comprises a keg distribution monitoring and reporting apparatus associated with a keg adapted for containing the liquid product. The keg distribution monitoring and reporting apparatus comprises a sensing and reporting device. The sensing and reporting device comprises sensing circuitry embedded in a top or bottom chime of the keg without extending any keg physical boundaries in any dimension, and further whereby the top or bottom chime physically protects the sensing circuitry during keg distribution in the keg distribution network, for sensing at least one of physical properties and location associated with the keg. The sensing and reporting device comprises a radio transmitter device comprising a low-energy consumption radio/processing module, and radiofrequency signal transmission circuitry associated with said radio/processing module for transmitting radio frequency signals from the sensing and reporting device. The sensing and reporting device comprises a battery power supply unit fitted within and protected by the top or bottom chime, for electrically powering the sensing and reporting device. The sensing and reporting device comprises a unique identifier associated with the sensing and reporting device. The sensing and reporting device comprises a mobile communications device comprising cell radio circuitry, and configured to identify the keg based on the unique identifier associated with the sensing and reporting device embedded therein, and receive and process the radiofrequency signals from the radiofrequency signal transmission circuitry of the identified keg passively and without user interaction. The said mobile communications device further comprising memory circuitry for storing data and computer processor executable instructions relating to the keg and the keg distribution network, and further comprising computer processing circuitry for processing said data and executing said executable instructions for monitoring and reporting the physical properties and location of the keg within the keg distribution network, without otherwise using network uplink/gateway circuit device.

In an embodiment, the keg distribution monitoring and reporting apparatus further comprises a double neck fitting adapter adapted to fit into an opening in the neck of the keg and allow for attachment of a tap or a coupler thereof at a neck of the keg.

In an embodiment, the sensing and reporting device of the keg distribution monitoring and reporting apparatus further comprises a float sensor arranged in the double neck fitting adapter, for measuring properties of the liquid product contained in the keg, and wherein the float sensor comprises a disc supported by a wire attached to the double neck fitting adapter and inserted into a spear extending from the double neck fitting adapted to inside the keg, such that the disc is configured to float over a surface of the liquid product contained inside the keg in contact therewith.

In an embodiment, the radiofrequency signal transmission circuitry is configured to establish a mesh network with other radiofrequency signal transmission circuitries of other keg distribution monitoring and reporting apparatuses associated with corresponding multiple kegs in the liquid product distribution network monitoring and reporting system, for facilitating transmission of radiofrequency signals from the sensing and reporting devices from the other radiofrequency signal transmission circuitries.

In an embodiment, the sensing and reporting device of the keg distribution monitoring and reporting apparatus further comprises one or more of proximity sensor, pressure sensor and radio impedance/reflectivity sensor arranged in the top and/or bottom chimes, such that when two kegs are stacked with one above the other, the one or more of proximity sensor, pressure sensor and radio impedance/reflectivity sensor in lower keg of the two kegs detects upper keg stacked thereon.

In an embodiment, the sensing and reporting device of the keg distribution monitoring and reporting apparatus further comprises an emitter and receiver based sensing means for detecting attachment of a tap or a coupler thereof at a neck of the keg.

In an embodiment, the sensing and reporting device of the keg distribution monitoring and reporting apparatus further comprises a removable cap cover switch for detecting opening of a cap from a neck of the keg.

In an embodiment, the sensing and reporting device of the keg distribution monitoring and reporting apparatus further comprises one or more load cells arranged in a bottom chime of the keg, for determining a weight of the keg.

In an embodiment, the battery power supply unit is non-rechargeable and is optimized in a manner that the said sensing and reporting device operates for a period of up to five years, and wherein the top and/or bottom chime includes means to allow for removing and replacing the said battery power supply unit.

In another embodiment, the said battery power supply unit is rechargeable and is charged by at least one of charging contacts provided at the top and/or bottom chime; wireless charging inductive loop provided at the top and/or bottom chime; a thermoelectric generator for using temperature gradients to provide charging; and kinetic charging means provided in the top and/or bottom chime, spear or valve to covert motion of the keg or its contents into electrical power.

In an embodiment, the said battery power supply unit is detachably coupled to a carrier embedded in the top or bottom chime of the keg and is charged by detaching the battery power supply unit from the carrier, and wherein the keg distribution monitoring and reporting apparatus further comprises a secondary battery power supply unit for powering one or more of the sensing and reporting device and the radio transmitter device when the said battery power supply unit is detached from the carrier.

In an embodiment, the keg distribution monitoring and reporting apparatus further comprises a sensor port formed in the top and/or bottom chime to allow for direct access to the liquid product contained inside the keg.

According to another aspect, the present invention discloses a method for monitoring and reporting liquid product distribution network. The method comprises operating a keg distribution monitoring and reporting apparatus associated with a keg adapted for containing the liquid product. The said keg distribution monitoring and reporting apparatus operating steps comprises attaching a sensing and reporting device to the keg. The steps of attaching a sensing and reporting device to the keg comprises embedding sensing circuitry in a top or bottom chime of the keg without extending any keg physical boundaries in any dimension, and further whereby the top or bottom chime physically protects the sensing circuitry during keg distribution in the keg distribution network, for sensing at least one of physical properties and location associated with the keg. The method comprises attaching a radio transmitter comprising a low-energy consumption radio/processing module, in the top or bottom chime device. The method comprises associating radiofrequency signal transmission circuitry with said radio/processing module for transmitting radiofrequency signals from the sensing and reporting device. The method comprises fitting a battery power supply unit within and protected by the top or bottom chime, for electrically powering the sensing and reporting device. The method comprises associating a unique identifier with the sensing and reporting device utilizing a mobile communications device for identifying the keg based on the unique identifier associated with the sensing and reporting device embedded therein, and receiving and processing the radiofrequency signals from the radiofrequency signal transmission circuitry of the identified keg passively and without user interaction. The method comprises storing data and computer processor executable instructions relating to the keg and the keg distribution network, and processing said data and executing said executable instructions for monitoring and reporting the physical properties and location of the keg within the keg distribution network, without otherwise using network uplink/gateway circuit device.

In an embodiment, the method of embedding the sensing circuitry in the top or bottom chime of the keg comprises putting an insulation around the sensing circuitry and casting the insulation sensing circuitry in mold for the forming the top or bottom chime of the keg with the sensing circuitry embedded therein. In an embodiment, the method further comprises pre-cooling the sensing circuitry before casting.

In an embodiment, the method further comprises the battery power supply unit is fitted within and protected by the top or bottom chime by glue.

In an embodiment, the method further comprises providing means to allow for removing and replacing the said battery power supply unit from the top or bottom chime.

In an embodiment, the method comprises providing a double neck fitting adapter in the keg distribution monitoring and reporting apparatus and adapted to fit into an opening in the neck of the keg to allow for attachment of a tap or a coupler thereof at a neck of the keg, and providing sensors for measuring properties of the liquid product contained in the keg. The method comprises a float sensor for the sensing and reporting device of the keg distribution monitoring and reporting apparatus and arranged in the double neck fitting adapter, for measuring properties of the liquid product contained in the keg. The method comprises using flow capturing devices in the double neck adapter or the spear for converting motion of the fluid to electrical power.

According to another aspect a keg distribution monitoring and reporting apparatus associated with a keg adapted for containing the liquid product, as a part of a liquid product distribution network monitoring and reporting system is disclosed. The keg distribution monitoring and reporting apparatus comprises a sensing and reporting device comprising sensing circuitry attached to the container, in some embodiments without extending any container physical boundaries in any dimension, and further whereby the top or bottom chime physically protects the sensing circuitry during container distribution in the container distribution network, for sensing at least one of physical properties and location associated with the container. The keg distribution monitoring and reporting apparatus contains a radio transmitter device comprising a low-energy consumption radio/processing module, and radiofrequency signal transmission circuitry associated with said radio/processing module for transmitting radiofrequency signals from the sensing and reporting device. The keg distribution monitoring and reporting apparatus comprises a battery power supply unit fitted within and protected by a housing, for electrically powering the sensing and reporting device. The keg distribution monitoring and reporting apparatus comprises a unique identifier associated with the sensing and reporting device. The keg distribution monitoring and reporting apparatus comprises a mobile communications device comprising cell radio circuitry, and configured to identify the keg based on the unique identifier associated with the sensing and reporting device embedded therein, and receive and process the radiofrequency signals from the radiofrequency signal transmission circuitry of the identified keg passively and without user interaction. The said mobile communications device further comprises memory circuitry for storing data and computer processor executable instructions relating to the keg and the keg distribution network, and further comprising computer processing circuitry for processing said data and executing said executable instructions for monitoring and reporting the physical properties and location of the keg within the keg distribution network, without otherwise using network uplink/gateway circuit device.

The keg distribution monitoring and reporting apparatus further comprises a double neck fitting adapter adapted to fit into an opening in the neck of the keg and allow for attachment of a tap or a coupler thereof at a neck of the keg, wherein the sensing and reporting device of the keg distribution monitoring and reporting apparatus further comprises a float sensor arranged in the double neck fitting adapter, for measuring properties of the liquid product contained in the keg, and wherein the float sensor comprises a disc supported by a wire attached to the double neck fitting adapter and inserted into a spear extending from the double neck fitting adapted to inside the keg, such that the disc is configured to float over a surface of the liquid product contained inside the keg in contact therewith.

These and numerous other technical and operational advantages will be clear upon an understanding of the presently disclosed subject matter, which fully support the claims made herein.

BRIEF DESCRIPTION OF THE DRAWINGS

The novel features believed characteristic of the disclosed subject matter will be set forth in any claims that are filed later. The disclosed subject matter itself, however, as well as the preferred mode of use, further objectives, and advantages thereof, will best be understood by reference to the following detailed description of an illustrative embodiment when read in conjunction with the accompany drawings, wherein:

Figures 2, 3, 4, 5, 6, 7:
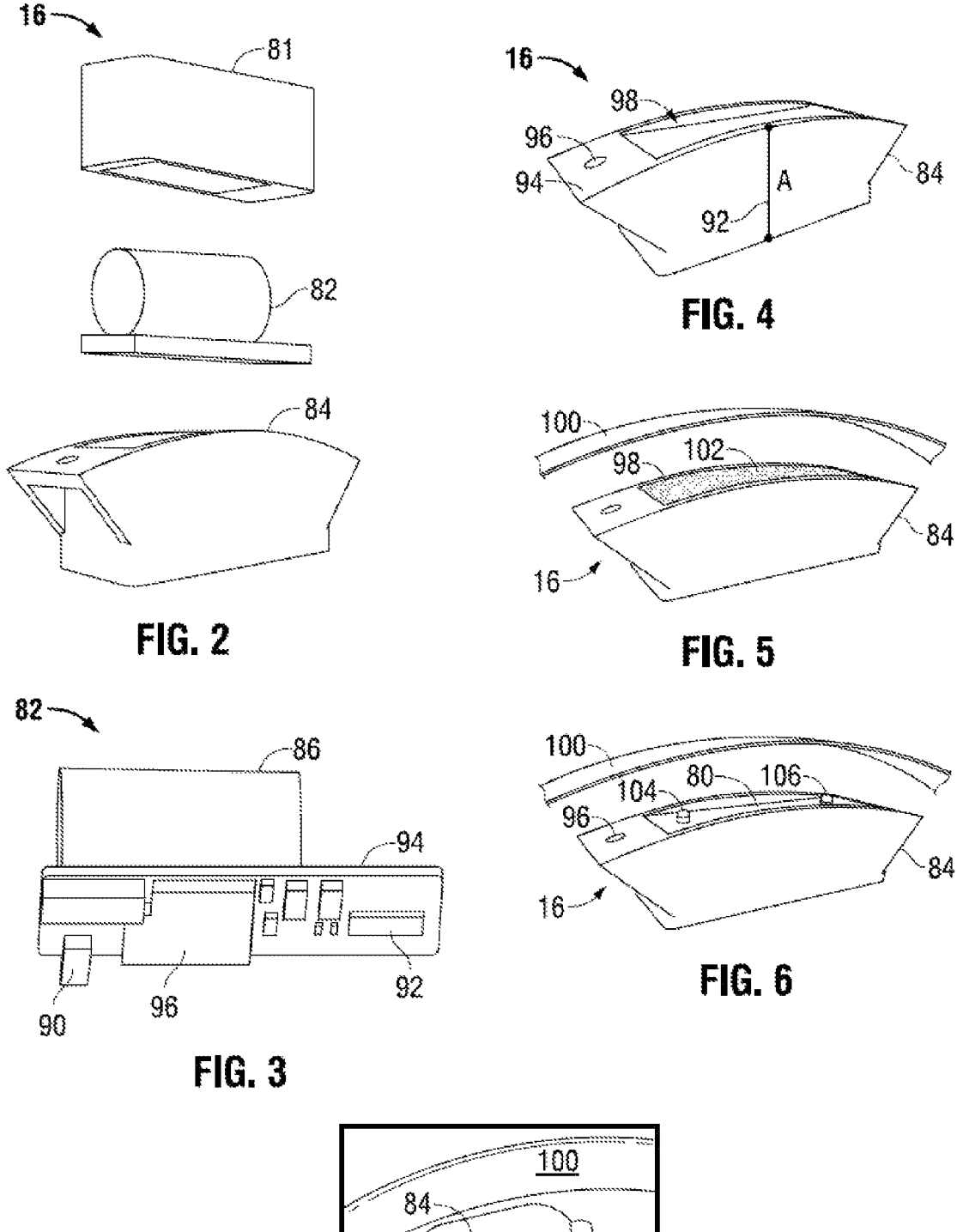
Figure 11A:
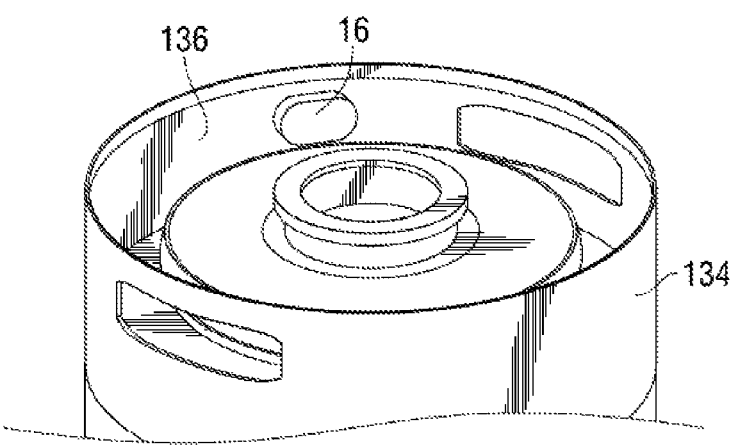
Figure 11B:
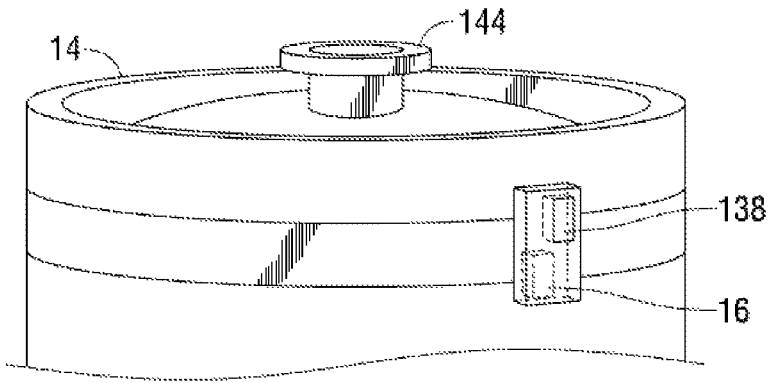
Figure 11C:
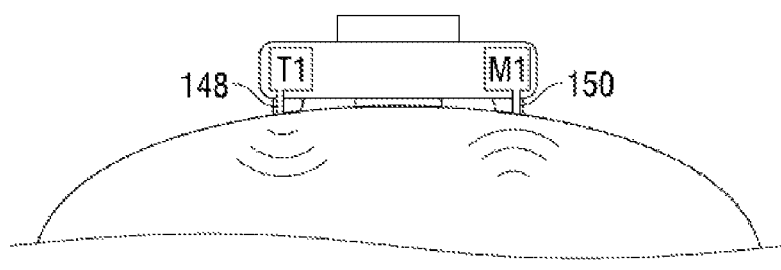
Figure 12:
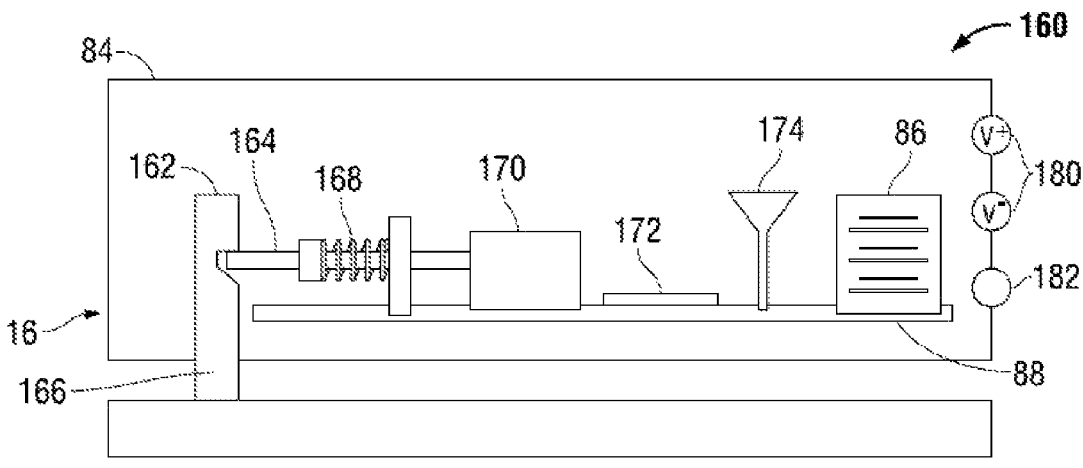
Figure 13:
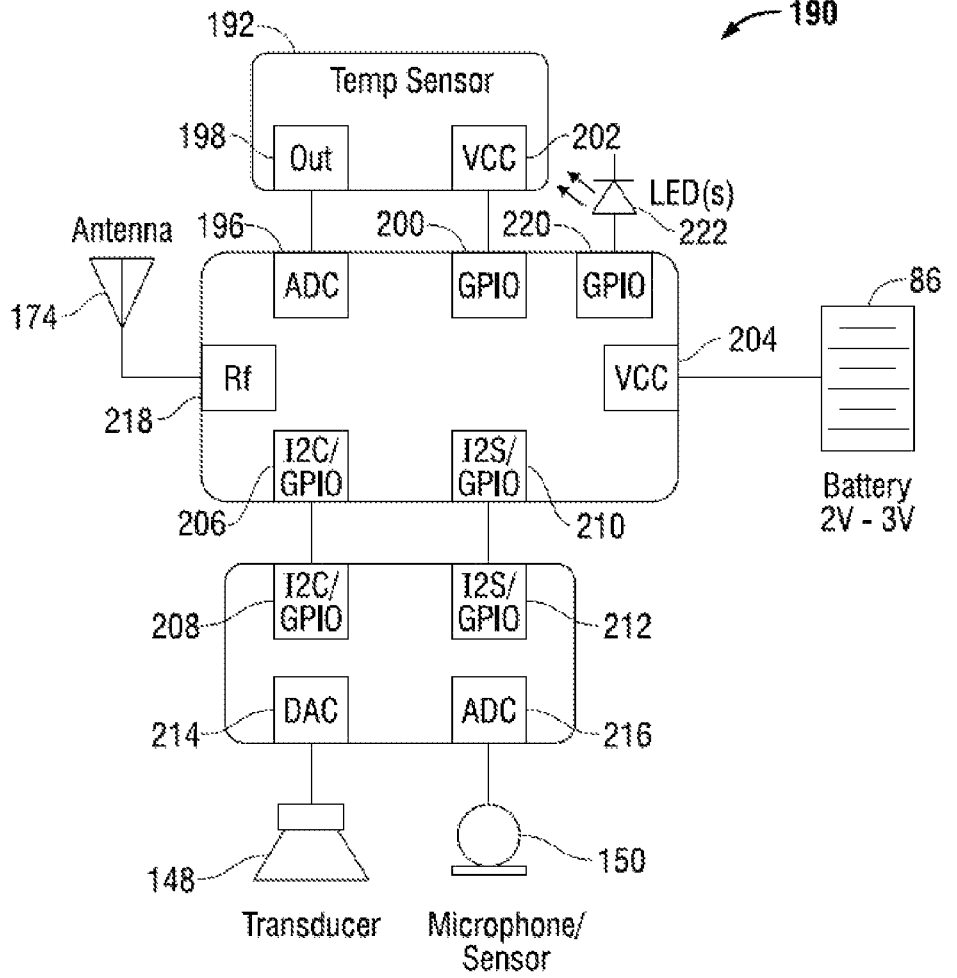
Figure 14A:
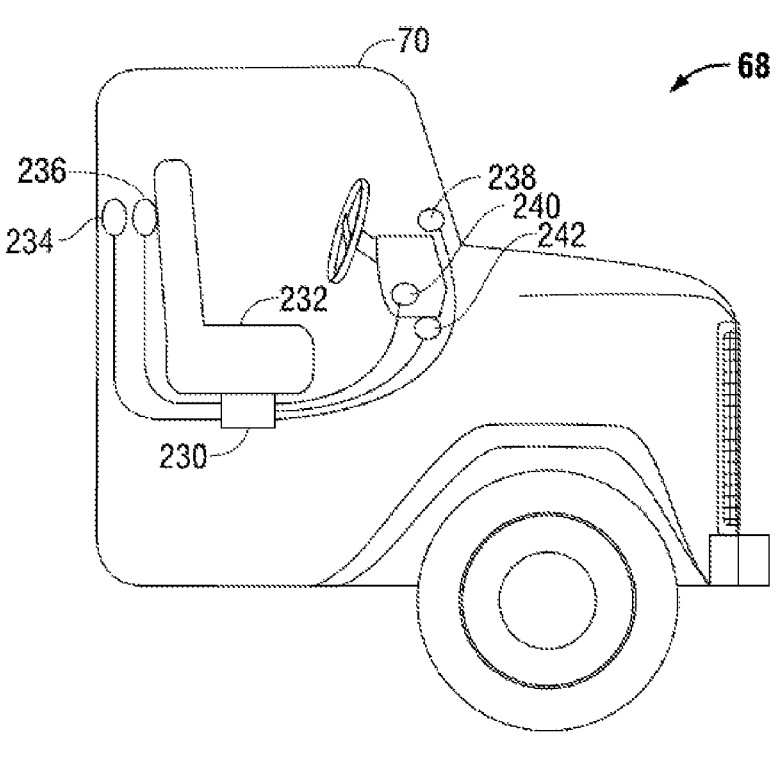
Figure 14B:
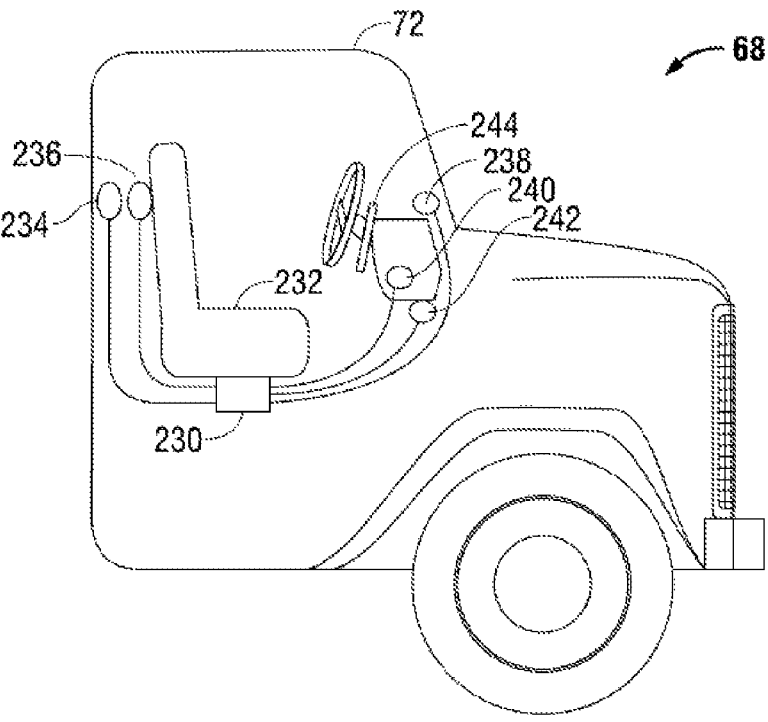
Figure 15:
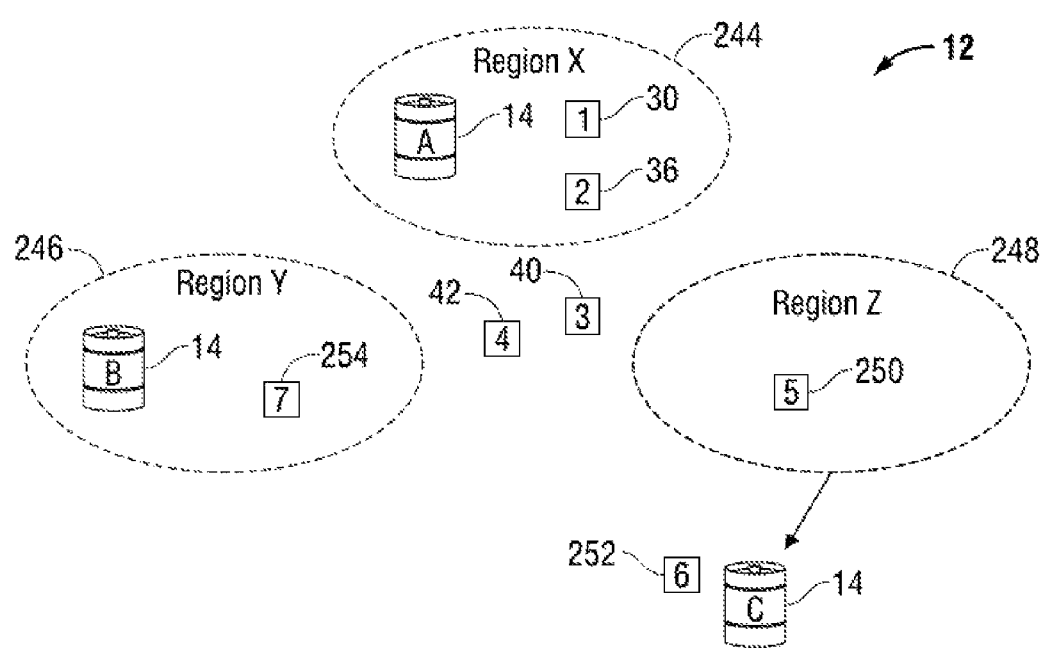
Figure 16:
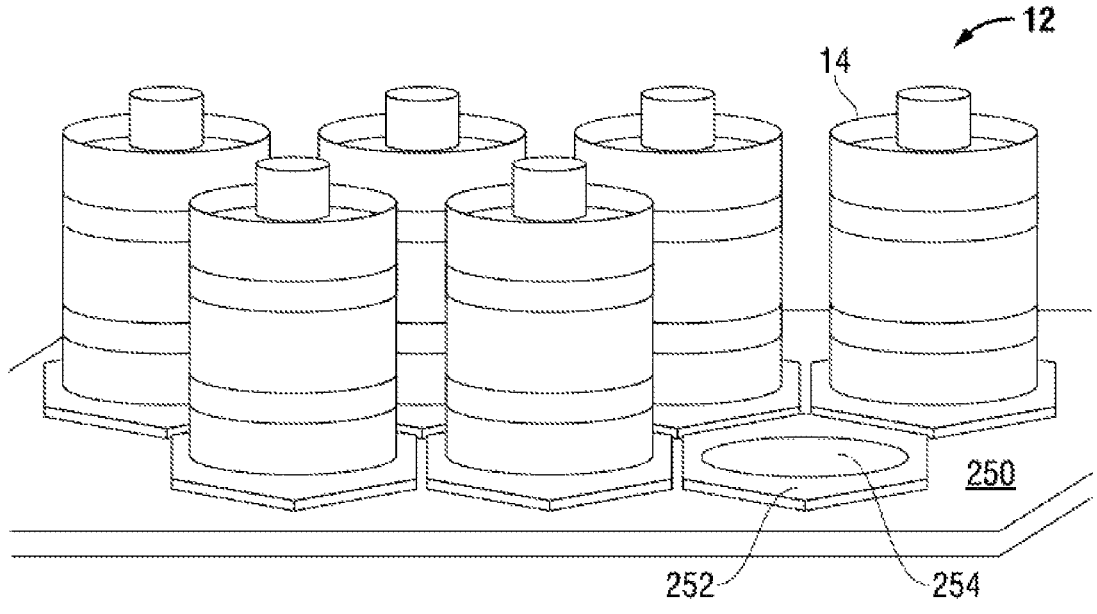
Figures 20, 21, 22, 23, 24:
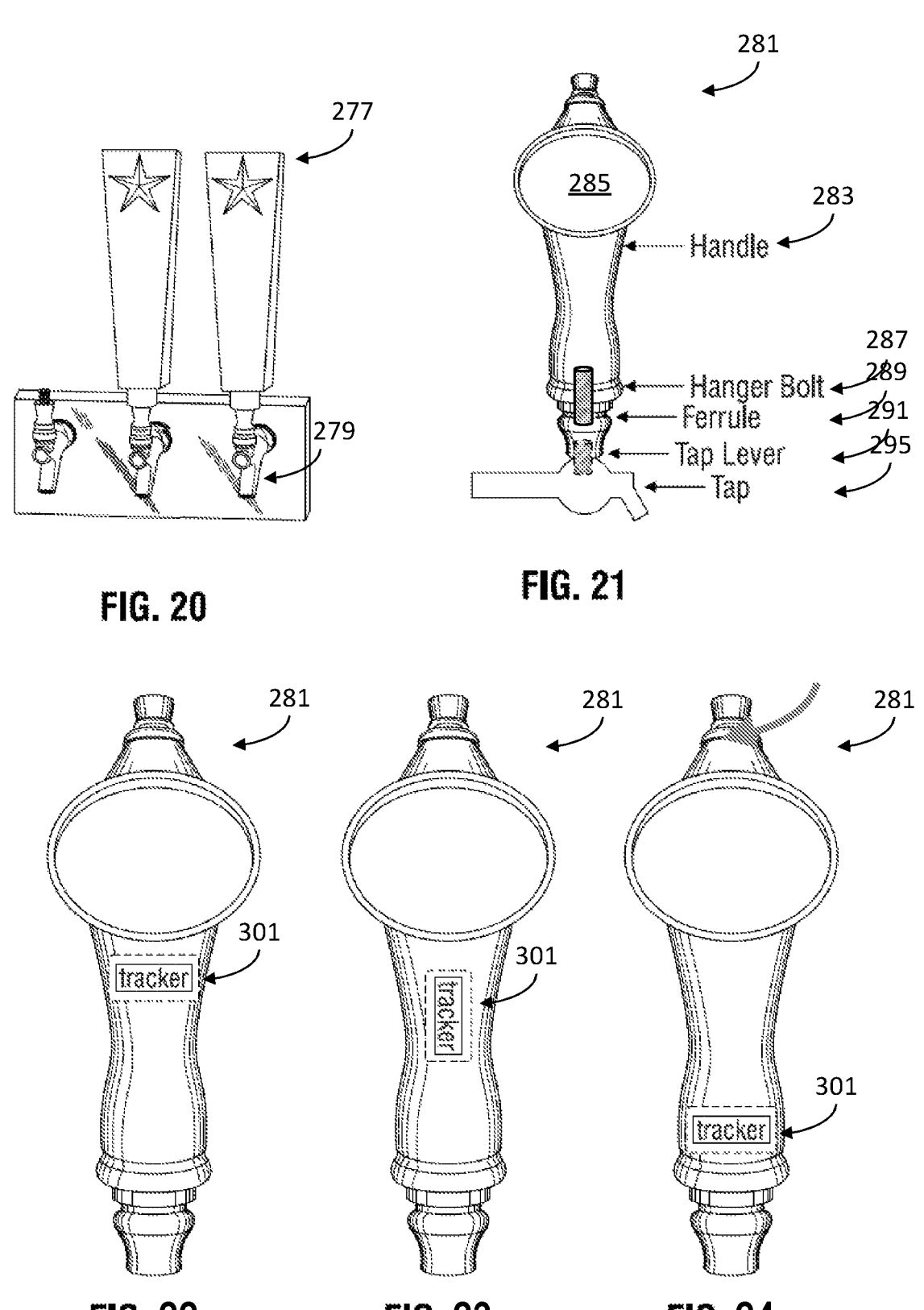
Figures 25, 26, 27:
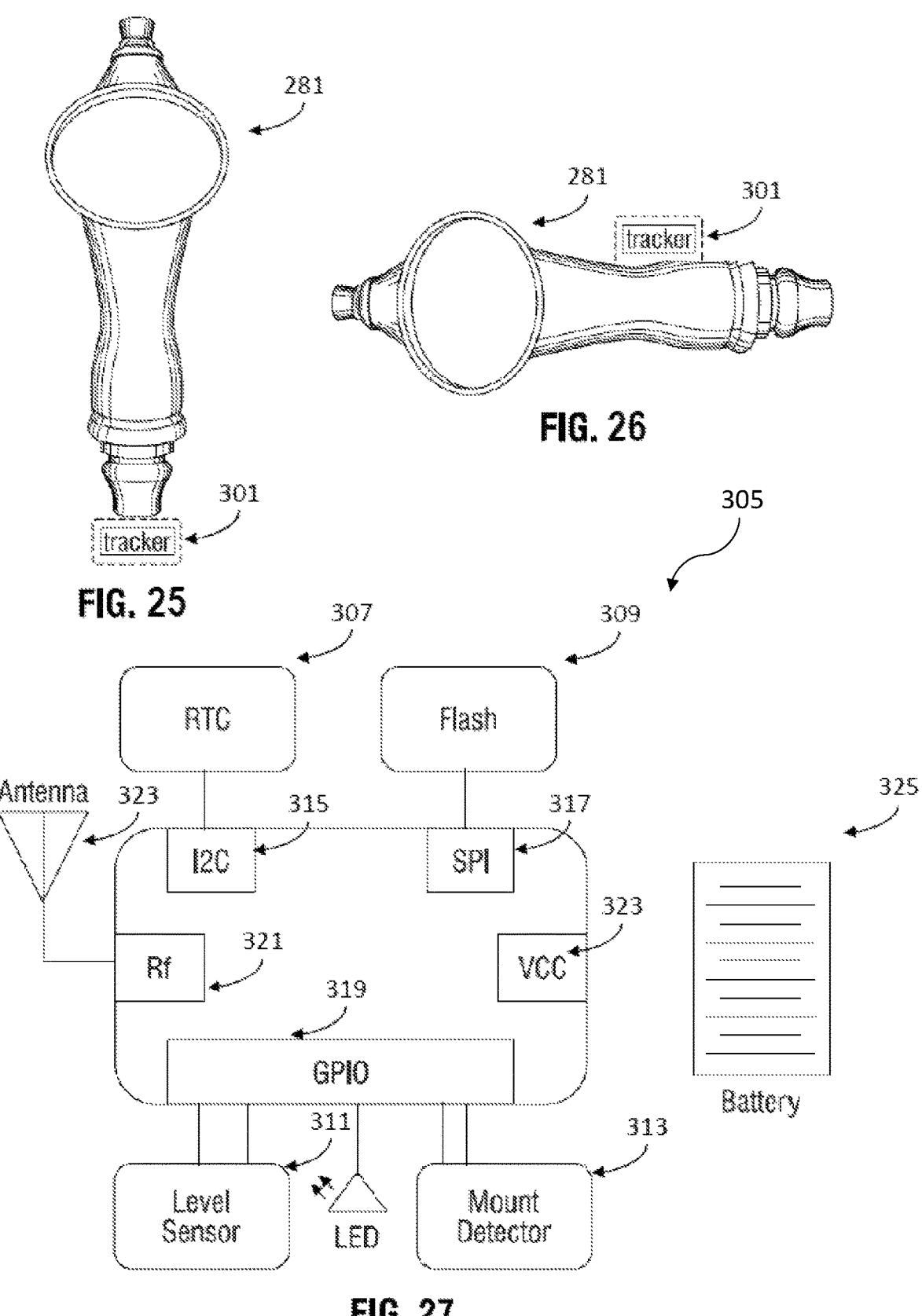
Figure 32A:
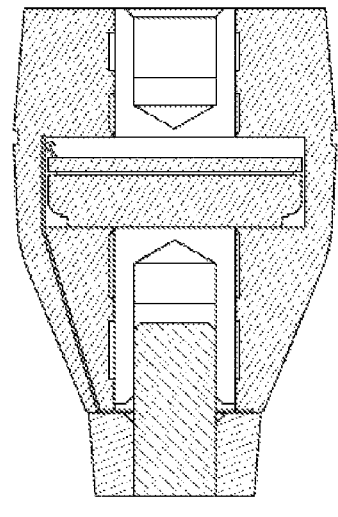
Figure 32C:
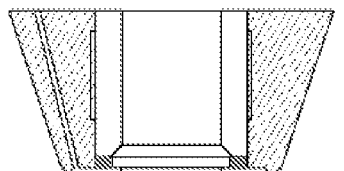
Figure 32B:
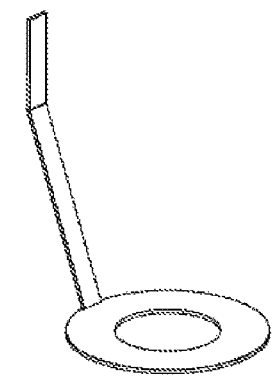
Figure 33:
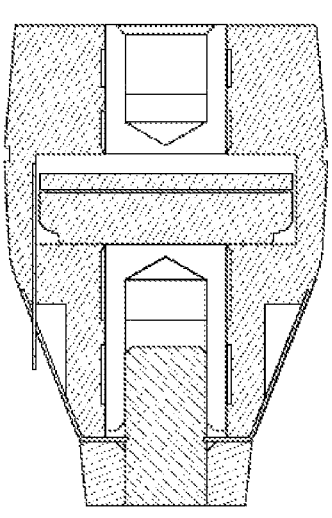
Figure 34:
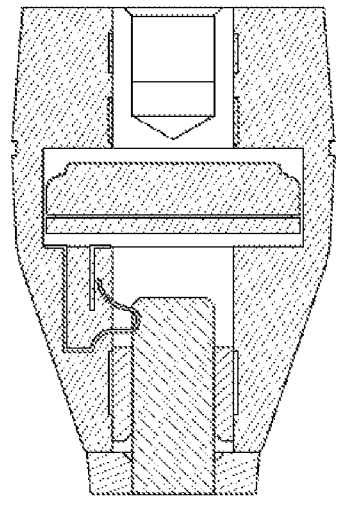
Figure 35:
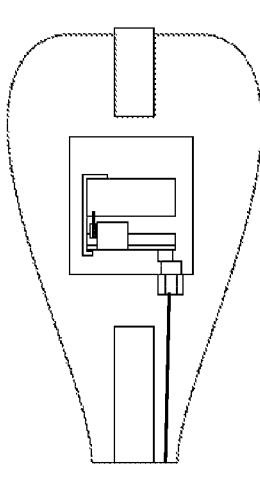
Figure 36:
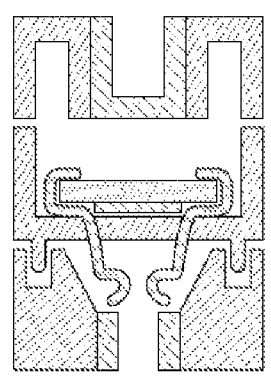

Having thus described the invention in general terms, reference will now be made to the accompanying drawings, which are not necessarily drawn to scale, and wherein:

FIG. 1 illustrates the architecture of the liquid product distribution network of the present disclosure;

FIG. 2 shows and exploded view of the radio transmitter and sensor apparatus of the present disclosure;

FIG. 3 shows a three-dimensional view of the PCB and battery assembly of the present disclosure including components for performing the disclosed functions;

FIG. 4 shows and assembled radio transmitter according to the teachings of the present disclosures;

FIG. 5 depicts an exemplary mode of attaching the radio transmitter of the present disclosure to the rim of a keg;

FIG. 6 shows an alternate switch configuration employing the keg metal surface to turn on the radio transmitter;

FIG. 7 shows an exemplary embodiment of a tamper-resistant mechanism for holding and securing the radio transmitter to the keg rim;

FIGS. 8A through 8C depict a radio transmitter fixing mechanism for securing the radio transmitter of the present disclosure to the keg rim;

FIG. 9 shows an alternative fixing mechanism for securing the radio transmitter around the handle of a keg;

FIG. 10 depicts one embodiment of a fluid level measurement mechanism for determining keg volume;

FIGS. 11A through 11C show various ways of securing embodiments of the radio transmitter and volume monitoring device of the present disclosure;

FIG. 12 illustrates an embodiment of an authenticated attachment mechanism for securing the radio transmitter to a keg;

FIG. 13 presents a circuit block diagram of the radio transmitter architecture according to a preferred embodiment of the presently disclosed system;

FIGS. 14A and 14B portray various hardware for use on a delivery truck operating within the liquid product distribution network of the present disclosure;

FIG. 15 provides various example events that may influence the transition of keg states as monitored kegs 14 move from various geographic regions;

FIG. 16 shows the arrangement of various kegs 14 on an exemplary mat for use in the system of the present disclosure;

FIG. 17 illustrates improved keg use, monitoring, and reporting between operations that occur in a cold room and operations that occur in a public room, such as a restaurant or other location;

FIG. 18 depicts an exemplary radio transmitter signal reader for tag detection and measurement according to the present disclosure;

FIG. 19 shows the arrangement of a fill reader in association with a cold room or other location for detecting and reporting the condition of a plurality of kegs;

FIG. 20 illustrates conceptually the use of tap handles as a tracking mechanism for beer or other liquid dispensing flow according to the teachings of the present disclosure;

FIG. 21 show how the tap handle of the present disclosure may be constructed to achieve liquid dispensing measuring and reporting;

FIGS. 22 through 24 depict various alternative embodiments of the tap handle flow measuring and reporting mechanism of the presently disclosed method and system;

FIGS. 25 through 26 depict various alternative embodiments of the tap handle flow measuring and reporting apparatus of the presently disclosed method and system;

FIG. 27 presents a circuit block diagram of the radio transmitter architecture for the presently disclosed tap handle flow measuring and reporting apparatus according to a preferred embodiment;

FIG. 28 shows a circuit diagram of the tap handle flow measuring and reporting apparatus of the present disclosure;

FIG. 29 illustrates the connecting circuitry of the presently disclosed tap handle measuring and reporting device;

FIGS. 30A and 30B demonstrate the construction of the electrical connectivity for the tap handle flow measuring and reporting circuitry of the present disclosure;

FIGS. 31A through 31C illustrate a preferred embodiment of the tap handle flow measuring and reporting device for operating consistent with the teaching of the present disclosure;

FIGS. 32A through 32C show an alternative embodiment of the present disclosure;

FIG. 33 shows a fully assembled embodiment of the device appearing in FIGS. 32A through 32C;

FIGS. 34 through 36 present further alternative embodiments of the tap handle flow measuring and reporting apparatus of the present disclosure;

FIG. 37 illustrates exemplary screen of a monitoring device as may be applied in FIG. 19;

FIGS. 38A and 38B illustrate how the liquid product distribution network of the present disclosure may sense keg status in a cold room with a closed metal door.

Figure 39:
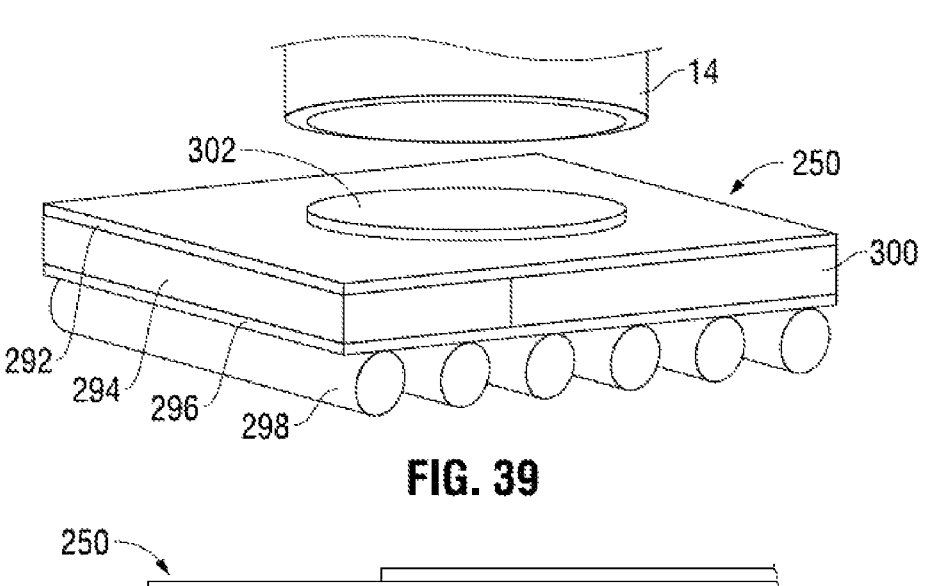
Figure 40:
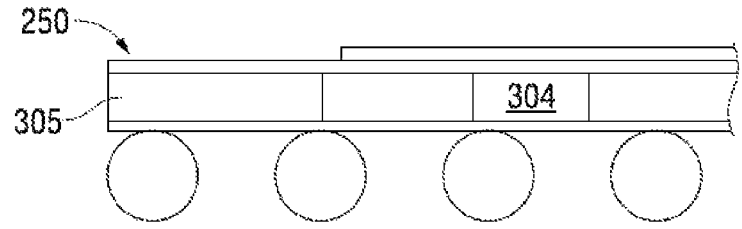
Figure 41:
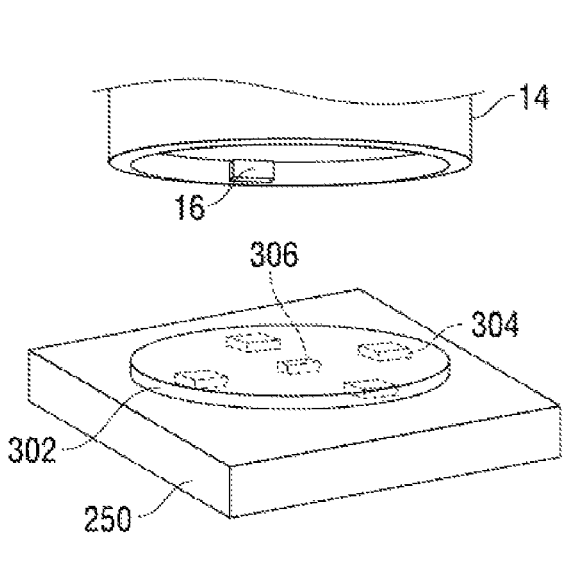
Figure 42:
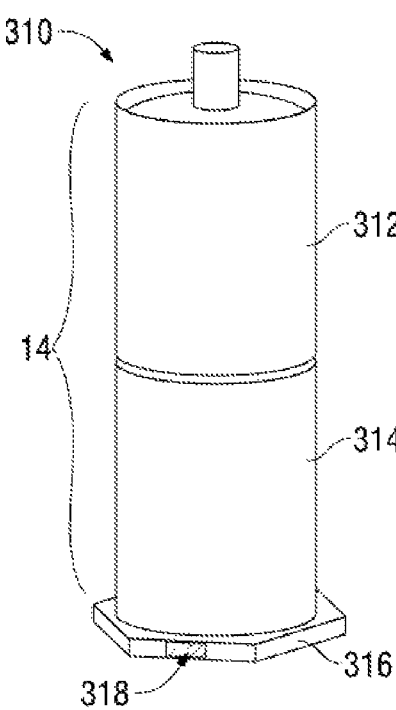
Figures 47, 48, 49, 50:
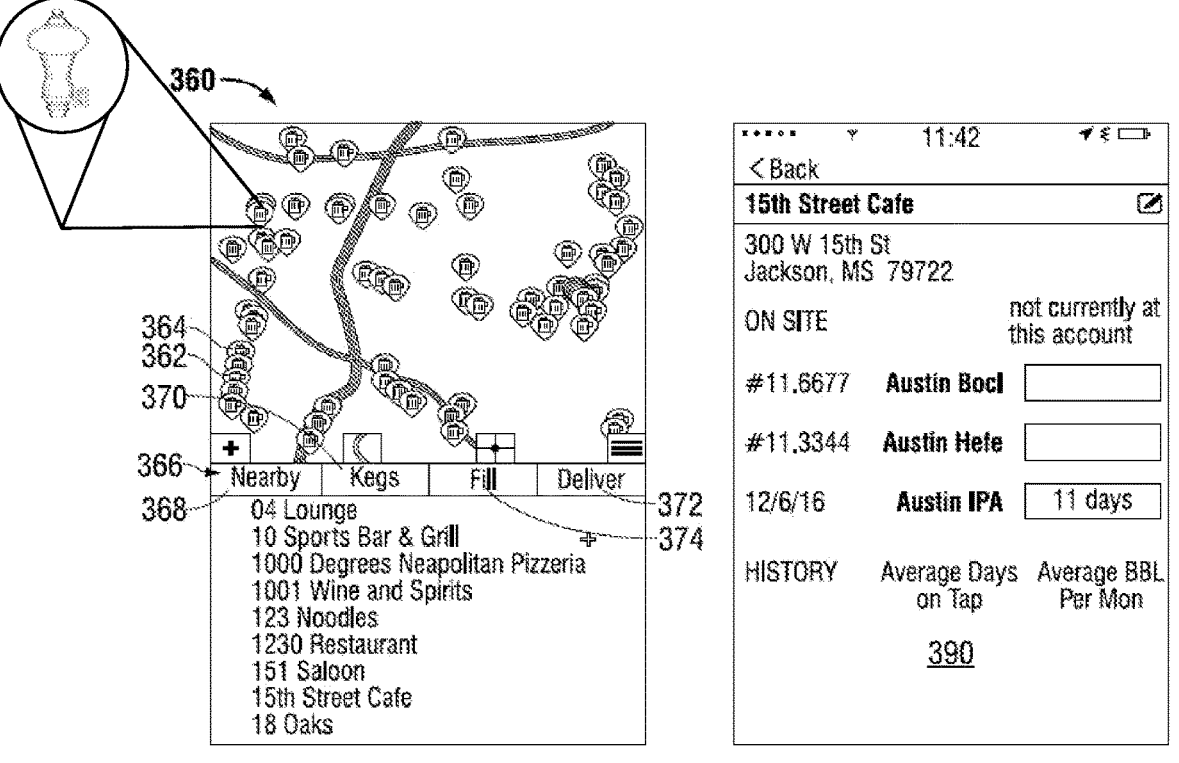

FIG. 39 depicts a layered construction of a weighing mat according to the teachings of the present disclosure;

FIG. 40 depicts a weighing or measuring device for integration into the weighing mat of the present disclosure;

FIG. 41 illustrates the association of a keg radio transmitter with a weighing mat of the present disclosure;

FIG. 42 shows a potential configuration of stacked kegs 14 as may be measured and monitored using the weighing mat of the present disclosure;

FIGS. 43 through 46 show various screens of a mobile device application for the present disclosure;

FIGS. 47 through 49 illustrate exemplary screens as may find use for mobile phones and tablets for detecting and reporting kegs or handlesat various locations and data applicable to monitoring and reporting of the present disclosure;

FIG. 50 illustrates a marketing feedback loop of an application of the present disclosure.

Figure 52:
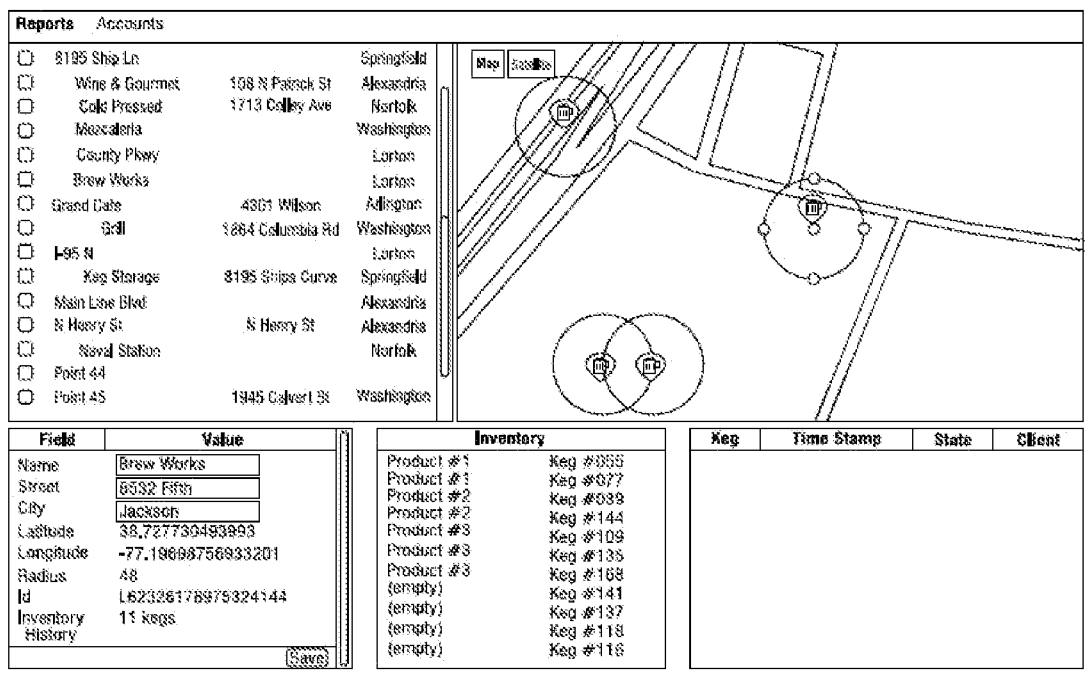
Figure 53:
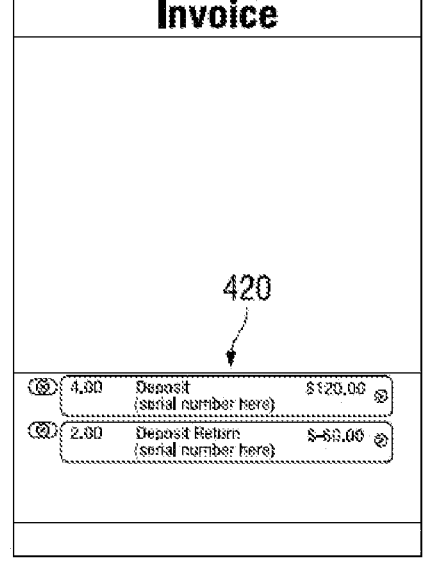
Figure 54:
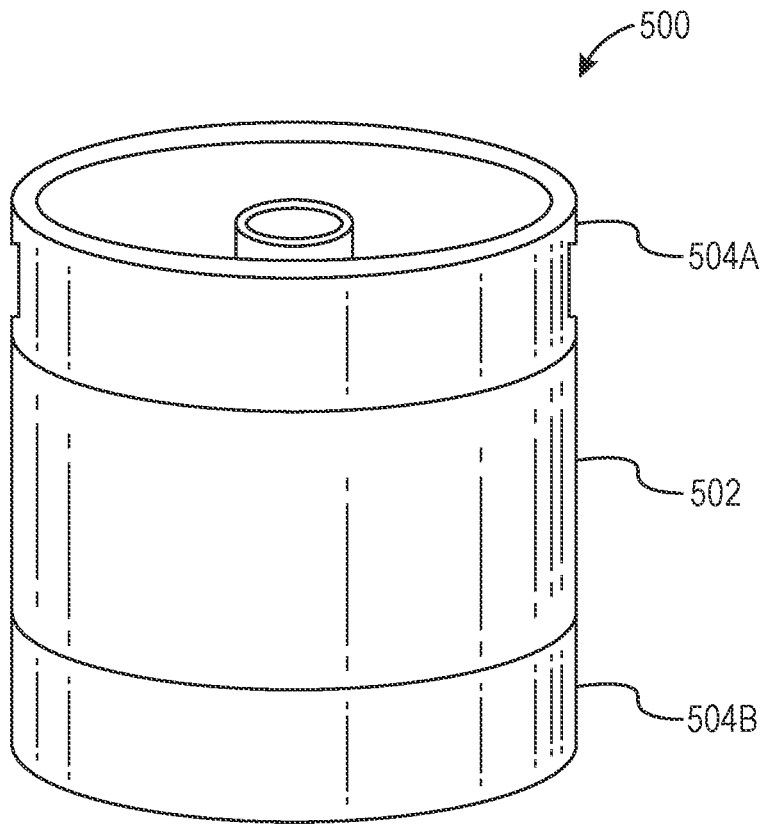
Figure 56A:
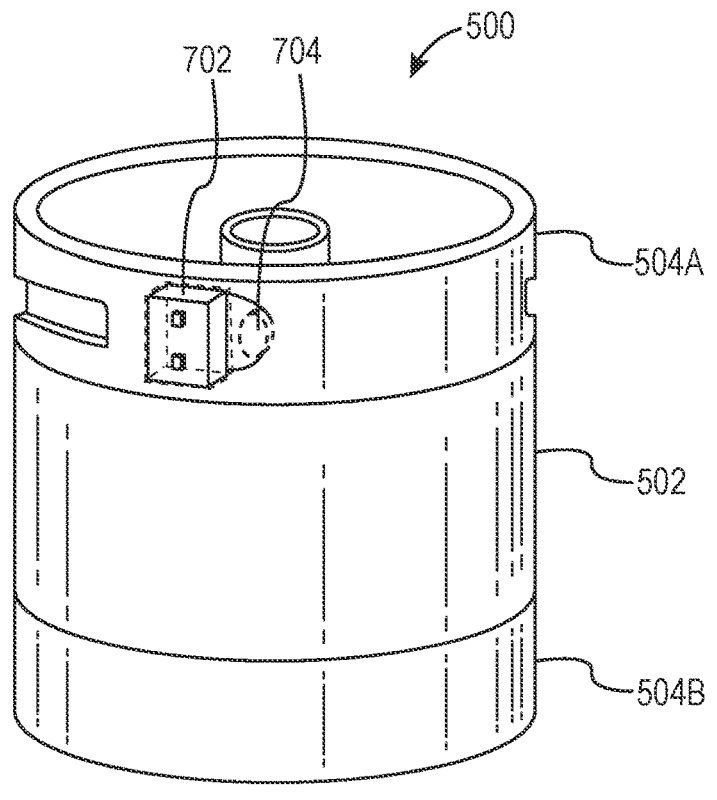
Figures 56B, 56C:
Figure 57A:
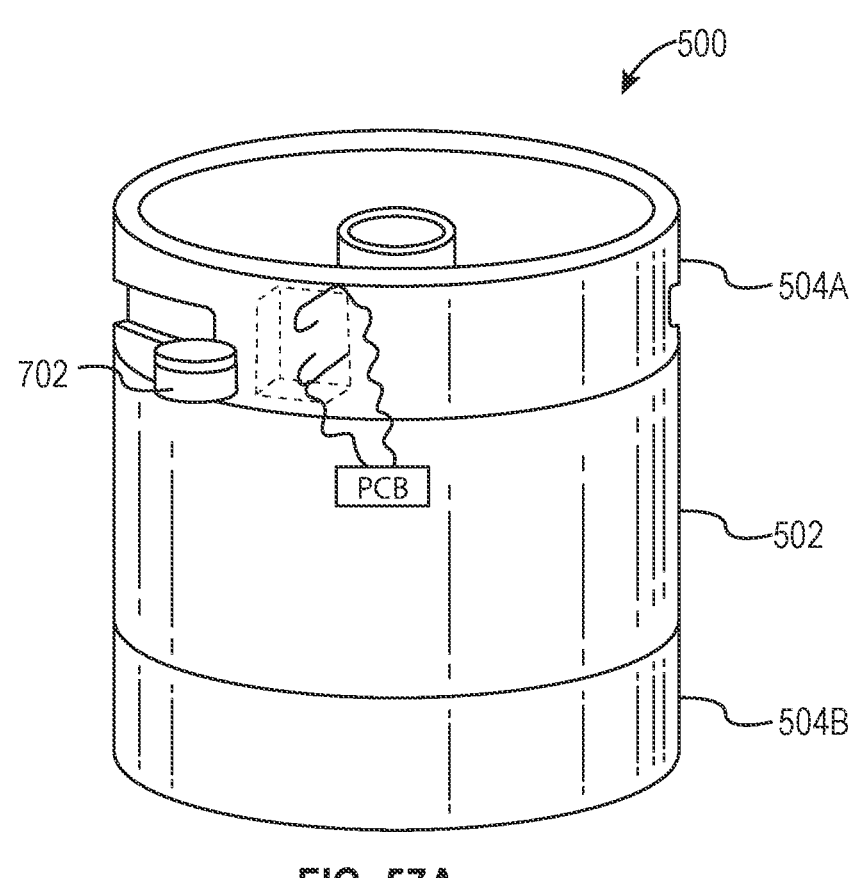
Figure 57B:
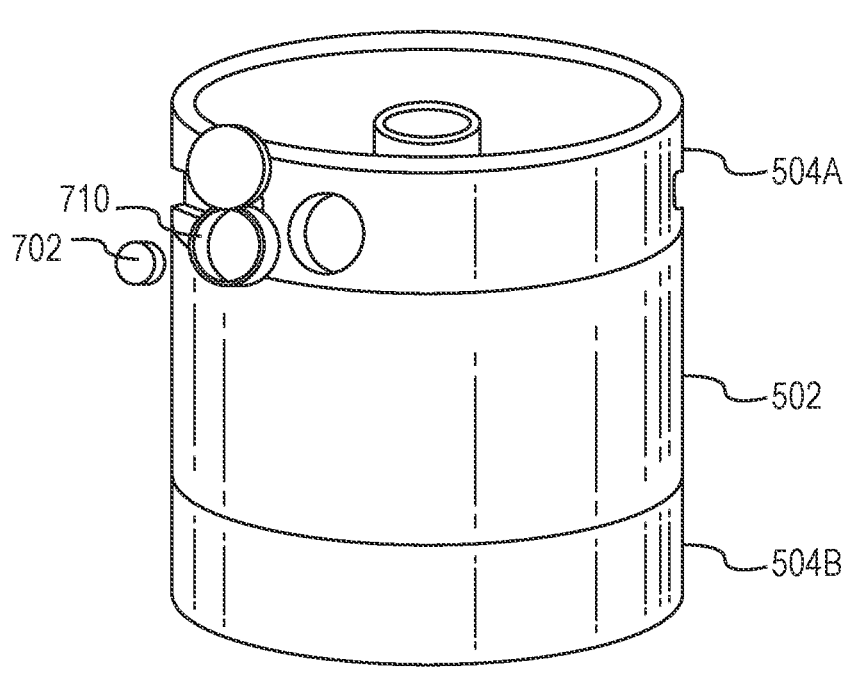
Figure 57C:
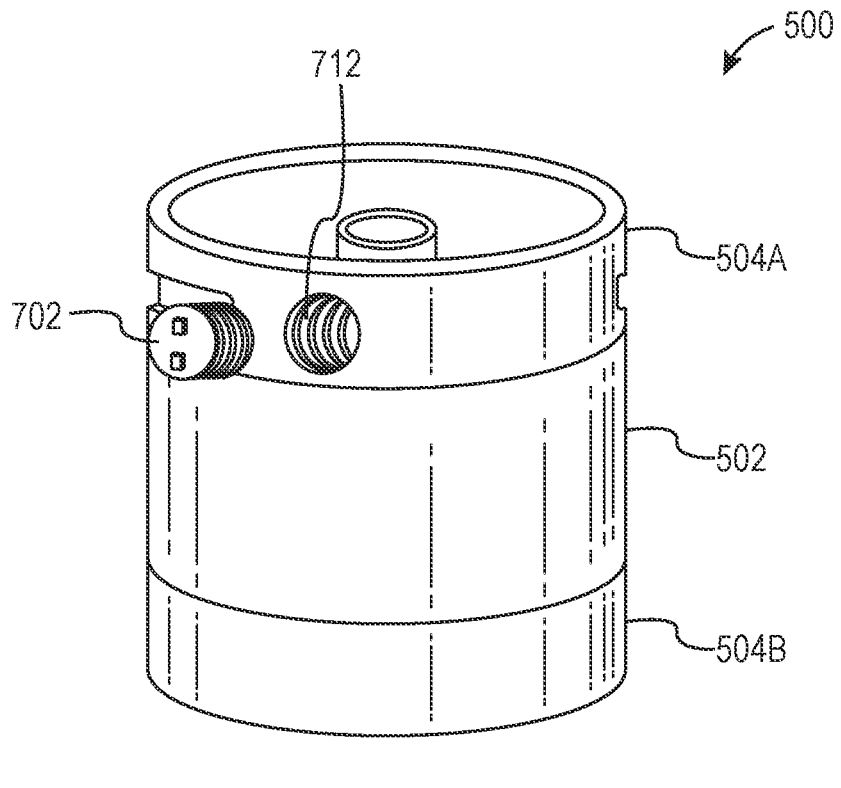
Figure 58:
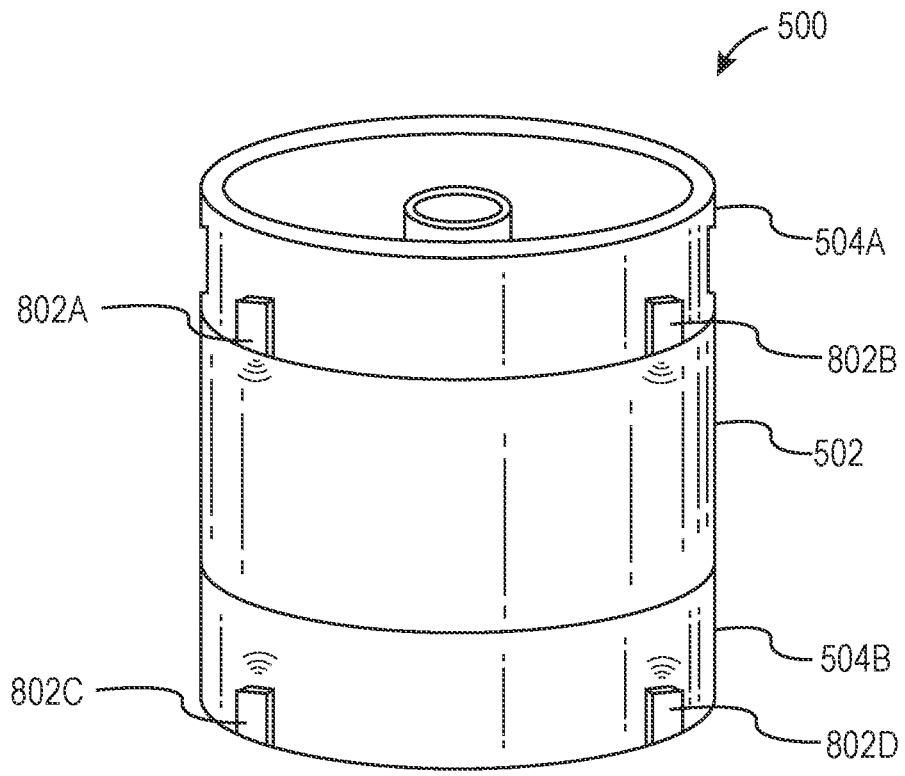
Figures 59A, 59B:
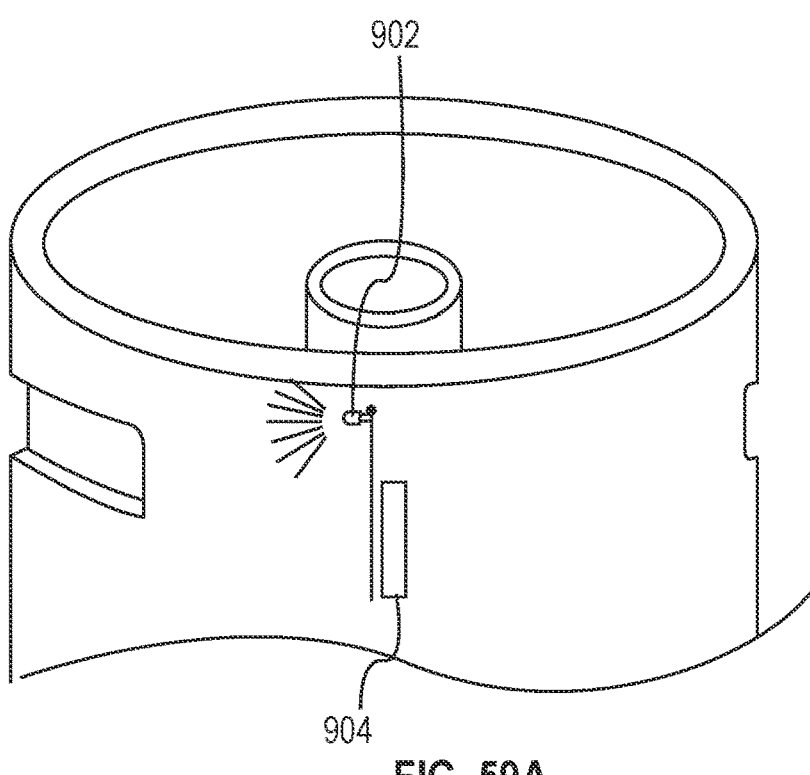
Figure 60A:
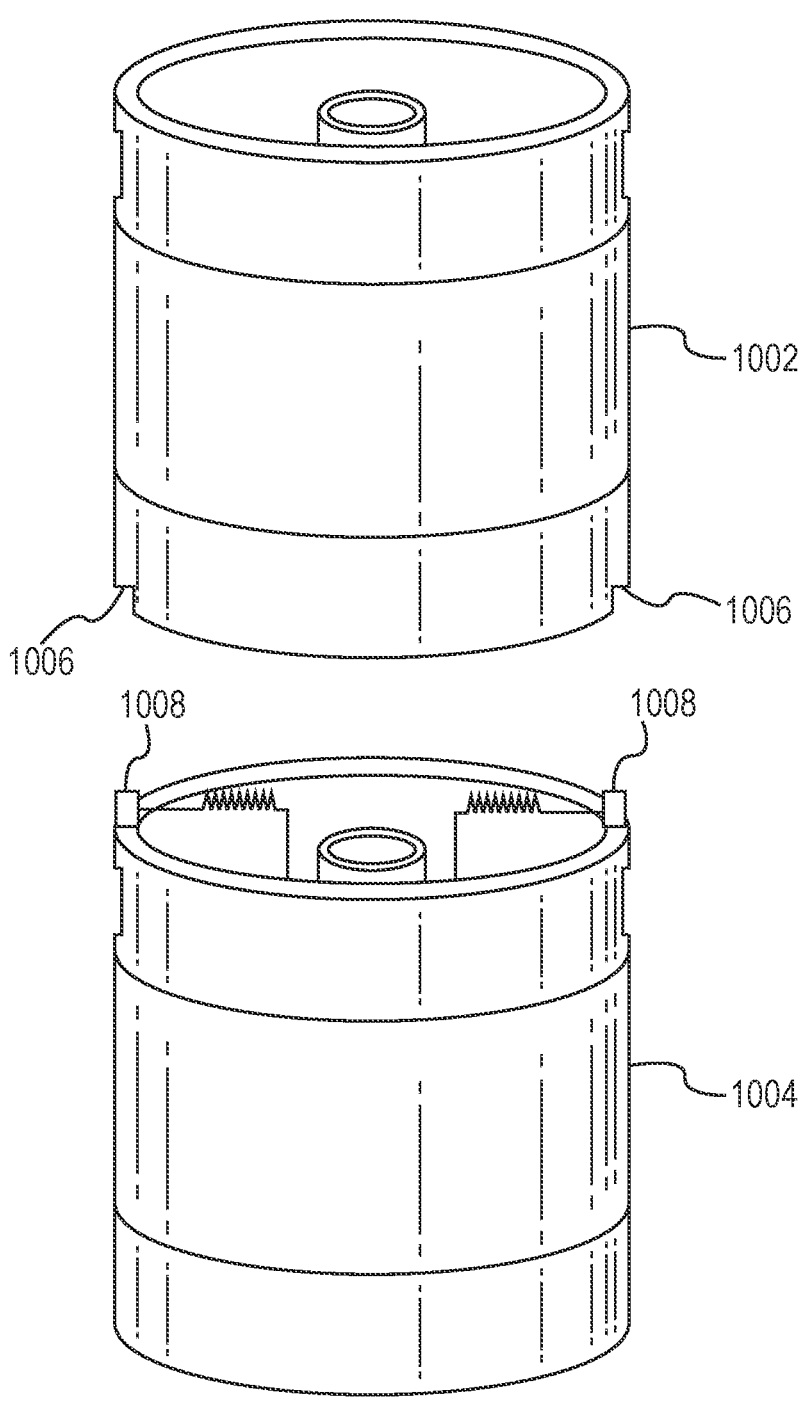
Figure 60B:
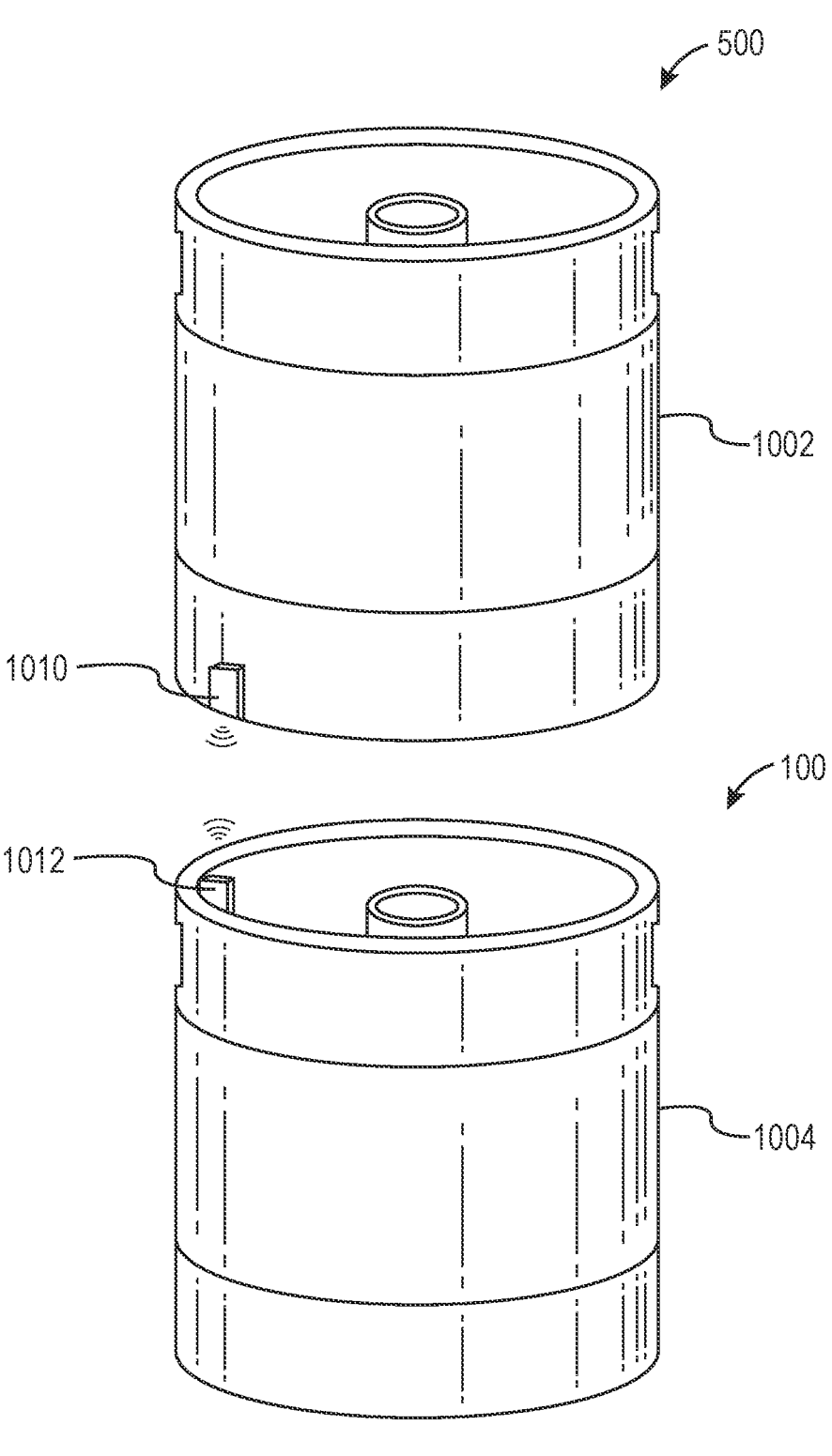
Figure 61A:
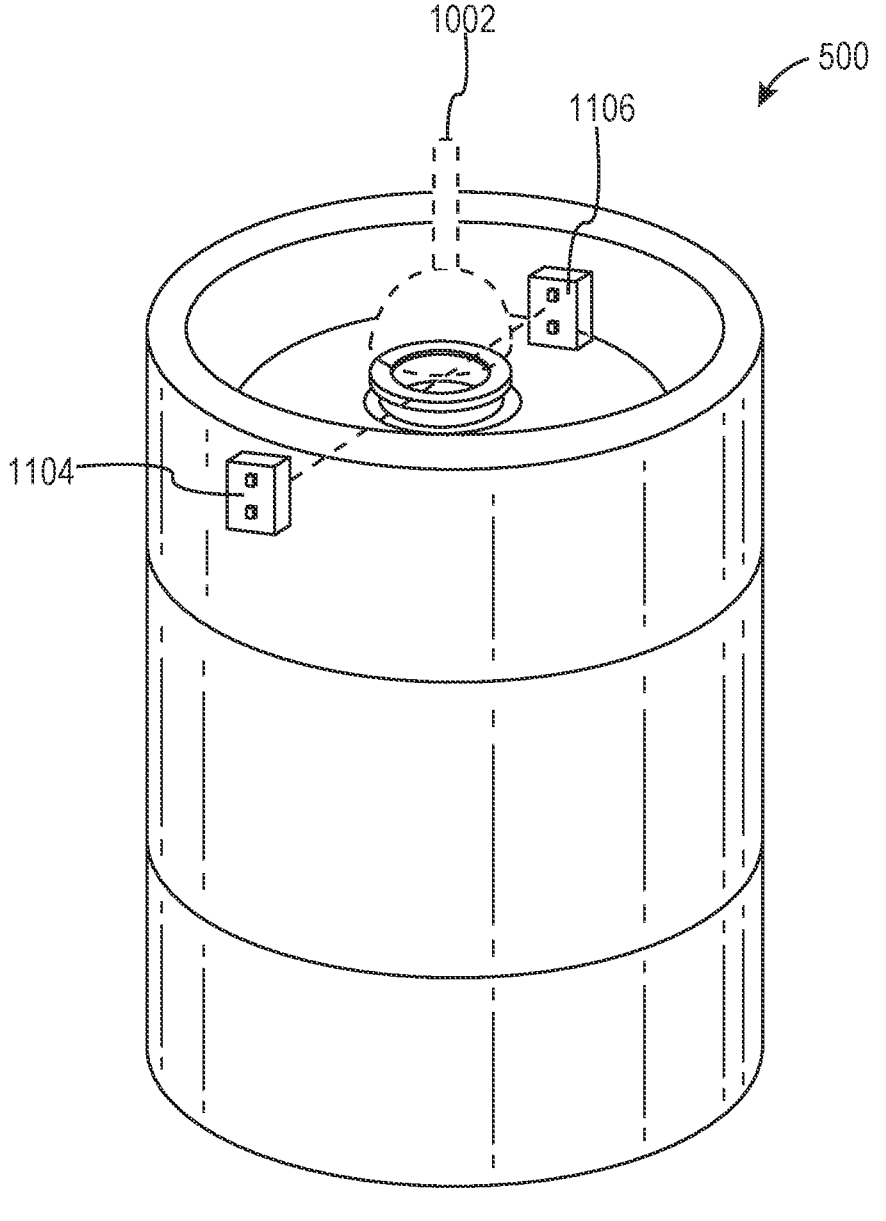
Figure 61B:
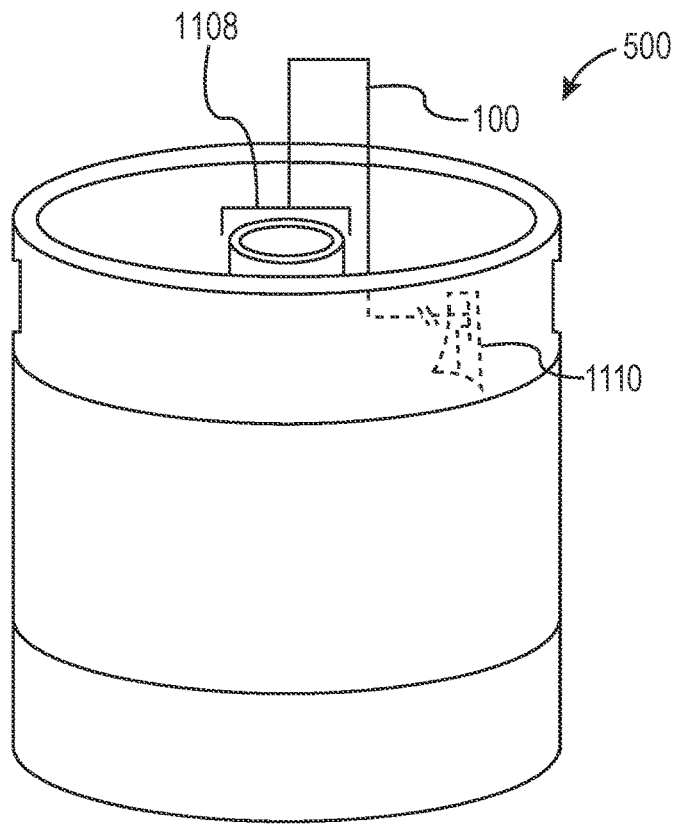
Figure 62:
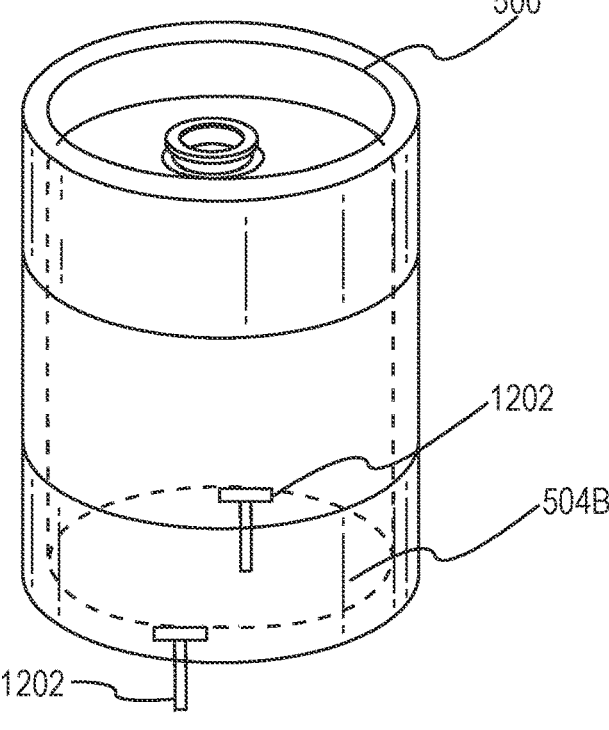
Figure 63A:
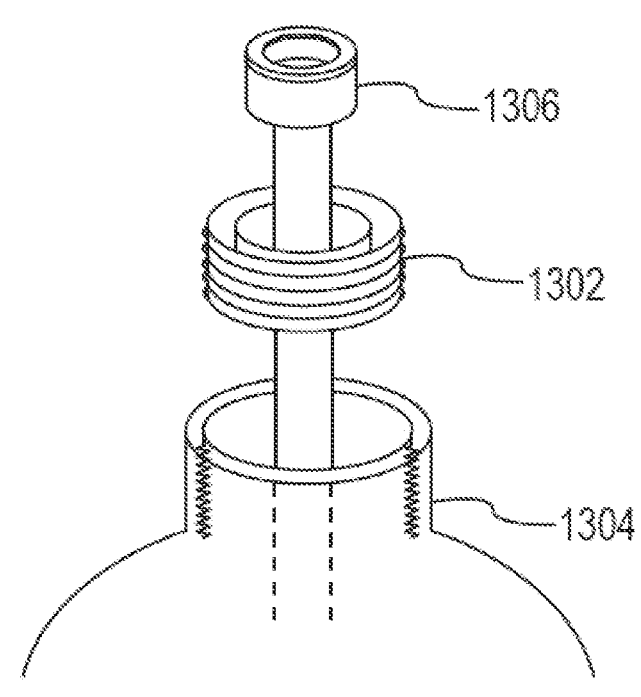
Figure 63B:
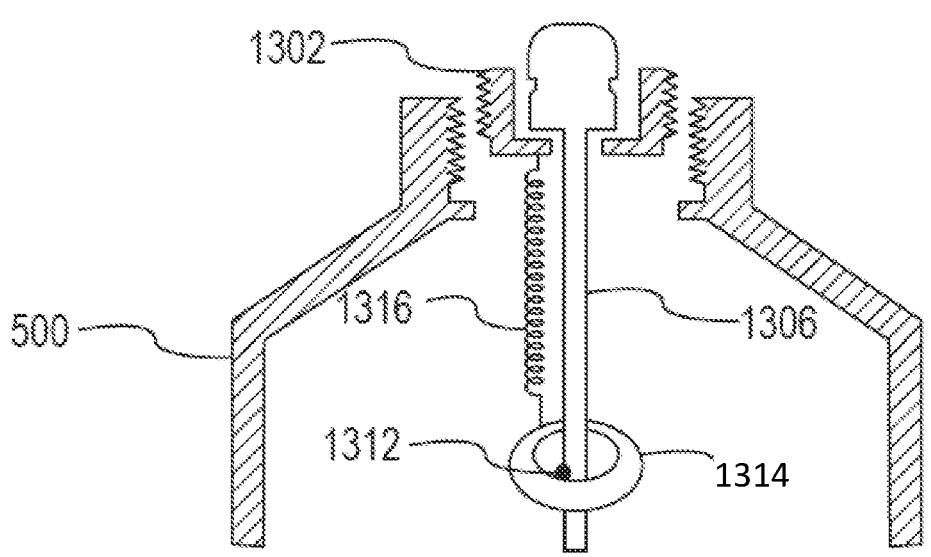
Figure 63C:
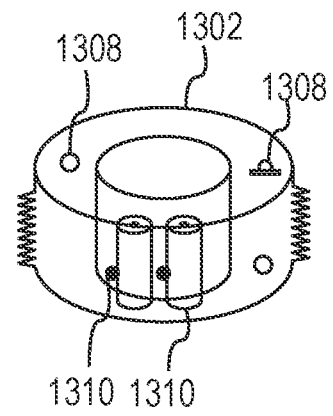
Figure 64:
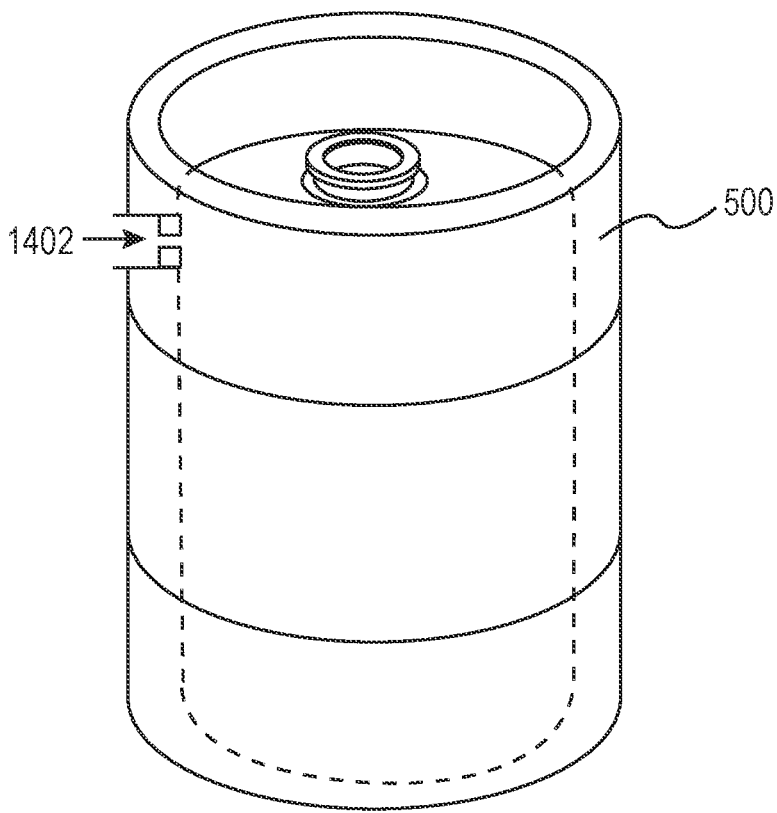
Figure 65:
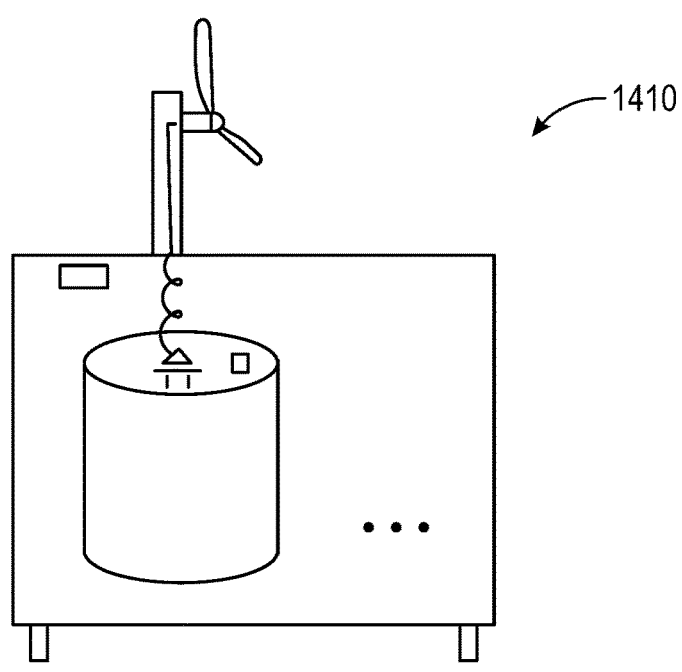
Figure 66:
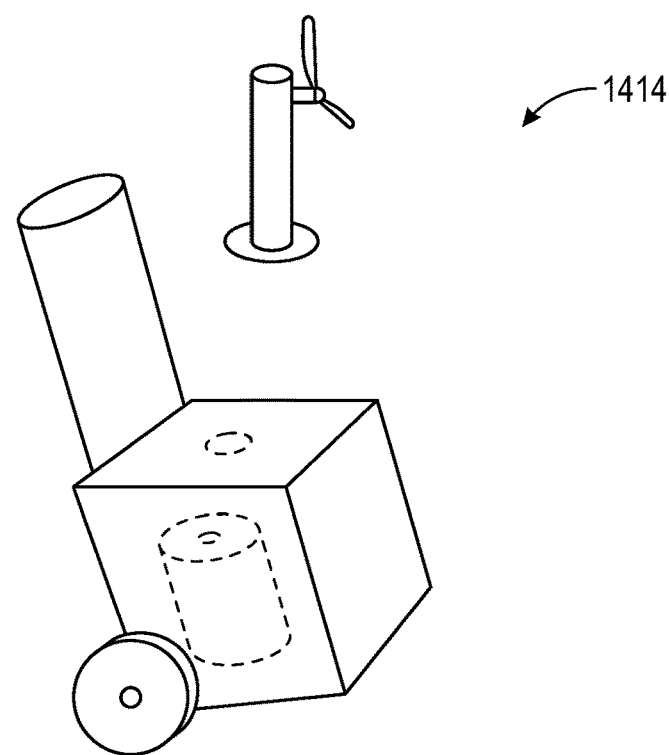

FIGS. 51A through 51D illustrate data as may be reported by software of the present;

FIG. 52 illustrates an account editor display of the system of the present;

FIG. 53 further shows information as may be generated by the system of the present disclosure in the delivery of numerous ones of the tap handle flow measuring and reporting apparatus;

FIG. 54 illustrates a a keg 500 for transporting liquids in a liquid product distribution network, according to an embodiment of the present disclosure;

FIGS. 55A-55G illustrate a sensing and reporting device installed in the chimes of the keg, in accordance with various embodiments of the present disclosure;

FIGS. 56A-56C illustrates mechanisms for recharging the battery power supply unit according to various embodiments of the present disclosure;

FIGS. 57A-57C illustrates mechanisms for replacing a non-rechargeable battery power supply unit according to various embodiments of the present disclosure;

FIG. 58 illustrates one or more sensors arranged in the top chime and/or bottom chime of the keg, according to an embodiment of the present disclosure;

FIGS. 59A and 59B illustrate mechanism for indicating a remaining life of a battery power supply unit, in accordance with various embodiments of the present disclosure;

FIGS. 60A and 60B illustrate means for determining stacking of a first keg on top of a second keg, in accordance with various embodiments of the present disclosure;

FIGS. 61A and 61B depict a mechanism for determining whether a tap or cap is secured at an opening of the keg, in accordance with various embodiments of the present disclosure;

FIG. 62 illustrates arrangement of load cells to determine a weight of the keg according to an embodiment of the present disclosure;

FIGS. 63A-63C illustrates a double neck fitting adapter and a float sensor for measuring a level of contents in the keg, according to an embodiment of the present disclosure;

FIG. 64 illustrates a sensor port formed in the top and/or bottom chime to allow for direct access to the liquid product contained inside the keg, according to an embodiment of the present disclosure;

FIG. 65 illustrates an under counter cooler cabinet used for storing kegs attached to faucets on the counter above, according to an embodiment of the present disclosure; and FIG. 66 illustrates a portable cooler which can contain one or more kegs, according to an embodiment of the present disclosure.

DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all the possible embodiments and contexts of the invention in this disclosure. Upon reading this disclosure, many alternative embodiments of the present invention will be apparent to persons of ordinary skill in the art.

FIG. 1 illustrates the architecture of the liquid product distribution network of the present disclosure. Liquid product distribution network (or distribution network) 10 is a system for monitoring, controlling and/or optimizing flow of products delivered to customers via containers that flow in a distribution network. Alternatively, distribution network 10 is a system for monitoring, controlling and/or optimizing use of equipment and/or resources that are spread out in a geographic area, move between or among locations, and have usage, contents, or other state information associated with them.

FIG. 1 shows distribution network 10 which may be considered to begin at keg 14 section 12, where kegs 14 and radio transmitter 16 may operate either alone or in conjunction with a below-explained and described tap handle flow monitoring and reporting apparatus. Note that the description of FIG. 1 in the presently disclosed embodiment may apply to a radio transmitter 16 positioned on a keg 14 or, as will be described more fully below, may apply to a tap handle flow monitoring and reporting apparatus. Radio transmitter 16 and a tap handle flow monitoring and reporting apparatus here disclosed may perform similar functions for monitoring, controlling and optimizing flow of products in a distribution network, such as a beer distribution network. Thus, radio transmitter 16 and the below-described tap handle flow monitoring and reporting apparatus may operate in coordination or separately. These initial aspects of the present description, accordingly, will focus on radio transmitter 16. Thereafter, a more detailed description of the tap handle flow monitoring and reporting apparatus will follow. So, both radio transmitter 16 and the structure and function of the herein described tap handle monitoring and reporting apparatus are within the scope of the inventions of this disclosure.

Referring further to FIG. 1, therefore, tap handles may represent the presence of each keg 14 section 12 a plurality of liquid product containers, here kegs 14, may become part of distribution network 10. Through use of radio transmitters 16 associated with kegs 14, a mesh network 18 results. Mesh network 18 has functions applicable to breweries 20, trucks 22, warehouses 24, cold rooms 26, restaurants 28, and vendors 30, and even event venues 32.

Sensors/data collection section 34 adjoins keg 14 section 12 as the next integral part of distribution network 10. At sensors/data collection section 34 may be several devices that receive the output from keg 14 section 12. Stationary reader 36 may receive information from mesh network 18, as may mobile devices such as mobile device 38, mobile device 40, and mobile device 42. Herein, sensing device 36/38 references either stationary reader 36 and/or mobile devices 38, 40, 42 as is most appropriate in the specific context.

Sensor/data collection section 34 also provides association via interface 44 with management software, such as ERP system software 46, POS system software 48, and CMS system software 50. ERP system software 46 provides functions of brewery management software. POS system software 48 provides functions of point-of-sale systems. And, CMS system software 50 provides customer management software functions for distribution network 10.

Server section 52 provides interface between distribution network 10 and the Internet 54. Using server computers 52, server section 52 makes accessible to distribution network 10 all the applications data and other resources that may be on the Internet and as may be applicable to the operation of distribution network 10.

Reporting/marketing/sales (RMS) section 58 provides accounting and management functions via mobile device 60, which may be any one of mobile devices 38, 40, or 42. In addition, computers such as desktop or a mainframe computers 62 may interface with distribution network 10 by communication with server section 52. Using our RMS section 58, breweries 20, distributors 64, vendors 30, and consumers 66 may benefit from the operation of distribution network 10.

Also, as may be considered either an adjunct or part of distribution network 10, there appears delivery section 68. Delivery section 68 may include numerous delivery trucks 70 equipped with various communications and display hardware 72 for communication with mesh network 18 and individual radio transmitters 16 affixed to kegs or handles 14.

In distribution network 10 system, radio transmitters 16 attach to kegs, handles 14 or other items being tracked. Kegs 14 being tracked are not fixed in geographic location, but move based upon the needs of the business tracking them, and so the transmitters move in geographic location. Stationary reader 36 and mobile devices 38, 40, 42 act as sensors and may or may not have fixed geographic locations.

Distribution network 10 software permits automatically reporting the location of each keg 14, as well as the state and/or the state of the contents of each keg 14, as well as the state and position of each handle. In many applications, keg 14 state/content tracking is more important than just keg 14 location. For example, in the brewing industry, keg 14 may go from "Empty" to "Filled With IPA" to "IPA at Distributor" to "IPA at Customer" to "IPA on Tap at Customer" to "Empty at Customer", etc. Distribution network 10 software automatically detects and updates the known state of the contents of each keg 14, as follows.

Example events that may influence the transition of state include: entering or exiting a geographic region; arriving near or departing from a stationary reader 36; receiving an input event from a related system; sensors on radio transmitter 14 itself; etc. Kegs 14 have wireless radio transmitters 16. The location of radio transmitter 16 on keg 14 may be at a variety of locations on keg 14, as may be more advantageous for sensor readings, accuracy of calculations and/or receiving the wireless signal. Radio transmitters 16 attach on the outside of keg 14 without modifying or penetrating it, and do not have a direct way to measure liquid level inside or weight of keg 14.

Distribution network 10 software does not have to collect all the measurements before computing a state transition. Distribution network 10 software may be distributed across multiple sensor radio transmitters 16, as well as multiple mobile devices 38, as well as stationary readers 36, as well as server computers 56 on internet cloud 54. Each of these is considered a node in distribution network 10. Any node in distribution network 10 may have authority to determine a state change of a keg 14 or mesh network 18 and then communicate the change to rest of distribution network 10. RMS section 58 permits arbitrating all such state changes and recording the ultimate state of kegs 14 or mesh networks 18 for reporting to a user.

There may be buffering/delay between triggering events in the operation of distribution network 10, and the ultimate propagation of state changes in the rest of distribution network 10. This is because collection from radio transmitters 16, sensing and/or gathering of data at stationary readers 36 or mobile devices 38, communication to a server section 52 may not occur in real time. For example, the sensing and/or gathering by stationary reader 36 may happen when there is no available connection to distribution network 10. In this case, the data is buffered until a connection is established, and then the keg 14 state changes propagate through distribution network 10.

Example applications that distribution network 10 enable include keg 14 and content tracking, delivery truck 70 communications, industrial or contractor equipment status and location tracking, shipments, tools and use, leased items, railroad cars, pets, shopping carts, portable toilets, storage containers, food or beverage or produce delivery containers, fuel cells or containers, etc.

Distribution network 10 enables optimization and efficiency in the delivery, pickup, and tracking of kegs 14 and/or keg 14 content. Tracking of kegs 14 and detailed knowledge of keg 14 contents makes possible automatic restaurant menu changes, automatic stock ordering, data for supplier manufacturing forecasts, automatic marketing and advertising messages, automatic and real-time inventory in warehouses and storage areas such as cold rooms, automatic check-in and check-out of containers, and optimization of replenishment delivery schedules and/or routing. Distribution network 10 also enables determining how long a keg 14 or similar piece of equipment has been in service for triggering maintenance schedules, automatically generate invoices, monitoring lease compliance, and generating alarms. Distribution network 10 further enables monitoring temperature of contents for legal and regulatory compliance, reporting a "good" state of keg 14 contents, as well as reporting over/under temperature procedures.

Wireless technologies which distribution network 10 may employ include Bluetooth, ZigBee, Wi-Fi, GPRS, GSM, CDMA, UltraWideBand, ultrasonic, infrared, etc.; example wired technologies which could be employed are Ethernet, optical, serial, etc. Wireless capability 38 means scanning of kegs and handles 14 may occur automatically, in the background, without any manual interaction.

Wireless scanning can occur at a distance without kegs or handles 14 being visible. Wireless scanning can occur at a distance without special equipment. Use of mobile devices 38 means anyone can detect kegs 14 within 100' radius, said radius depending upon exact capabilities of mobile device. Wireless capability allows real-time and automatic determination of container status without manual scanning. Wireless capability allows automatic and real-time determination of container locations without manual scanning. Radio transmitter may work even inside palletized and stacked collections of many kegs, or within drawers or boxes containing many handles 14.

By leveraging the known mobile devices 38, radio transmitter 16 does not need its own GPS and cell radios, allowing it to cost –$10 or less. Radio transmitter 16 does not require a monthly cell data plan, has a small form factor, and can run five years or more on typical lithium battery cells. By operating at least five years, the radio transmitter aligns with the normal five-year service cycle of kegs.

Radio transmitter 16 takes advantage of available connection points. If stationary reader 36 or mobile device 38 is nearby, radio transmitter 16 will default to communicate with that device. However, if neither is nearby, radio transmitter 16 may choose to upgrade communication to Wi-Fi. However, if Wi-Fi is not available either, radio transmitter 16 may choose to upgrade communication to cell data. In this way, communication is escalated to more expensive mediums only when required.

By using a "store and forward" function, distribution network 10 can send only summary information (for example, position once a day) over the cell data network, and save locally the entire history for uploading later when a less expensive (i.e., free) medium is available.

Point-of-sale terminal, POS 48, may provide sales data either directly to sensor/data collection section 34 or to Internet in server section 52. Server section 52 aggregates data and performs calculations to determine fill levels of each keg 14 and delivers resulting data and reports to breweries 20, distributors 64, vendors 30 and/or customers 66. Additionally, server section 52 performs actions based upon the determined fill data—for example, automatically reordering stock.

Available direct or indirect data communication mechanisms and/or protocols include wired, wireless, ad-hoc, peer-to-peer, audio, optical, radio, serial, TCP/IP, UDP, Ethernet, etc. Mobile device 38 may have a wireless connection to the internet (for example, Wi-Fi) while stationary reader 36 inside cold room of keg 14 section 12 may require a non-wireless connection (for example, Ethernet or serial line) due to the walls of a cold room shielding wireless communication.

Distribution network 10 permits the collection of delivery data. Each radio transmitter 16 has a unique ID, and can store information about a keg 14 to which it attaches either in its own memory, or on server computer 56. Such history includes the delivery date to a vendor 30, which product is in keg 14, what type of product it is, when it was brewed, when keg 14 was filled, which distributor 64 delivered the keg 14, temperature history, etc. If the data is stored on radio transmitter 16, another radio transmitter 16 may forward the data using the mesh network, and/or stationary reader 36 and/or mobile device 38 receives the data and sends it to server section computer 56; otherwise the data is already on server computer 56 and indexed by the unique ID. Additionally, location, market data, sales history and other information about a vendor 64 is stored on server computer 56. All this information is provided for the calculation of keg 14 fill level.

Distribution network 10 permits the collection of data on the location via stationary reader 36. By examining the wireless signals received from each keg 14, stationary reader 36 may determine the distance from each of its antenna(s) to each keg 14. This information can be used to generate a three-dimensional estimate of the location of each keg 14. stationary reader 36 is situated in a cold room to be able to determine the distance of each keg 14 from tap lines. Typically, stationary reader 36 might be placed near where the tap lines go through the wall of a cold room into the public dispensing area of vendor 30, and/or situated vertically to best measure stacked kegs 14 and/or kegs 14 on shelves. The location data is provided to the calculation of keg 14 fill level.

Distribution network 10 permits the collection of data on empty kegs 14. Typical cold rooms are crowded, and empty kegs 14 tend not to be stored in them. A keg 14 leaving the cold room is an indicator of whether the keg 14 is full or empty—has been tapped or not—and this data is provided to the calculation of keg 14 fill level.

Distribution network 10 permits the collection of data on distance. The distance of each keg 14 from the tap wall is an indicator of whether the keg 14 has been tapped or not, and this data is provided to the calculation of keg 14 fill level.

Distribution network 10 permits the collection of data on delivery date. Since kegs 14 are typically tapped in the order of delivery, delivery date is provided to the calculation of keg 14 fill level. Additionally, the delivery date provides a measurement of hysteresis to other events such as a keg 14 leaving the cold room.

Distribution network 10 permits the collection of data on radio transmitter 16. Distribution network 10 radio transmitters 16 may have additional sensors on them (such as temperature, shake sensor, etc.) and stationary reader 36 collects the data from these sensors and provides them to the calculation of keg 14 fill level.

Distribution network 10 permits the collection of data on inputs to the keg 14 fill level calculation. Stationary reader 36, mobile devices 38, and radio transmitters 16 permit the collection of data which is fed into methods that determine the fill level of each keg 14.

Distribution network 10 permits the collection of data on product information. Distribution network 10 knows the brand and product in each keg 14, and thereby the type of product (IPA, Pilsner, Porter, Bock, etc.). The brand, product, type of product, and current sales rate for each such product is provided to the calculation of keg 14 fill level.

Distribution network 10 permits the collection of data on keg 14 history. Server section 52 collects historical data (such as sale rate for each brand, product, type, etc.) for each calendar day (for example, workdays vs holidays) and day of week (for example, weekday vs weekend) and provides this to the calculation of keg 14 fill level.

Distribution network 10 permits the collection of data on vendors 30. Server section 52 stores information about each vendor 30 (e.g., zip code, historical sales data, etc.) and this data is provided to the calculation of keg 14 fill level.

Distribution network 10 permits the collection of data on handles, such as whether the handle is on a faucet, what position the handle is, when and how long the faucet is held open, etc.

Distribution network 10 permits the collection of the importance of each data item to the calculation of keg 14 fill level. Importance weights are calculated from the provided input values, and then applied to each input value along with threshold values to determine probability answers to the following questions:

Is the keg 14: (1) full and staged to be tapped; (2) actually on tap; or (3) emptied and off tap?

If (2) the keg 14 is on tap, how full is it?

If the keg 14 is not yet empty, when is it expected to be empty?

What is the rate of consumption of the product in each keg 14 at the Vendor 30?

A margin of error is also determined for the answer to each of the above, and the margin of error feeds back into the calculation. When the calculated probability answer is determined to be above a set threshold for each question, the question is considered to have the given answer.

Certain input data provides a verified answer to a question. For example, a keg 14 being returned to a distributor 64 after having been delivered to a vendor 30 and staying in the cold room long enough to be emptied, calculations could verify that keg 14 has been emptied. As kegs 14 are verified to have transitioned from being on tap to being emptied and off tap, the previous time estimates are compared against the actual time, and feedback is applied into the calculation to improve the estimates.

Distribution network 10 also supports actions that may be triggered based upon the results of the calculations. For example: automatic reordering; updating a web site or public display of the products on tap or scheduled to be on tap; notifying interested users of the current or expected states) of keg(s)—for example, notifying a sponsor of a keg 14 that their keg 14 is about to go on tap, is on tap, or has been emptied; feeding the rate of keg 14 emptying into product forecasts; etc.

An alternative embodiment of distribution network 10 may not include stationary reader 36. When it is not possible to install a stationary reader 36 inside a vendor cold room, radio transmitter 16 on the kegs 14 are able to act in a bi-directional mode. In this mode, data is communicated between the kegs 14 about their position and/or to determine their position in the cold room and/or calculate their fill level. Each keg 14 stores all or part of the data about the kegs 14 in the cold room, and later when a keg 14 leaves the cold room, the data stored on the transmitter is uploaded to server section

52. This upload could occur via a mobile device 38; automatically in the background by coming into proximity with an app a mobile device 38; automatically when the keg 14 encounters a stationary reader outside the cold room; when the keg 14 returns to distributor 64 or brewery 20; or by any other suitable contact with the radio transmitter 16.

FIG. 2 shows an exploded view of one embodiment of the radio transmitter 16 of the present disclosure. The assembly of radio transmitter 16 includes inner housing 81 which may cover printed circuit board (PCB)/battery assembly 82. Once assembled, inner housing 81 and PCB/battery assembly 82 may be positioned within outer housing 84. Note that FIGS. 2 through 7 show one possible housing; FIGS. 12 and 13, below, show another possible housing as collar radio transmitter 142.

FIG. 3 shows a three-dimensional view of the PCB and battery assembly of one embodiment of the present disclosure including components for performing the disclosed functions. FIG. 3 further shows the general construction for PCB/battery assembly 82 including battery 86, which affixes to PCB 94. On the opposite side of a PCB 94 from battery 86 appears sensors 90, which includes temperature and other sensors, and antenna 92. CODEC/DSP 96 may also be seen on PCB 88. FIG. 15, below, provides more explanation in detail regarding the electronic circuitry residing on PCB 94.

Radio transmitter 16 is less than 1" high so that it fits on bottom chime of keg 14, as shown below in FIG. 11A. The shape of the curve is optimized to fit three sizes of kegs. Radio transmitter 16 does not extend the boundaries of keg 14 in any dimension. As such, employing distribution network 10 requires no physical changes to the vendors 30 lines, valves, or handles.

Using rechargeable battery 86 allows the radio transmitter 16 to be completely sealed, where only electrical contacts on the outside provided to charge the battery.

Radio transmitter 16 includes a on board temperature sensor to monitor keg 14 temperature. A shake sensor determines if keg 14 is in transit. A sensor header 91 may also accommodate additional sensors. Antenna 92 orientation/polarization maximizes radio transmission strength from either the top or the bottom of keg 14. Battery 86 is sized to fit under keg 14 rim and to get at least a 5-year life. Battery 86 may be soldered to PCB 88 to reduce cost. Distribution network 10 measuring system is not continuously powered, thus saving power when not taking measurements.

FIG. 4 shows and assembled radio transmitter 16 according to the teachings of the present disclosure, wherein width 92 appears less than 1 inch in order that radio transmitter 16 may fit on either the top or the bottom chime of a keg 14. Radio transmitter 16 further includes a curved edge 94 that may fit at least three different types of known keg 14 configurations at points along curved edge 94. A single curved back mate to each size keg 14 at different points along the curve, and epoxy/foam tape takes up the small amount of space for each size. Attachment may be by either a rivet, such as at point 96, or by epoxy, such as at space 98, for securely positioning radio transmitter 16 on keg 14. Waterproof IP67 achieved by epoxy sealing halves as well as bonding to keg 14. This eliminates the need for O-ring or seals. Epoxy requires no surface preparation, reducing installation time and cost.

Outer housing 84 includes a "break away" layer to allow destructive prying of the tag loose from epoxy when battery 86 runs out. Airspace in inner housing 80 is minimized to achieve an air tight seal. Use of a very small, long "capillary" tube allows pressure venting if necessary while still maintaining waterproofness. Outer housing 84 includes a unique serial number, bar code, QR code, or other coding visible on its outer side. Note that the outer housing 84 serial number may be different from radio serial number to discourage spoofing. Outer housing 84 may include variety of tamper resistant mechanisms for preventing unauthorized removable of radio transmitter 16. Outer housing 84 may also include an integrated desiccant container for protecting against moisture condensation in varying temperatures.

FIG. 5 depicts an exemplary mode of attaching radio transmitter 16 of the present disclosure to keg 14 rim 100. For example, using an epoxy layer 102, attachment of radio transmitter 16 may be secure and waterproof to protect PCB/batteries assembly 82. Epoxy layer 102 may be applied to attachment space 98 which provides a small volume into which an enough proxy may be applied for a firm setting of radio transmitter 16 on keg 14 rim 100. By using the same epoxy that mounts housing to keg 14 to also seal the joint between housing halves, manufacturing steps can be skipped. Housing 84 allows radio transmitter 16 to interface with three dimensional curved keg 14 surfaces, maximizing adhesion and protection afforded by keg 14 chime, while minimizing heat or cold transfer from the keg 14 body. Housing 84 can be completely sealed but still able to be turned on when mounted.

An alternate switch configuration using a sticker to seal opening for pin which activates a switch to turn on radio transmitter 16 may be used. In this configuration, a one-time activation is not reversible. Similar pin holes also used to activate "connection mode" for maintenance of radio transmitter 16. Such a sticker may cover hole(s) and make a water tight seal; edges of a sticker protected by inset edge in outer housing 84 cut-away. Alternately, a waterproof on/off switch via screw can be used which activates hardware switch.

FIG. 6 shows an alternate switch configuration employing the keg 14 metal surface to turn on radio transmitter 16. Metal contact pins 104 and 106 may appear outside of inner housing 80 for connecting associated circuitry on PCB/battery assembly 82 for creating a conductive circuit. That is, contact pin 104 may make electrical contact with keg 14 rim 100, which permit electrical current flow to contact pin 106. The resulting circuit uses minimal voltage, and current to provide indication that radio transmitter 16 is firmly secured on the keg 14 rim 100. Note, also, that at attachment point 96, radio transmitter 16 may be securely positioned on keg 14 rim 100.

Radio transmitter 16 is protected under the existing rolled keg 14 rim 100. Pins contacting the metal shell of the keg 14 closes a circuit to activate a switch. The housing can be completely sealed but still able to be turned on when mounted. Using a rechargeable battery allows the unit to be completely sealed, and only electrical contacts on the outside provided to charge the battery. Providing and inductive loop, thermoelectric generator or other contactless charging mechanism allows the electrical penetration of the housing to be avoided, decreasing manufacturing cost, and allowing less precise interface between housing and charging station.

FIG. 7 shows an exemplary embodiment of an outer housing 84 for holding and securing the radio transmitter 16 to keg 14 rim 100. In FIG. 7, outer housing 84 secures to keg 14 rim 100 using screws or other fastening mechanism 108. Inner housing 80 may rest within outer housing 84 for securely positioning PCB/battery assembly 82 at keg 14 rim 100. In one embodiment, a permanent seat/shell 84 is permanently attached to keg 14, and inner housing 16 is a removable portion that can be serviced. Because radio transmitter 16 uniquely identifies the keg 14, distributor 64 and brand, the status of the keg 14 may be automatically relayed to brewery 20 or distributor 64.

FIGS. 8A through 8C depict a radio transmitter fixing mechanism for securing the radio transmitter of the present disclosure to keg 14 rim 100. In the example of FIGS. 8A through 8C, a hook mechanism 110 may engage an existing feature of keg 14, such as the handle opening or chime 114. Chime 114 is a constituent part of a keg 14 including rim 100, rolled edge 112 and keg 14 rim wall 114. Attachment mechanism 110 may be fixed in position between keg 14 top surface 116 and chime rolled edge 112 such that it cannot be removed without releasing the attachment mechanism. The mechanism expands into the space between rolled rim 112 and rim wall 114, and keg 14 body 116 and rim wall 114.

In another instantiation, hook mechanism 120 engages an existing feature on the keg 14 (such as the handle opening or the rim of chime). In another instantiation, the radio transmitter 16 attaches to keg 14 like a "secure bracelet" around a chime 122 opening in keg 14 rim 100, hook mechanism 120 is then used to secure back to itself or an extension of outer housing 84.

Radio transmitter 16 may also be mounted on chime 114 of keg 14, instead of the keg 14 body 116. The transfer of heat from the keg 14 body to chime 114 is along a seam, so heat transfers slowly and typical batteries 86 can be used. Radio transmitter 16 is protected under the existing rolled keg 14 rim 112 on either the top or bottom of keg 14. PCB/battery assembly 82 is designed to fit in both cases. For top chime attachment example, button cell batteries may be used. For a bottom chime (shown below), a cylindrical cell battery is used. Outer housing 84 has a curved back to mate well with chime 122.

FIG. 9 shows an alternative embodiment of the present disclosure wherein at keg rim 100 radio transmitter 16 may attach using a secure bracelet 118. Radio transmitter 16 attaches around keg 14 chime 122 of keg rim 114. Bracelet 128 passes through an opening of keg rim wall 114 and back onto itself have a fastening point 120 of radio transmitter outer housing 84 into which bracelet end 122 secures.

FIG. 10 depicts one embodiment of a fluid level measurement mechanism which includes the use of a battery powered ball 124 for determining the volume of beer 126 within keg 14. In this configuration, hermetically sealed ball 124 transmits a periodic signal wirelessly or mechanically that can be detected through the metal of keg 14. Ball 124 can withstand the high temperature cleaning cycle and the chemicals used in keg 14 preparation for reuse. By placing one or more detection or communication devices on the outside of keg 14, such as listening device 128 and/or 130, measuring characteristics of the receives signals, e. g., sound reflections, strength, harmonics, etc., the amount of air or liquid in keg 14 may be determined. Communication can be bidirectional wherein ball 124 may receive a signal wirelessly or mechanically transmitting from outside of keg 14. Using bi-directional communication, it is possible for the ball to store data locally; to perform reset functions; to measure received signals and modify the signal and return it back. The attenuation of a received signal due to the ball being in liquid vs. air helps determine volume of liquid in keg 14.

The ball may be battery powered or mechanically powered. An example mechanical power source could be a wound spring, or the expansion and contraction caused by the heating/cooling cycle for keg 14. With a measurement from fluid level measurement mechanism communicated via radio transmitter 16, distribution network 10 may automatically relay fill data to the correct brewery 20/distributor 64. The Distribution network 10 mechanism requires no changes to the vendors 30 lines, valves, or handles. The Distribution network 10 radio and sensor network can automatically relay fill data to the desired brewery 20 and/or distributor 64.

FIGS. 11A through 11C show various ways of securing embodiments of radio transmitter 16 and a volume monitoring device of the present disclosure. FIG. 11A shows the fill level detection device being small enough to fit on either top or bottom chime of keg (top preferred) and not directly contacting main vessel body. FIG. 11B shows the fill level detection device being attached to the outside of the keg, not penetrating the main keg body.

FIG. 11A shows radio transmitter 16 attached at keg 14 bottom 134 on the inner portion of keg 14 lower chime 136. Radio transmitter 16 can be hidden under keg 14 lower chime 136, where a person does not see it to know keg 14 is being tracked. Using the acoustic properties of keg 14, radio transmitter 16 and distribution network 10 may measure liquid level from the outside of the keg 14.

FIG. 11B shows one instantiation of flow detection fill sensor 138 for use with keg 14. In addition to radio transmitter 16, which may affix to sidewall 139 of keg 14, there appears microphone 138 forming part of a fill level measurement system for keg 14. Microphone 138 captures ambient noise. The captured ambient noise may be subtracted from the signal measured from keg 14 to isolate noise coming from inside keg 14. Distribution network 10 sound measuring system isolates acoustic measurements by using ambient noise cancellation while timing measurements to correspond with an acoustic impulse generated by the immediate keg.

FIG. 11C shows another embodiment of radio transmitter 16 as collar radio transmitter 142. Collar radio transmitter 142 may be placed around keg outlet 144 to measure fluid going through keg outlet 144. Collar radio transmitter 142 may also extend past the top of keg 14, either surrounding our extending the connection to keg 14. Collar radio transmitter 142 may be loose around keg outlet 144 to fall away from the keg 14 body during sanitation, i.e., when keg 14 is upside down. So, when keg 14 is hot from cleaning, collar radio transmitter 142 does not contact the main body of keg 14. When keg 14 is returned to an upright position, collar radio transmitter 142 falls back in place and contacts the main body for operational use. When keg 14 is in an upright position, collar radio transmitter 142 contacts the main body of keg 14 for generating acoustic impulse and/or measuring acoustic properties of keg 14. Keg 14 collar radio transmitter 142 may be loose to facilitate cleaning around and below it. By enabling easy cleaning around and below it, collar radio transmitter 142 allows a keg 14 owner to maintain a sterile environment for product entering and exiting keg 14 through keg outlet 144.

FIG. 11C presents an alternative embodiment of radio transmitter 16 of the present disclosure for securing to keg opening 144 at the top of keg 14. Collar radio transmitter 142 positions under keg cap 140. Keg cap 140 removes by using self-destructive tab 141 which releases cap but also makes cap unusable by peeling away side of keg cap 140. Collar radio transmitter 142 can sense whether keg cap 140 is present or not. The event of removal of keg cap 140 is used by distribution network 10. By using keg cap 140, distribution network 10 may determine with high probability if keg 14 has been put on tap. A vendor 30 will usually not remove keg cap 140 until the keg 14 is put on tap, because keg cap 140 keeps dirt and food out of the keg opening 144. Collar radio transmitter 142 secures to keg opening 144 by way of a friction fit or other flexible configuration 145 that secures collar radio transmitter 142 to keg opening 144 and prevents removal unless permitted by an authorized person. Such a securing mechanism may be a locking mechanism, ratcheting mechanism, hidden tabs or other friction mechanism that prevents removing collar radio transmitter 142. By allowing collar radio transmitter 142 to be locked, distribution network 10 can insure that collar radio transmitter 142 is in place, except during maintenance by authorized person. Collar radio transmitter mates 142 mechanically with the top surface of keg 14 and the keg opening 144 so that it can withstand impacts and loadings associated with normal existing handling of full or empty kegs. Collar radio transmitter 142 does not extend the existing boundaries of keg 14 so that it may be handled and stacked normally. No changes are required to the vendors 30 lines, valves, handles or processes; distributors 64 pallets or processes; delivery truck 70 equipment or processes; or the brewery 20 automated fill and cleaning equipment, storage systems or processes.

Collar radio transmitter 142 may also have additional functionality beyond functionality residing in the present embodiment of radio transmitter 16. The additional volume of collar radio transmitter 130 makes possible and ever expanding set of functions and supporting electronics for collar radio transmitter 142 to operates within distribution network 10.

FIG. 12 illustrates an embodiment of an authenticated attachment mechanism 160 for securing radio transmitter 16 to keg 14. Authenticated attachment mechanism 160 provides a secure attachment of radio transmitter 16 to keg 14, while allowing nondestructive detaching/replacement by only authorized parties.

Authenticated attachment mechanism 160 operates within radio transmitter 16 outer housing 84 and attaches to hook and catch 162. Mechanical hook and catch 162 provides a permanent fixture for securing radio transmitter 16 to keg 14. The hook 162 is hidden from external tampering—only an internal actuator (electromagnet, motor, etc.) can disengage the hook. Engagement arm 164 inserts into recess 166 with a spring force from spring 168. Engagement arm 164 actuates under control of actuator 170 to withdraw from recess 166 in response to a signal from CPU 172. Antenna 174 may receive an actuation signal from an external source for actuating engagement arm 164 under the control of CPU 172. Battery 86 may provide actuation power for CPU 172 operation to control actuator 170. Authenticated attachment mechanism 160 further provides external voltage pads 180 that permit electric power to enter outer housing 84, allowing the internal actuator circuit to be powered temporarily in the event of batter failure or for charging rechargeable battery 86. These pins are electrically isolated from the battery to prevent current leakage. Alternatively, digital connection 182 may provide an optional digital signal input for control of CPU 172 for actuator operation.

Authenticated attachment mechanism 160 allows a distributor 64 or vendor 30 or event venue 32 to place radio transmitter 16 on kegs 14 only while they are in their possession and remove them before kegs are returned and no longer in their possession. Authenticated attachment mechanism 160 may require a secret digital passkey to actuate engagement arm 164. A digital secure key is transmitted to radio transmitter 16 wirelessly via antenna 174. CPU 172 verifies the digital secure key by several possible means. By using a digital key as opposed to a mechanical key, no water entry points are introduced into outer housing 84, the space of a mechanical key is avoided, and manufacturing cost is reduced. By using a digital key, every keg 14 may/can have a unique digital lock code, and digital keys are easy to manage using software.

A secure mechanism requiring a secret digital passkey is used to latch radio transmitter 16 to keg 14. By using a digital key, no water entry points are introduced, the space of a mechanical key is avoided, and manufacturing cost is reduced. By using a digital key, every keg 14 can have a unique digital lock code, and keys are easy to manage using software. Breaking one lock does not expose any other locks.

FIG. 13 presents a radio transmitter electronic circuitry 190 block diagram according to a preferred embodiment of the presently disclosed system. Radio transmitter electronic circuitry 190 includes radio/processing module 96 which connects to temperature sensor 192 and CODEC/DSP 194. The analog-to-digital circuit (ADC) 196 of radio/processing module 96 receives output 198 from temperature sensor 192. Also, through general purpose input/output (GPIO) 200, radio/processing module 96 provides collector voltage (VCC) 202 to temperature sensor 192. At VCC 204, rechargeable battery 86 provides 2- to 3-volt operating power to radio/processing module 96. CODEC/DSP 194 interfaces radio/processing module 96 at inter-integrated circuit/serial peripheral interface (I2C/SPI) 206 of radio processing module 96 with I2C/SPI interface 208. Through inter-integrated circuit sound/general purpose input-out (I2S/GPIO) interface 210, radio/processing module 96 interfaces I2S/GPIO interface 212 of CODEC/DSP 194. CODEC/DSP 194 connects to transducer 148 via digital to analog converter interface (DAC) 214. Also, CODEC/DSP 194 interfaces microphone/sensor 150 at ADC interface 216. Antenna 174 provides input to Rf Interface 218.

Radio transmitter electronic circuitry 190/305 leverages mobile devices 38 to 42 and stationary readers 36 of distribution network 10 to not need separate GPS and cell radio circuitry. The result is that radio transmitter 16 achieves a production cost of approximately $10 or less. Moreover, for operation of distribution network 10, radio transmitter 16 does not require a monthly cell data plan, has a small form factor, and may run five years on typical lithium battery cells. By operating five years, radio transmitter 16 allows distribution network 10 to align with the normal five-year service cycle of kegs 14 from most breweries and distributors. The radio design of radio transmitter 16 also may work inside stacks of metal kegs, as discussed in more detail below.

Radio transmitter electronic circuitry 190/305 includes firmware capable of operating in several modes. (The notation 190/350 represents alternatively either radio transmitter electronic circuitry 190 or radio transmitter electronic circuitry 350, as referenced above.) In a preferred embodiment, radio transmitter electronic circuitry 190/305 operates in a non-connectable mode upon deployment for security and battery life preservation. Radio transmitter electronic circuitry 190/305 enters a connectable mode only either temporarily during boot or via switch/pad on PCB 88. Radio transmitter electronic circuitry 190/305 protects communication by asymmetric encryption and authentication and provides secure communication without pairing. Radio transmitter electronic circuitry 190/305 may also operate in a connectable mode for pairing using a passcode that is generated algorithmically based upon broadcasted major, minor numbers and shared secret. This mode may optionally use timestamp, serial number of board, etc. Radio transmitter electronic circuitry 190/305 may further operate in a connectable mode for updating the radio transmitter 16 serial number and other parameters after manufacturing, but before deployment.

Distribution network 10 accommodates a variety of roles for various devices/components. Such devices include radio transmitter 16, collar radio transmitter 142, stationary reader 36, mobile devices 38 and 60, server computers 56, and RMS section computers 62. Here functions are described as appropriate for the various devices/components capable of performing such functions.

A device operating as a central device scans for advertisers and can initiate connections. Such a device operates as a master in one or more connections. Good examples are mobile devices 38 and computers 62. This means that the device roles used for established connections are the peripheral and the central roles. The other two device roles are used for one-directional communication. A broadcaster function applies to a non-connectable advertiser, for example, a temperature sensor 192 that broadcasts the current temperature, or a radio transmitter 16. An observer function scans for advertisements, but cannot initiate connections. This could be a remote display on a mobile device 38 that receives the temperature data and presents it, or tracking the radio transmitter 16.

When using Bluetooth, two important device roles for radio transmitter 16 applications are peripheral and broadcaster. Both send the same type of advertisements except for one specific flag that indicates if it is connectable or non-connectable. A Bluetooth low energy solution is a possible solution for radio transmitter 16, because it is low power and the eco-system is already deployed in most smartphones or other Bluetooth Smart Ready enabled devices on the market. The low-power consumption is achieved by keeping the transmission time as short as possible and allowing the device to go into sleep mode between the transmissions.

The non-connectable radio transmitter 16 may be a Bluetooth LE device in broadcasting mode. It simply transmits information that is stored internally. Because the non-connectable broadcasting does not activate any receiving capabilities, it achieves the lowest possible power consumption by simply waking up, transmit data and going back to sleep. This comes with the drawback of dynamic data being restricted to what is only known to the device, or data being available through external input from example serial protocols (universal asynchronous receiver/transmitter (UART), serial peripheral interface (SPI), universal serial bus (USB), and so forth). Bluetooth LE used in broadcast mode, however, does not natively implement the encryption nor authentication mechanisms required for secure communication by radio transmitter 16.

Radio transmitter 16 may also be a Bluetooth low energy device in peripheral mode, which means that it cannot only transmit, but also receive as well. This allows a central device (for example, a mobile device 38) to connect and interact with services implemented on radio transmitter 16. Services provide one or more characteristics that could be modified by a peer device. One example of these characteristic could be a string of data that represents the broadcasted information. This way, it is possible to have a configurable radio transmitter 16 that is easily updated over the air.

FIGS. 14A and 14B portray various hardware for use on a delivery truck operating within distribution network 10 of the present disclosure. Truck 70 may be any type of delivery truck capable of delivering numerous kegs 14 for populating keg 14 section 12 of liquid product distribution network 10. In delivery section 68, truck 70 also includes the ability to interface with radio transmitter 16 or collar radio transmitter 142.

The interface for which truck 70 is capable derives from truck reader 230 which may be positioned beneath seat 232. Truck reader 230 is a communications device that connects with various antenna including cell antenna 234 or Bluetooth antenna 236, for example. Moreover, truck 70 may use GPS antenna 238, OBD2 connection 240, and/or Wi-Fi antenna 242. FIG. 14B shows an alternative configuration whereby tablet 244 may provide various functions associated with controlling delivery operations and monitoring delivery operations consistent with the optimal operations of liquid product distribution network 10.

If truck 70 is parked in range of home office Wi-Fi, updates can be batch downloaded via Wi-Fi when truck 70 returns to home office. This may save cell phone data charges. Hardware is designed with a main processor in a housing with the GPS antenna 238, Wi-Fi antenna 242, Bluetooth antenna 236 and cellular connection either located internally or externally via wires to enable remote antenna placement. Truck reader 230 optionally connects to vehicle's OBD2 connection 240 for power and/or diagnostic data. Each of the four antennas can be internal or external—external via wires allows flexible placement.

Truck reader 230 allows real-time inventory by putting the antennas at the end of wires. Truck reader 230 main unit can be hidden and/or made secure under the dash or seats 232. By connecting the ODB2 port 240 in truck 70, truck reader 230 is easy to install and can collect mileage, speed and other data from the vehicle. By integrating Wi-Fi antenna 242, truck reader 230 may perform a "store and forward" function of collecting data during the day and automatically download it at night when truck 70 returns to base. Wi-Fi antenna 242 may also operate as a Wi-Fi access point inside truck 70. As such, tablet 244, for example, may have an internet connection as truck 70 drives around. The truck 70 driver's cellular phone can also use Wi-Fi antenna 242 to incorporate security, logging and firewall features.

Using truck 70 as a Wi-Fi access point, truck reader 230 may send messages, alerts, instructions, new routes to the driver in real time. As a Wi-Fi access point, truck 70 may connect a display to the tablet 244 to display maps, instructions, alerts and other data to the driver. Truck reader 230 system acts as a knowledge base for delivery drivers, enabling them to keep track of information they need to make deliveries. Such information may include instructions on where to park, lock codes or access codes, best time of day to make deliveries, customer contacts and instructions, etc. Distribution network 10 system may use truck reader 230 to provide real-time monitoring of trucks and drivers. For example, truck reader 230 may permit determining which driver is nearest to a required delivery, whether drivers stay on their routes or make unscheduled stops, etc.

Truck reader 230 may act as a Wi-Fi hotspot, allowing connected clients to access the Internet over the cell modem connection. Normal Wi-Fi password protection and encryption is used to prevent unauthorized use of the connection. When acting as a Wi-Fi hotspot, tablet 244 is used as the screen/GUI. This allows sophisticated mapping, routing, invoicing and other functions to be written on the tablet and integrated with truck reader 230 sensor data.

The truck reader 230 may function independently of any mobile devices (phones, tablets) in truck 70. Software on truck reader 230 and on tablet 244 can communicate with each other and divide computation, communication, and display processing. Depending on tablet 244 capability, truck reader 230 offloads functions to the tablet, and vice-versa. For example, 244 includes a cell modem connection to the Internet, software on tablet 244 may receive keg 14 data and transmits such data to server section 52 of distribution network 10.

Truck reader 230 software may determine when kegs 14 come in range (i.e., get loaded on vehicle) or go out of range (i.e., are delivered from truck 70). By accessing the known history of a keg 14 from radio transmitter 16, truck reader 230 may determine whether an empty is being picked up or a full being delivered. Truck reader 230 allows real-time inventory of a truck. By putting the antennas at the end of wires, truck reader 230 may be hidden and/or made secure under the dash or seats. By connecting the ODB2 port 240 in truck 70, truck reader 230 is easy to install and can collect mileage, speed and other data from truck 70.

Hand-offs between radio transmitters 16 and locations can determine state changes. For example, if a keg 14 was detected by a cold room stationary reader 36, but then is no longer detected by that stationary reader 36, and then is detected by truck reader 230, might cause a state change to "being delivered."

As further example, distribution network 10 system may have determined a keg 14 has been delivered to a vendor 30, such as a restaurant or bar, but may not know which vendor 30 or exactly when. When a mobile device 38 detects the presence of the keg 14 at a location, distribution network 10 then determines which vendor 30 the keg 14 went to, and can retroactively determine the delivery schedule and other information because it now knows which vendor 30 received the keg 14.

Distribution network 10 software reports truck 70 driver activity back to a distributor 64 home office, which information may include unscheduled stops, driving speed, etc. Distribution network 10 software allows remote management and monitoring of truck reader 230. When a truck 70 driver visits a known account, the last inventory at the account can be viewed by the driver on tablet 244, for example. Distribution network 10 software automatically manages deposit information, such as how many kegs 14 are at each keg 14 section 12 location, and determines that keg 14 section 12 location's rolling deposit fee. The deposit information automatically propagates back to invoices, accounting, etc. and may be used as a double check against the truck 70 driver's entered data.

FIG. 15 provides various example events that may influence the transition of keg 14 states as monitored kegs 14 18 move from various geographic regions in distribution network 10. In FIG. 15, kegs 14 A, B, and C, represent the liquid product containers within keg 14 section 12. Items 1 30 through 7 254 represent various mobile devices 30 and stationary readers 36, etc. Region X 244, region Y 246, and region Z 248 represent geographic regions participating within distribution network 10.

By collecting data on the location and history of kegs 14 and handles, distribution network 10 determines state transitions. Some of the state transitions are determined retroactively. For example, a lack of readings after a period of time may retroactively determine a state transition that occurred at the beginning of the period. Hand-offs between radio transmitters 16, stationary readers 36, and mobile devices 38 can determine state changes. For example, a keg 14 that was detected by a cold room stationary reader 36, but then is no longer detected by that stationary reader 36, then is detected by a truck reader 230, might cause a state change to "being delivered."

Distribution network 10 may have determined a keg 14 has been delivered to a vendor 30 (i.e., customer such as restaurant/bar), but may not know which vendor 30 or exactly when. When a mobile device 38 detects/contacts the presence of the keg 14 at a location, distribution network 10 then determines which vendor 30 received the keg, and can retroactively determine the delivery schedule and other information because it now knows which vendor 30 received the keg 14.

Using the store and forward function, a mobile device 38 may download historical information from the radio transmitter 16 when it detects the radio transmitter 16 at a vendor 30. Using mesh network 18 and store and forward at a vendor 30, an arriving keg 14 18 can communicate its arrival to the other kegs 14 at the vendor 30. When one of the older kegs 14 leaves the vendor 30 and returns to the brewery 20, it forwards the information from the keg 14 that newly arrived while it was at the vendor 30.

Because radio transmitter 16 uniquely identifies the keg 14, distributor and brand, the status of the keg 14 can be automatically relayed to the brewery 20 and/or distributor 64. The distribution network 10 mechanism for determining how full is each keg 14 attaches to the keg 14 and does not require shifting of kegs 14 on scales. Distribution network 10 uses the communications of radio transmitter 16 and stationary reader 37/mobile device 38 to automatically relay fill data to the correct brewery 20 and/or distributor 64.

Referring further to FIG. 15, distribution network 10 performs particularly attractive operations upon entering or exiting a geographic region. Geographic regions are defined such that when a sensing device 36/38 is within a region locates or otherwise detects a radio transmitter 16, the keg 14 to which the radio transmitter 16 attaches may be considered to have "entered" the geographic region. This decision may be based upon the relative locations of both the keg 14 and the sensing device 36/38 relative to the Region.

In FIG. 18, keg 14 A 14 is detected by sensing device 36/38 1 to be inside Region X; likewise keg B 14 is detected by sensing device 36/38 7 to be inside Region Y. If a sensing device 36/38 is determined to be in a region, but items are not detected, then any items that were previously determined to be in the region may be determined to have "exited" the region. In FIG. 15, sensing device 36/38 5 is inside Region Z but keg C 14 is not detected. Hysteresis may be applied to allow time for keg C 14 to be detected or not detected. Stationary reader 36/mobile device 38 6 can detect keg C 14, but is not within a defined geographic region, so sensing device 36/38 6 confirms keg C 14 is no longer in Region Z. At any given time, a sensing device 36/38 may be able to detect or not detect multiple kegs 14, and may be in or not in any number of (possibly overlapping) regions.

Depending on the geographic region the detection occurs within, how far away from the sensing device 36/38 the keg 14 is determined, etc., the distribution network 10 software determines which state transitions should occur. A geographic location can be determined by several factors: the GPS reading on a sensing device 36/38; the Wi-Fi network the sensing device 36/38 is near or connected to; being "near" to another sensing device 36/38 that has a predicted location; detection of wireless networks or topologies, triangulation using signal strength, etc.

Triangulation can be used to pinpoint location. For example, the received signal strengths of a radio transmitter 16 at one or more receiving stations are correlated to determine the most accurate location of the transmitter in relation to the stations. The receiving stations may be nodes in a wireless distribution network, and therefore knowing the node and received signal strength at that node allows determination of a probability distribution for the location of the radio transmitter 16. This probability distribution can be influenced by additional data such as known locations of buildings or other interference structures, data packet loss, vehicle speed, received signal strength of additional transmitters, relative location of other nearby items, "crowdedness" of items, etc.

In some cases, the location of a sensing device 36/38 may be assigned a static location (for example, if the sensing device 36/38 is not expected to move). In this case, any items coming within a certain distance of the sensor could change cause a state change for the item.

Distribution network 10 software has a programming interface through which it can retrieve and/or receive updates from other systems or input methods. These updates may cause a change in state. Example systems and input methods are automated assembly lines; content filling systems; point of sale systems; shipping and receiving systems; etc. The data from these input methods may be combined with any of the other detection mechanisms to reach a conclusion. For example, if the shipping system indicates five kegs 14 were picked up, and simultaneously five items were detected to leave a geographic region, then distribution network 10 may decide those five kegs 14 were the kegs 14 picked up, and add the serial numbers of the kegs 14 to the shipping invoice.

Keg 14 serial numbers can be automatically and accurately correlated with no manual labor. Deposits can be automatically and accurately correlated with no manual counting. Inventory is maintained accurately and automatically with no manual counting. Keg 14 contents, fill dates, etc., can be easily looked up using a normal mobile phone without any manual scanning or searching. Kegs 14 can be automatically and accurately flagged for service based upon number of turns in the field. Distribution network 10 automatically reports back where each keg 14 is and how full it is without any manual checking. By collecting data on the location and history of kegs 14 and/or handles, distribution network 10 system determines state transitions. Some of the state transitions are determined retroactively. For example, a lack of readings after a short while may retroactively determine a state transition that occurred at the beginning of the period.

FIG. 16 shows the arrangement of various kegs 14 on an exemplary weighing mat 250 for use in distribution network 10. The mat may be constructed to have predetermined locations for kegs, or allow kegs to be arbitrarily positioned. On weighing mat 250 appear predetermined keg 14 locations 252 on which to store a keg

14. Design 254 depicts the use of a distributor 64 or brewery 20 logos upon which to position keg 14. Design 254 indicates that the keg 14 contains beer of the company whose logo appears on mat location 252.

Weighing mat 250 provides a thin, stationary cushion or surface upon which may be placed under one or more kegs 14 and integrates with shelving (or the floor) unobtrusively. Weight mat 250 allows kegs 14 to be shifted around arbitrarily within a cold room or other keg 14 section 12 location. Weight mat 250 may integrate branding so that a given type of keg 14 is correlated to location 252. A brewery 20 can sponsor their portion of weighing mat 250, allowing the total area of weighing mat 250 to build up over time. Weighing mat 250 determines wirelessly using radio transmitter 16 where kegs 14 are on weighing mat 250, to determine which exact keg 14 is being weighed. Weighing mat 250 has a low profile (less than 1") so that existing vendor 30 shelving units can be used. Weighing mat 250 preferably has a sloped front edge so that kegs 14 may be easily slid a top surface. Weight mat 250 may have one or more ridges/grooves corresponding to multiple keg 14 sizes or layout positions. Weight mat 250 does not have to be square, and may be round or hexagonal to facilitate densely packing kegs 14 in many different varieties of cold room spaces.

Areas of weighing mat 250 that may be printed with a supplier's logo help a vendor 30 keep track of which kegs 14 go to which draft handles inside a bar. Logo 254 also allows a brewery 20 or distributor 64 to give/sponsor a weighing mat 250 when the vendor 30 signs up for a supplier account. Weighing mat 250 easily mates to adjacent mats so kegs 14 may be slid front to back across weighing mats 250 and side to side across weighing mats 250. The edges of weighing mat 250 can incorporate electrical connections to transmit data between weighing mats 250. Weighing mat 250 may be sized to accommodate several kegs 14 on a single weighing mat 250, each keg 14 being weighed separately. Weighing mat 250 determines wirelessly using radio transmitter 16 where kegs 14 are on the mat, to determine which exact keg 14 is being weighed.

Using store and forward, a mobile device 38 may download historical information from the radio transmitter 16 when radio transmitter 16 detects mobile device 38 at a vendor 30. Using the mesh network 18 and store and forward at a vendor 30, an arriving keg 14 can communicate its arrival to the other kegs 14 at the vendor. When one of the older kegs 14 18 leaves the vendor 30 and returns to the brewery 20, mesh network 18 forwards the information from the keg 14 that newly arrived while it was at the vendor 30.

FIG. 17 illustrates improved keg 14 use, monitoring, and reporting between operations that occur in a cold room 278 and operations that occur in a public room 279, such as a restaurant or other location. FIG. 17 shows the interaction between cold room 278 of keg 14 section 12 wherein mesh network 18 of kegs 14 may be positioned over weighing mat 250 for reporting and communicating with public room 279 to provide correlation between the operation of tap handles 260 in public room 279 and beer kegs 14 within keg 14 section 12 of cold room 278. Alternatively, keg 14 collar 142 may provide the functions of weighing mat 250 instead. Moreover, within public room 279, there is an indication of a transaction that distribution network 10 enables to promote a point of sale (POS) 262 transaction. The POS transaction makes use of the information relating to the status of kegs 14 within cold room 278 and provides input for users to make purchasing and other decisions regarding consuming different beers according to the status of kegs 14.

By correlating the decrease in keg 14 levels with an increase in drink purchases, distribution network 10 enables determining which consumers 66 purchased from which keg 14. Once the keg 14 is determined, then it is possible to know brewery 20, type of beer, date brewed, etc. as herein disclosed.

By correlating consumer 66 location against keg 14 location, it is possible to notify the consumer 66 when a keg 14 of their favorite beer goes on tap 260; where is the nearest public room 279 to purchase that glass of beer; how long that beer is likely to be on tap 260, i.e., how full is the keg 14, or if the keg 14 is no longer available, as well as how fresh is the beer, by when it was brewed.

When a limited supply keg 14 goes on tap 260, the action of the handle being placed on the faucet 260 can trigger alerts to consumer 66 indicating the keg 14 is now available. Distribution network 10 can indicate other beers currently available on tap that are similar to what consumer 66 likes/has purchased before/what their friend likes/what others are drinking/what is popular/what is freshest/what has aged longest/what is seasonal or special/what is from a local brewery 20/what is from a faraway brewery 20/what has special ingredients/what is of limited supply.

Distribution network 10 can indicate other beers currently being sold via a handle on a faucet 260 that are similar to what consumer 66 likes/has purchased before/etc. thereby introducing consumer 66 to new breweries. Distribution network 10 can indicate the brew date of each beer, how long it has aged, how long it has been on tap, etc.

Distribution network 10 can recommend locations based upon beer types available. When a consumer 66 enters a public room 279 using POS function 262, the fact that the consumer 66 is within range of a keg/handle 14 is determined. This is used to determine when consumer 66 arrived and/or departed the location and can be correlated to the marketing done to that consumer 66. By correlating consumer 66 purchase of product against marketing done to consumer 66, it is possible to determine marketing effectiveness. The effectiveness can be calculated automatically, and future selection of marketing messages or processes determined automatically.

By correlating decreased keg 14 levels with drink purchases, it is possible to determine which consumer 66 purchased from which keg. Once the keg 14 is determined, it is then known brewery, type of beer, date brewed, etc.

By correlating consumer 66 location against keg 14 location, it is possible to notify consumer 66 (1) when a keg 14 of their favorite beer goes on tap; (2) the nearest location to purchase a glass of beer; (3) how long the beer is likely to be on tap (i.e., how empty the keg 14 is); (4) the keg 14 is no longer available; (5) how fresh the beer is (i.e., when it was brewed)

When a limited supply keg 14 goes on tap, the action of going on tap (i.e., the handle going on the faucet) can trigger alerts to consumer 66s indicating the brand represented by keg/handle 14 is now available. Distribution network 10 can indicate other products currently available on tap that are similar to what consumer 66 likes or has purchased before; what friends of consumer 66 like; what other consumers 66 are drinking; what is popular at this location or nearby; what is freshest at this location or nearby; what product has aged longest; what product is seasonal or special; what product is from a local brewery; what product is from a faraway brewery; what product has special or specific ingredients; what product is of limited supply; etc.

Distribution network 10 can indicate other beers currently available on tap (i.e., other handles being used) that are similar to what consumer 66 likes/has purchased before/etc. thereby introducing consumer 66 to new breweries. Distribution network 10 can indicate the brew date of each beer, how long it has aged, how long it has been on tap, etc.

Distribution network 10 can recommend locations based upon beer types available. When consumer 66 enters a location/event using Distribution network 10 kegs, the fact that consumer 66 is within range of a keg 14 is determined. This is used to determine when consumer 66 arrived and/or departed the location and can be correlated to the marketing done to that consumer 66.

A brewery can allow consumer 66 to "sponsor" a keg/handle 14 such that the consumer 66 is notified where the keg 14 travels, when it arrives locations, etc. If the consumer 66 wants to sponsor a keg 14 with a certain type of beer only, a container can be allocated to his sponsorship at every brewing, so it appears he "owns" a specific keg, even if the actual container is different at each brewing. This allows a brewery to rotate their kegs 14 normally while still allowing the consumer 66 to perceive they are sponsoring a single keg.

FIG. 18 depicts an exemplary stationary reader 36 for radio transmitter 16 detection and measurement according to the present disclosure. Stationary reader 36 includes yellow LED 270 and red LED 272. Stationary reader 36 preferably mounts upon a wall, such as within cold room 278 or at a different location. Stationary reader 36 preferably does not have a screen, but is managed through a mobile device 38 application. LEDs 270 and 272 indicate the state of the stationary reader 36. A Red LED 272 reports whether stationary reader 36 is powered on and connected to Internet 54. A Yellow LED 270 indicate keg 14 sensing is active using radio transmitter 16 or collar radio transmitter 142, and, during initial setup, indicates that stationary reader 36 is ready to receive a Wi-Fi password.

If stationary reader 36 does not have a current connection to the Internet, a peer-to-peer connection (for example, via Bluetooth) may perform the necessary connection. Stationary reader maintains a connection to the Internet and actively seeks to re-establish the connection, if the connection goes down. Proximity reads to kegs 14 are taken continuously. If the Internet 54 connection goes down, the reads are spooled to a local buffer sensors/data collection section 34, and when the Internet 54 connection returns the spooled data is transmitted to server computer 56. The data is compressed before being encrypted, authenticated and sent to server.

Each stationary reader 36 in distribution network 10 possesses a unique identifier, and a unique asymmetrical encryption key. Only a mobile device 38 having the other half of the asymmetrical key is authorized to manage the stationary reader 36.

The asymmetrical key is retrieved from a server computer 56, is not kept permanently on mobile device 38, and has only per-session usage rights.

FIG. 19 shows the arrangement of a fill reader in association with cold room 278 or other location for detecting and reporting the condition of a plurality of kegs 14. FIG. 19 further includes use of a mobile reader 274 which may be used on a stand 276 in proximity to mesh network 18 of kegs 14 within a cold room 278.

FIG. 20 illustrates conceptually the use of tap handles as a tracking mechanism for beer or other liquid dispensing flow according to the teachings of the present disclosure. The present invention describes a system and mechanism for remotely tracking and monitoring use of a tap handle and associated beverage dispensing systems.

Referring to FIG. 20, tap handles 277 are provided free of charge to vending outlets to advertise the brand of beer currently on tap. For example, when a restaurant decides to carry a new brand, the distributor or brewery will provide a tap handle 277 for use by the restaurant when pouring that beer. The tap handle advertises the beer on tap, and also acts as a handle to dispense beverage through 279 faucet.

Laws dictate tap handle 277 ownership remains with the supplier, not the vending outlet. As part of the laws enacted around the three-tier system, a vendor does not own the handle—it is on loan free of charge for use in promoting a brand. Because enforcement is by law and not by contract, vendor return of tap handles is not easy to enforce (i.e., the brewery/distributor must prove the vendor still has the handle).

Tap handles 277 often go missing. When taken off a tap 279, a handle 277 might be placed in a box under the bar; put on display in some area of the restaurant; misplaced; thrown away; put in storage; taken home by an employee; given to a patron. When the brewery or distributor comes to retrieve the handle, often the vendor does not know where the handle is; or the area where the handle is stored is not accessible (i.e., in a manager's office, etc.). Because the distributor/brewery does not know when the handle goes on the faucet and when it comes off, there is always a time interval between when the handle 277 is not being used and when the brewery/distributor tries to pick it up—increasing the likelihood that it will get lost.

In the industry, there are no established solutions for a supplier to remotely measure activity on a tap handle, such as how many times a bartender has "pulled" on the handles to dispense a beverage. Flow meters exist to measure flow of beverage through the lines connecting the container to the faucet, giving an indirect measurement of handle use. Such flow data, however, is collected locally for use by the vendor, and no established networks or processes exists to transfer such data back to distributors and/or breweries in real-time.

There is a need for a system able to remotely track tap handles 277. Such a system would allow handle pulls to be collected remotely and communicated to all interested parties—vendors. Accordingly, FIG. 21 shows how tap handle 281 of the present disclosure may be constructed to achieve liquid dispensing measuring and reporting. Typical tap handle 281 parts include handle 283, marker 285, hanger bolt 287, ferrule 289, faucet lever 291, bolt 293, faucet/tap 295, from distributors and breweries. It an easy determination of whether handle 281 is still in the vendor's premises. This provides encouragement to the vendor to return handle 281. Making handle 281 trackable further allows a distributor/brewery to be notified immediately when handle 281 is taken off a faucet 295 so it may be retrieved.

The present disclosure provides a small tap flow monitoring and reporting apparatus 301 that may be attached to or incorporated into tap handle 281. Tap flow monitoring and reporting apparatus 301 makes possible tracking location and measuring remote use of tap handle 281 at a plurality of locations. Tap flow monitoring and reporting apparatus 301 is capable of storing sensed conditions for downloading later. Tap flow monitoring and reporting apparatus 301 may also communicate with other Tap flow monitoring and reporting apparatus 301, on a peer-to-peer basis.

FIGS. 22 through 26 depict various alternative embodiments of tap handle flow measuring and reporting apparatus 301 of the presently disclosed method and system. Tap flow monitoring and reporting apparatus 301 is able to visit a plurality of locations. In particular, the exact retail outlet(s) tap handle 281 will be used at are not known ahead of time. No configuration or installation needs to happen at the remote retail location. Tap handle 281 can move from location to location with no installation or configuration required at each one.

Tap handle 281 with tap flow monitoring and reporting apparatus 301 works with the liquid distribution networks herein described and in U.S. Pat. No. 10,083,431 to track handle 281 as it changes location. Connection to an everyday typical personal mobile device is automatic and happens automatically, no manual configuration or interaction required.

Tap handle 281 with tap flow monitoring and reporting apparatus 301 may also be able to communicate directly without use of the above-referenced network. Tap flow monitoring and reporting apparatus 301 is small enough to be incorporated into tap handle 281 itself. Meaning, it can be used without modifying the exterior dimensions of the handle.

Tap handle 281 with tap flow monitoring and reporting apparatus 301 battery life is at least 2 years and could be up to five or more years, depending on the battery in use. The device is auto correlated to the beverage being dispensed, since the tap handle is made to advertise that beverage (meaning, the tap handle advertises a brand, and probably a specific type of beer. If the handle is installed, it means that brand of beer is being served. The system can automatically know what brand is on tap). It does not matter which faucet and line the beverage gets attached to.

Coordination with the remote restaurant is not required. The remote restaurant may not use the tracking information—it can be collected anyways. The restaurant might not even know it is being collected. The people using tap handle 281, i.e., restaurant, distributor, etc., may not know it is being tracked, due to the potential identical form factor to conventional tap handles. Tap handle 281 with tap flow monitoring and reporting apparatus 301 determines if the handle is on the faucet or not on the faucet. Tap handle 281 is in different states—in warehouse, in distribution chain; on faucet in a restaurant; in drawer in a restaurant. The sensing continues to operate even if the handle is not on the faucet. In addition, it detects what state it is in—whether it is on a faucet or in a drawer.

Tap handle 281 with tap flow monitoring and reporting apparatus 301 is not just measuring the activity of the faucet. Knowing that tap handle 281 is not being used on a faucet is important. Tap handle 281 with tap flow monitoring and reporting apparatus 301 provides important information even without being connected to the tap/faucet 295 and product dispensing system. If tap handle 281 is not on the faucet, it means the brand is no longer being served (this could be because the keg ran out, or some other reason). For a distributor or vendor, this means they should visit the account.

Tap handle 281 with tap flow monitoring and reporting apparatus 301 does not just measure product dispensing. This is because knowing the handle is not measuring (i.e., is in a drawer) is just as important as measuring product flow. Tap handle 281 with tap flow monitoring and reporting apparatus 301 may detect when the tap handle has left the building—knowing it has left the building is important. This could occur if the restaurant has lost or otherwise parted with tap handle 281.

Tap handle 281 with tap flow monitoring and reporting apparatus 301 measures uses, and thereby indirectly product dispensing. When combined with keg tracking system of the present disclosure, tap handle 281 with tap flow monitoring and reporting apparatus 301 provides a complete view of what is happening with kegs and fluid. When combined with a digital menu system, tap handle 281 with tap flow monitoring and reporting apparatus 301 can provide automatic update of products being served (handle goes on faucet means brand is available for purchase).

Tap handle 281 with tap flow monitoring and reporting apparatus 301 could automatically update a website with product being sold at location, with no configuration needed at vending outlet. When combined with a digital menu system, tap handle 281 with tap flow monitoring and reporting apparatus 301 can interactively show product sales (brand lights up as handle is used). When combined with a point-of-sale record, tap handle 281 with tap flow monitoring and reporting apparatus 301 can provide a measure of product "shrink" (sales should match handle use—any pours made without a corresponding POS entry means the product was given away).

Since tap handle 281 knows when it goes on and off the faucet, it can provide indication of lines being properly cleaned (the handle will come off during non-peak hours and then put back on). This is a way to double check remotely that line cleaning procedures are being followed regularly.

When more than one tap handle 281 is being tracked at a vending outlet, relative sales data is available to distributors and breweries (i.e., how does one brand sell when another brand is also being sold)? This data normally exists in POS of restaurant, but not available to distributor/brewery. It is not necessary to get vendor's permission to collect this data.

Tracking location helps determine where lost handles 281 are located and prevent them from being lost or misplaced in distribution chain. Provides accountability to employees and accounts. Tracking location can help a supplier (brewery, distributor) rotate out old versions of handles. Often kegs are sold and not put on tap right away (go into storage). The handle tracker allows supplier to know when a keg they have previously sold actually goes on tap and is being sold.

Various physical embodiments of tap handle 281 are within the scope of the present disclosure, and appearing here at FIGS. 22 through 26. These may include tap flow monitoring and reporting apparatus 301 being embedded in a cavity inside tap handle 281. FIG. 25 shows Tap handle 281 with tap flow monitoring and reporting apparatus 301 embedded inside ferrule on bottom of tap handle. Moreover, a ferrule containing a tracker can be retrofitted to any existing handle which has a hanger bolt. Tap handle 281 with tap flow monitoring and reporting apparatus 301 can also be retrofitted to any existing handle which has an "internal ferrule" using an adapter thread.

FIG. 27 presents a modified circuit block diagram 305 of radio transmitter electronic circuitry 190 of the radio transmitter architecture for the presently disclosed tap handle flow measuring and reporting apparatus according to a preferred embodiment. The circuit block diagram shows RTC (real time clock) 307, flash 309 for off-chip memory storage, level sensor 311 determines position of handle and its tilt off axis, and mount detector 313 determines if tap handle 281 is mounted on faucet bolt 293. I2C 315 provides a communications bus and SPI 317 provides a communications bus. GPIO 319 provides a general-purpose input output. Additional sensors are possible to be added, such as temperature, acoustic, vibration, GPS, cell modem, lights (i.e., handle lights up when used), infrared, etc. Further components of tap flow monitoring and reporting apparatus 301 include Rf and antenna circuit 321, and Vcc voltage supply 323 from battery 325.

Another possibility is handles use infrared, directional antennas, other signal propagation measurement to determine their position relative to one another. The handle knows it is in position 1 of 10 for example. This could be important data for marketing purposes, or for tying handle use to line use (along with line use to keg use), for checking that tap handle 281 is on the correct line, etc.

FIG. 28 shows a circuit diagram of the tap handle flow measuring and reporting apparatus of the present disclosure. A low cost omni-directional gravity switch 331 appears at FIG. 28. Switch 331 presents a low profile and may be constructed to add no more height to a printed circuit board (PCB) than other components. This is to be compared to normal omnidirectional gravity switches which have extra height. Switch 331 may be configured with multiple segments 333 (shown here with six) to provide variably precise omnidirectional readings. Lower number of segments 333 requires fewer processor GPIO 319 inputs; higher number of segments 333 requires higher number of GPIO 319 inputs. Using six segments 333 means when a tap handle is actuated in a vertical plane, there will always be an "empty" segment to separate "on" vs "off". It is also possible to construct using less segments with a tradeoff in cost of manufacture vs accuracy. Can be built using standard metal shield materials.

FIG. 29 illustrates the connecting circuitry 335 of the presently disclosed tap handle 281 measuring and reporting device. A ball bearing rolls on level shield platform 337, and make electrical connection between platform 337 and edge detectors 339. This provides a reliable and inexpensive compared to having three or more normal tilt switches. Also increases reliability since logic is simpler. This is true, because there is no requirement to combine readings from three or more conflicting sensors.

FIGS. 30A and 30B demonstrate the construction of the electrical connectivity for the tap handle flow measuring and reporting circuitry 301 of the present disclosure. Using gold plated (FIG. 30A) contacts 339 increases reliability. Allows tap handle 281 to be arbitrarily rotated on faucet and still allow detection of "on" vs "off". Compared to normal gravity switches which are uni-directional (FIG. 30B). Software may be programmed to determine which position of handle is "on" vs "off". Tap handle 281 can change rotation arbitrarily for line cleaning, etc.). Combined with a faucet detector 341, below, can be used to determine when tap handle 281 was likely to have changed rotation.

It is possible to detect both "on" and "off" using same switch 331. It is not required to have two different switches. Software also used to detect "no activity"—can be a backup mechanism to determine if tap handle 281 is on faucet. Switch 331 operates in less than 10-degree difference from horizontal—detects slight backward tilt of tap handle when in off position. Difficult to get this small degree with commercially available gravity switches. In the present embodiment, the interior circle after applying pieces may be 10 mm. Rest of board as small as possible while metal pieces and layout. Seven metal pieces are attached pads on the PCB.

FIGS. 31A through 31C illustrate a preferred embodiment of the tap handle flow measuring and reporting device for operating consistent with the teaching of the present disclosure. Faucet Detector 341 of FIG. 31A uses a split metal insert 343, where a faucet bolt provides conductive material to close switch 331. There are no moving parts (as opposed to normal switches where there is a moving actuator. Faucet detector 341 presents a low profile and does not add height to ferrule/handle. Split metal insert 343 is threaded, see FIG. 31B, the two halves 345 and 347 separated by plastic 349. When the thread is put on a bolt, switch 331 closes via conduction across the bolt.

The configuration of FIGS. 31A through 31C allows for inexpensive assembly (no moving parts). The device is also waterproof with no gaskets required to seal. Works with normal faucet bolt metals; does not required bolt to be magnetic. Cannot be actuated accidentally (as opposed to a button which could accidentally be pressed). As FIG. 31C shows, this presents a low profile with no additional height required for switch activation or springs. The configuration does not depend on how far tap handle is threaded onto faucet. If it is threaded far enough to stay on the faucet, the switch works.

The standard lock nut may be used to hold tap handle 281 in a certain position around bolt contributes to switch 331 activation by putting more force on the threads. Thread material selected for good conduction and thread strength. Thread can start as Class 2B and with additional manufacturing tolerances result in Class 1B. The top of metal piece provide surface to connect to PCB (via contacts).

One side of split thread 343 can directly connect to battery, or can use the same clip used to hold the battery 325 to contact the top of the metal portion. The top of metal pieces can be exposed but still provide waterproof seal. Threads can either be in the metal pieces ahead of time, or added after plastic molding. threaded metal plastic FIGS. 32A through 32C show an alternative embodiment of the present disclosure. As shown, a metal piece is deflected by lock nut to touch metal threads in housing. A drawback of this configuration is the device could be actuated accidentally; requires lock nut to be tightened; difficult to mold; increases height.

FIG. 33 shows a fully assembled embodiment of the device appearing in FIGS. 32A through 32C. Lock nut touches metal portion of housing; lock nut also touches bolt, which touches metal threads in housing; lock nut closes switch by connecting all the metal parts together. A drawback of this configuration is the device could be expensive metal part for bottom of housing; requires metal insert through housing to provide PCB access to metal part; requires lock nut to be tightened.

An alternate faucet detector appears in FIG. 34. This switch may be activated by bolt in cavity. A drawback of this configuration is the device increases height and may be difficult to mold. This further reduces the amount of thread available to hold tap handle 281. Another alternate faucet detector appears in FIG. 35. In FIG. 35, a pin goes through housing and activates switch on PCB. Drawbacks are that this configuration requires that the PCB be under the battery. So, if no springs used, excessive force could damage PCB. This configuration may be difficult to assemble and make waterproof. This configuration may be actuated accidentally. Furthermore, this configuration requires a lock nut to be tightened and introduces dependency on lock nut diameter. This configuration increases height—17 mm to 18 mm.

A yet further alternate faucet detector appears in FIG. 36. A variation of the split metal insert, where the contacts for the tops of the metal pieces are molded into the housing. This allows the PCB to be a waterproof cavity separate from the threads. A drawback of this configuration is the device may be more expensive to mold and increases height. Still further alternative embodiments may be considered and all are to be considered within the scope of the presently disclosed subject matter.

FIG. 37 depicts a fill reader display 280 that a mobile reader 274 or sensing device 36/38 may show to indicate the status of kegs 14 within a mesh network 18. Display 280 provides information 282 regarding empty kegs 14 and information 284 regarding full kegs 14. Empty kegs 14 display 282 shows that keg1, keg2, keg3, and keg4 are empty kegs 14. Full kegs 14 display 284 shows the keg10, keg11, keg12 and keg13 are full. Fill icon 286 indicates the movement from empty to full for the various kegs 14 in cold room 278. Indicator 286 displays that type of liquid product is in the various kegs, here Pale Ale. Display 280 also indicates the date on which the display is operating.

Fill reader display 280 allows a brewery 20 to input the fill date and contents of kegs 14 as they fill them using a normal tablet device 274. Distribution network 10 software allows a brewery 20 to pick the product with which to fill the kegs, to manually mark kegs 14 as they are filled, and to show nearby keg 14 and their state. According to brewery 20 preferences, distribution network 10 software can either require manual marking of kegs 14, or automatically mark kegs 14 based upon being within a set distance range of fill reader 274 for a period of time.

FIGS. 38A and 38B illustrate how stationary reader 36 may sense keg/handle 14 status in cold room 278 with a closed metal door. In cold room 278, mesh network 18 of radio transmitters 16 may be positioned behind a closed metal cold room door 290.

During this time, it is not possible to obtain the necessary communication between radio transmitter 16 and sensing device 36/38. However, as FIG. 38B shows, once cold room door 290 opens, a clear communication path between stationary reader 36 and mesh network 18 occurs making reading each radio transmitter 16 on kegs 14 possible. Alternatively, the communication may occur to any mobile device 38, 40, 42, 60 outside cold room. While it is not possible to sense radio transmitters 16, historical data may be stored in and forwarded from radio transmitter 16. Alternatively, as mobile devices 38 enter and exit cold room 278, they may pick up data from kegs 14 or mesh network 18 in cold room 278 for later reporting in distribution network 10.

FIGS. 39 and 40 depict the layered construction of a weighing mat 250 according to present disclosure. Weighing mat 250 includes slick top layer 292 which adheres to compressible spacer layer 294. Beneath compressible spacer layer 294 appears bottom layer 296. Weighing mat 250 may rest on metal shelf rungs 298. Bottom layer 296 may include a high friction rubber layer 300. Slick top layer 292 may further include ridge 302 upon which may rest keg 14. Slick top layer allows easy sliding of kegs 14 on weighing mat 250. Bottom layer 296 surface may include a high friction rubber or adhesive surface to keep weighing mat 250 in place upon the metal shelf rungs 298. Optional raised ridge 302 on the slick top layer 292 help position one or more kegs 14 in the best position(s) for weighing, as well as for use in association with other kegs 14 in mesh network 18.

FIG. 41 depicts a weighing or measuring device 304 for integration into the weighing mat 250 of the present disclosure. Weighing devices 304 sandwiches between slick top layer 292 and bottom layer 296. Example weighing devices 304 may be a load cell, pressure sensor, etc. Deflection of slick top layer 292 and compression of compressible spacer layer 294 when a keg 14 rests on weighing mat 250 transfers the keg 14 weight force onto weighing device 304. Optional spacing material can be used to support the slick top layer 292 outside weighing region(s). Overload protection prevents damage to weighing device 304 from large, sudden loads dropped from a shelf onto the weighing mat 250.

FIG. 41 further illustrates the association of radio transmitter 16 with a weighing mat 250 of the present disclosure. FIG. 41 illustrates weighing mat 250 to include weighing devices 304 positioned below ridge 302. Radio transmitter electronic circuitry 190/305 communicates with mat antenna 306. In the embodiment of FIG. 41, weighing mat 250 correlates keg 14 weight, as measured by weighing devices 304, with keg 14 state changes. Radio antenna 306 receives signals from radio transmitter electronic circuitry 190/305 when keg 14 is placed on weighing mat 250. Weighing mat 250 may then transmit the keg 14 weights and other information about each keg 14 either directly to a storage system stationary reader 36, a mobile device 38 or an intermediate sensing device 36/38. Intermediate sensing devices 36/38 may further include another weighing mat 250; another stationary reader 36; a mobile device 38; an Internet or cloud server computer 56 via Wi-Fi; etc.

Radio transmitter electronic circuitry 190/305 includes sensors on PCB 88, which may detect events that trigger a state change in the keg 14, mesh network 18, or elsewhere in distribution network 10. An example may be a temperature sensor 192 that determines a change in temperature that is significant for keg 14 state tracking. Such temperature change and/or the state change itself is communicated to a mobile device 38 and thereby to the rest of the distribution network 10.

Radio transmitter 16 placements on keg 14 bottom rim 136 permits easy detection by mat antenna 306 and signal disambiguation from other nearby kegs 14 in mesh network 18. Distribution network 10 software determines which brand and type of beer is on weighing mat 250; when keg 14 was filled; etc. Mat antenna 306 is in position to best detect radio transmitter 16 directly above the respective weighing mat 250 and no other kegs 14 nearby, but not on weighing mat 250. Weighing mat 250 may also incorporate an RF shield to prevent items on weighing mats 250 on lower metal shelf rungs 298 from being detected. Mat antenna 306 may be directional to further help in nearby keg 14 disambiguation.

A mechanical overload protection mechanism allows directly and safely dropping full kegs 14 weighing mat 250. Such an event would occur weighing mat 250 is on the floor and a keg 14 dropped from a nearby shelf. When using a load cell as weighing device 304, a mechanical stop is incorporated into the load cell action to prevent damage to it in the case of overload. In the case of using a pressure sensor as weighing device 304, a point load will compress the slick top layer 292, spacer layer 294, and rubber layer 300 so that the load is transferred to metal shelf rungs 298 beneath weighing mat 250. Only a load spread across slick top layer 292 the surface will register a read.

In each mesh network 18, one weighing mat 250 may operate as the "master" mat, responsible for collecting information from nearby weighing mats 250 before sending to server computer 56. Weight mats 250 may be individually connected to server section 52 via Wi-Fi or other means. Weighing mats 250 can transmit readings directly to sensing devices 36/38 or a nearby tablet computer. Radio measurements are aggregated via distribution network 10 software from multiple weighing mats 250 to disambiguate multiple radio transmitter 16 signals from various kegs 14. Keg 14 weights aggregated via distribution network 10 software to automatically order more product when necessary. Weight mat 250 hardware feeds events into distribution network 10 software, e.g., kegs 14 going on and off a weighing mat 250; keg 14 is almost empty; new keg 14 has been tapped; etc. Distribution network 10 software uses the events received from weighing mat 250 hardware to determine additional conditions, such as whether the last full keg 14 of a certain brand has been put on tap 260; etc. These events and conditions trigger actions such as POS notification 262.

FIG. 42 shows a potential configuration of stacked kegs 14 as may be measured and monitored using the weighing mat 250 of the present disclosure. Alternative dual keg 14 weighing mat 310 provides the ability to stack two kegs 14, as upper keg 272 and lower keg 274. With upper keg 272 stacked on lower keg 274, weighing mat 276 may provide a weighing measure of the combined weight of the two kegs 14. Two kegs 14 being stacked on top of each other assumes one of the two is either full or empty. Thus, both kegs 14 may start full, and upper keg 14272 may be drained. Then upper keg 272 may be placed on the bottom with lower keg 274 connecting to tap 260. In this configuration, only one keg 14 is being drained at a time. Weight mat 250 may have a readout area showing weight/percent full/etc. for the keg 14 currently on tap 260. Distribution network 10 software may automatically compensate for the event of whether lower keg 14274 is full or empty.

FIGS. 43 through 46 show various screens of a mobile device 38 application for the present disclosure. FIG. 43 shows connection via a mobile device 38 to a wireless transmission from stationary reader 36 and/or radio transmitter 16. As FIG. 43 depicts, access screen 320 shows the ability to determine that a stationary reader 36 is within a Bluetooth connection of icon 322 or Wi-Fi connection of icon 324 to a mobile device 38. A red indicator light 326 may show that "Truck #1" as reading station is accessible to mobile device 38. Access screen 320 provides also the ability to select stations 328, trucks 330, or other locations within liquid product distribution network 10.

Distribution network 10 software residing on a mobile phone/device creates a peer-to-peer network for operating stationary reader 36. The mobile device 38 screen permits entering settings to allow stationary reader 36 to connect to local Wi-Fi and then to the rest of the Distribution network 10. FIG. 43 is a list of stationary readers at various vendors 30, where red/green indicator lights 326 show indication of stationary reader 36 operational status. The Bluetooth connection icon 322 and Wi-Fi connection icon 324 show whether the respective stationary reader 36 presently has a wireless connection to distribution network 10.

FIG. 44 shows how mobile device 38 may connect to distribution network 10. For example, mobile device 38 may connect via a server section 52 at selection 340 or a peer-to-peer network at sensors/data collection section 34 at selection 342. These connections are selectable by the mobile device 38 user, such as the shown example of a peer-to-peer network selection 340 of FIG. 44.

FIG. 45 shows how mobile device 38 software may permit a user to determine the state of distribution network 10 software at a station. Thus, version screen 350 shows the station name to be "Reader #4," using the Wi-Fi network of "Private_Wifi" and version 1.1.1. Version screen 350 also indicates the presence of nearby Wi-Fi networks applicable to mobile device 38. FIG. 45 shows information received from stationary reader 36 about its current state using a name meaningful to the location of the reader. Also, here provided is information of whether a Wi-Fi network programmed into it and the stationary reader 36 firmware version. The "Nearby" selection allows showing other radio transmitters 16 that may be currently being detected by stationary reader 36.

FIG. 46 simply provides the ability to select among different Wi-Fi networks as would be typical in the operation of mobile device 38. FIG. 46 shows identifying and selecting a Wi Fi network ("Private_Wifi") from available Wi-Fi networks as listed.

FIGS. 47 through 50 illustrate exemplary screens as may find use for mobile phones and tablets operating as mobile devices 38 in detecting and reporting kegs 14 at various locations and data applicable to monitoring and reporting. FIGS. 47 through 36 further demonstrate the communication capabilities 50 of distribution network 10 software. For example, FIG. 47 shows mobile device 38 interface including a satellite perspective which provides the ability to maintain different accounts associated with distribution network 10, as well as the ability to drill down into accounts for determining the account status. Thus, maintenance and drill down screen 360 shows satellite image 362, including numerous keg 14 icons 364 indicating accounts associated with distribution network 10. For example, selection bar 366 provides the ability to select nearby locations 368, kegs 14 reporting section 370, fill status selector 372, and delivery section 374 for performing the various distribution network 10 functions.

FIG. 47 shows screen 360 showing analysis of the distribution network 10 tracking and fill level data to present a map and locations list where appear kegs 14 equipped with radio transmitters 16 and sensing devices 36/38 for their reading. In the top half of screen 360, each circle 364 with a beer mug represents a keg 14 section 12 location. A circle 362 without a beer mug may represent a group of kegs 14 section 12 locations. The bottom half of screen 360 may provide a list of the accounts associated with each circle 362 or 364. Either clicking on a circle 362 or 364, or clicking on the account name below will reveal FIG. 48, which provides more information concerning the particular account, here 15th Street Cafe. The icon may vary based upon kegs 14 status at the particular location.

The controls at bottom of map area of screen 360 include (1) adding a new account not already measured; (2) changing the map graphics type; (3) showing the user's current location; (4) changing the size of the map vs the list. The four yellow buttons at the top of the list area lead to four screens with specific information about: (1) containers being detected nearby within a given radius of the user; (2) a list of all containers, their location/state/etc. (3) a control to fill kegs 14 similar to FIG. 38; (4) a delivery screen for entering notes and information about a specific delivery.

By doing a reverse address lookup (from GPS to street address) when truck 70 stops, distribution networks 10 may determine the delivery account and, thereby, inventory at the keg 4 section 12 location. If a sending device 36/38 does not include reverse street address lookup capability, GPS data associating with the sensing device 36/38 may pass to server computer 56, which pushes the GPS data to a different sensing device 36/38 capable of performing the lookup; or pass directly to another sensing device 36/38 within distribution network 10. The determined reverse street address lookup result may then be sent back to the original sensing device 36/38. Once an address is looked up, sensing device 36/38 may cache the address, so the next time only the GPS data is needed to determine the associated keg 14 section 12 account. Distribution network 10 software may also display route information to a driver of truck 70. Such route information may include accounts for the day, driving route, what to drop off and pick up, verifies driver drops and picks correct inventory; etc. Distribution network 10 software may also learn a truck 70 driver's route over time. For example, distribution network 10 software may record that deliveries to a certain account are always made from a certain parking place. This information becomes a part of the knowledge base displayed by the distribution network 10 software to the truck 70 driver. Distribution network 10 software further provides a knowledge base serving as a repository for routes, specific account information such as combinations to locks, where keg 14 empties are stored, etc., schedules, invoices, drop off and pickup requirements, etc. The pickup, delivery and inventory data is correlated against invoices, route schedule, last known inventory (i.e., lost kegs), etc. tablet 244 on truck 70 may communicate wirelessly with truck reader 230 for displaying mapping, routing, etc. FIG. 48 shows the results of selecting "Nearby" function 368, where a 15th St. Cafe, for example, report may be generated as screen 390. In the report of screen 390 would be information relating to the keg 14 configuration and associated mesh network for their reporting location, here the 15th St. Cafe.

FIG. 49 shows the type of information available about each keg 14 in addition to above: serial number, contents, location, keg 14 size, history of keg 14. Upon selecting kegs 14 function 370, keg 14 information screen 380 of FIG. 49 may appear on mobile device 38. Such information may include a name assigned to a keg 14, the product contained in keg 14, the state of keg 14, any identification number relating to keg 14, the size of keg 14 and any operations of importance relating to keg 14.

FIG. 49 shows the type of information available about the account: name and address; notes about the account (instructions, who to contact, etc.); the kegs 14 on site and their contents; date of delivery to the account; how full the kegs 14 are; statistical history about the account including average days a keg 14 takes to empty; average rate of product consumption.

FIG. 50 relates a POS marketing feedback loop 262 of FIG. 37 according to the present disclosure. POS marketing feedback loop 262 may associate via an application or wireless network to indicate to consumer 66 of a restaurant or other keg 14 section 12 location where kegs 14 containing beer of known interest to consumer 66 may be available. Screen 400 appears on a consumer 66 mobile device 38 to provide a notification from RMS section 58 of distribution network 10. Screen 400 indicates an event that may be of interest or importance to consumer 66 or other participant in distribution network 10. Notification 402 shows that "Austin IPA" brand of beer has just been made available at the location "Revolution." Through this notification, mobile device 38 allows consumer 66 to share this information or just acknowledge the event by respectively selecting "Share It" or "OK." The value of this function to all participants in distribution network 10 may be quite high.

FIGS. 51A through 51D illustrate data as may be reported by distribution network 10 software for performing various management and financial functions associated with deposit information and financial transactions. Such management and financial information has significant benefit respecting invoices, accounting and verification of truck 70 driver-entered information relating to deliveries of kegs 14. FIG. 51A provides a report that a distributor 64 or brewery 20 may find highly advantageous in reporting inventory by keg 14 section 12 location. Report 410 could apply to a distributor 64, for example, and provides an "Inventory by Location" a listing of vendor 30 locations 412 that a distributor 64 may service. Report segment 414 presents a status for an empty keg 14 that may be at a location. Report segment 416 presents time-stamped information regarding a history of keg 14 having the identify of "Keg #008." Thus, FIG. 51A shows how distribution network 10 software permits drilling down from a high level aggregate view into individual keg 14 histories.

FIG. 51B provides information relating to the kegs 14 that may be at a particular vendor 30 location in a "Turns Report." FIG. 51B shows calculations of keg 14 "state" and how many days each keg 14 is at each state. It also shows a complete keg 14 cycle from brewery (date at left); through various states; to keg 14 back at brewery (date on right).

FIG. 51C provides an "Inventory Report" by keg 14 or on a per-keg 14 basis. FIG. 51C shows similar data to 51B, except with the current location of the keg 14 appears in column 2; the contents of the keg 14 in column 3—and current progress of the keg 14 through states as it has progressed so far.

FIG. 51D shows a "Daily Changes" report at a location. The FIG. 51D report shows day-by-day changes in states of kegs 14 and they progress through distribution network 10. These are just examples of the many types of reports and financial in management information that the distribution network 10 software and components make possible. In application, other types of reports may also be a benefit to participants in distribution network 10.

FIG. 52 shows an Accounts Screen for viewing vendor 30 accounts, their location on the map, information about the vendor, inventory at the vendor, and account history. The FIG. 52 Accounts Screen shows information as may be generated by distribution network 10 in the delivery of kegs 14 and indicates the last inventory of a vendor 30 location as may be viewed by a truck 70 driver. The Accounts Screen of FIG. 52 permits drilling down to a location to indicate the status of a location that is part of distribution network 10. The Account Screen includes reporting and includes a vendor 30 view of kegs, products, readers, etc. that may be viewed via web browser or inside the distribution network 10 mobile device 38 app. Account Screen displays data about radio transmitters 16, kegs 14, breweries 20, products (e.g., beer brands and types), distributors 64, vendors 30, keg 14 section 12 locations, stationary readers 36, etc. either individually or in groupings/aggregates. The Account Screen further provides a dashboard display for showing overall information in user-customizable cells. The Account Screen of FIG. 52 displays only data permitted to user/ device, and further can generate notices (e.g., beer too old, lost keg, mistakes in delivery) of importance throughout distribution network 10.

FIG. 53 shows further aspect of liquid product distribution network him for automatically managing the deposit information. Such information may include how many kegs 14 are at each vendor 30 location in distribution network 10. When a keg 14 with a radio transmitter 16 or collar radio transmitter 142 appears in keg 14 section 12, such as a vendor 30 location, from a delivery truck 70, it automatically becomes a part of the distribution network 10 at the keg 14 section 12 location. This is indicated by the report 420 of FIG. 53, which includes deposit information relating to the keg. The delivery of a keg 14, therefore, initiates a financial transaction relating to the newly deposited keg 14 at the vendor 30 location. Thus, where a deposit is made, a charge of $120 appears because of communication with radio transmitter 16. Likewise, when a keg 14 having radio transmitter 16 is returned via distribution network 10, a return reimbursement of $60 appears. The shown example Distribution network 10 system automatically credits and debits a deposit based upon measurements of 4 kegs 14 being left and 2 picked up. On the right is shown detection of the actual kegs 14 at the vendor 30 account, and use of this data to populate the invoice so it shows the exact kegs 14 dropped off and picked up.

Software automatically manages deposit information— how many kegs 14 are at each location determines that location's rolling deposit fee. The deposit information automatically propagates back to invoices, accounting, etc.; or is used as a double check against the drivers entered data. The invoice is normally prepared before the truck 70 driver leaves the warehouse, and his stack of invoices used as a pick list to put kegs 14 and their products on truck 70. When the truck 70 driver actually makes a delivery, the particular keg(s) 14 deposited and picked up are added to the invoice. "Inventory" report section 422 of FIG. 53 shows a listing of all kegs 14 that may be in a keg 14 section location. Column 424 of Inventory Report 422 provides the identification of a keg 14 having the identifier "QB #3-005." Column 426 shows that the QB #3-005 keg 14 contains 6 inches of product, as column 428 shows, "Pale Ale." Inventory Report 422 further shows that distribution network 10 has also detected other kegs 14, such as kegs 14 having identifiers "HB #3-001," "HB #3-003," etc. All kegs 14 listed in Inventory Report 422 have the associated contents measure in terms of both volume and type of beer.

Further, described are an apparatus, system and methods for remotely tracking location, contents, state, volume, temperature and other measurements of kegs (FIG. 54) with plastic or rubber chimes (hereby called RSR but meaning any keg having a steel/other body and non-steel, plastic or rubber chimes) and their contents. The apparatus consists of electronic circuits, sensors, and physical mechanisms that are attached, embedded within or otherwise incorporated into or interact with RSR kegs. The system is the apparatus within a set of kegs, mobile devices, manufacturing facilities, distribution facilities, retail facilities, trucks and vehicles, hand trucks, users, servers, networks and the communication and interaction between them. The methods are for attaching, powering, tracking, collecting, disseminating, aggregating, notifying, reporting, communicating and other methods related to the parts of the system and the data and events collected, occurring or produced by the system.

The hardware provides a wireless, battery powered hardware unit that is interfaced with the unique characteristics of RSR kegs (meaning steel/other kegs with non-steel chimes). The hardware is generally embedded in the rubber/plastic chimes, with unique features to enable this. The unit may be embedded so it does not extend the normal boundaries of the chimes or keg, and hidden so a typical person cannot tell that the keg has a tracker or where it is located. The hardware unit can be placed in either the top or bottom chime. A portion/surface of the tracking unit can be left exposed to provide a function such as a QR scan code.

The unit is battery powered. It may have a non-replaceable battery (either chargeable or not), or a replaceable battery (either chargeable or not). Battery life is an important characteristic of the hardware. Kegs are serviced every 5 to 10 years, and cycle in the distribution chain every week to 3 months. In configurations where the battery is not replaceable or chargeable, power usage of the circuit is optimized so that battery lasts 5 to 10 years (in order to correspond with keg maintenance cycle). This is done by allowing circuitry to enter/exit low power modes; removing power to portions of the circuit when not needed; using low voltages; avoiding battery buck/boost voltage conversion; etc. Depending on cost of chimes, and ability to remove/replace the chimes, battery replacement in 5 to 10 years may be achieved by replacing with new chimes having new battery. This would involve replacing either top or bottom chime of the keg. Battery replacement may be achieved by cutting or removing the entire tracking unit and putting in a new one. Alternatively, replacement may be achieved by heat or chemical means to release bonding glue between tracker and chime, so a new one can be installed. In another example, replacement may be achieved by leaving a visible surface/lid on which QR code or other visible tracking indication, and then removing this lid and replacing the hardware in the hidden cavity.

In cases where additional sensors in the unit prevent attaining battery life of 5 years or more, a rechargeable battery is used, with means to recharge the battery at points in the distribution chain. The battery is either left attached to the unit and embedded in the chimes, or a means provided to extract the battery/unit, recharge it, and replace it. Leaving the unit embedded, charging may occur via wireless charging (inductive loop) or other contactless method such as thermoelectric generator. In this case, the unit is embedded in the chimes, and the receiving inductive loop cast into the chimes near the surface of the chime so that the transmitting inductive loop can receive the charging signal. Alternatively, contacts may be left on surface of rubber for connection of charging circuitry to battery. These contacts may be on the top or bottom chime, and may be placed for convenient access at certain points in the distribution chain (for example, during keg washing). The charging circuit and mechanism is designed to complete charging while the keg is stationary (for example, during keg washing). In some examples, motion charging may be used, whereby motion of the keg provides input to a mechanical-to-electrical charging circuit.

A carrier mechanism has may be designed, allowing units to be pulled out and charged, while new units placed into the chime. This allows a slower charge cycle to occur, since replacing a unit is a relatively fast operation. The units that have been pulled out to be charged can have additional diagnostics run on them, such as downloading of stored data. In this case, mechanical (for example, keyed lock, one-way threads, custom tool) or electronic locks (wireless, NFC, electrical signal, etc.) can be used to allow only authorized personnel to remove the device (see other sections on locking mechanism).

Similar to the case when the units are removed to be charged and/or serviced, units with non-rechargeable batteries may also be removed and replaced. This is done to save the extra cost of chargeable batteries, circuitry, charging equipment, and time associated with charging. The electronics are permanent while the battery may be replaceable. The whole unit (battery+electronics) may be replaced. There may be a combination of more than one battery, such that a main battery is replaceable while a secondary battery is non-replaceable—in this case, the unit stays operational using the secondary battery, while the primary battery may be replaced. This is done, for example, to keep a real-time clock operational while the battery is replaced. The secondary battery may be no more than a charged capacitor. But it could also be a rechargeable cell or other type.

The unit uses wireless communication. This allows it to be embedded inside the chimes, and the keg to move from point-to-point, and data to be collected without a physical connection to the keg. Examples of wireless communication that could be used are: Wi-Fi, Cellular, Bluetooth, CSRmesh, LPWAN/LoRa, LoWPAN, LTE-M, NFC, NarrowBand IOT, Ultrasonic, UltraWideBand, WiMax, ZigBee, Z-Wave, etc. As shown in other places in this document, it can be convenient to not used a fixed location gateway for communication, for example to use mobile phones as the data collection point. As kegs are often near each other, a mesh network between units can be used. This enables wireless signals to be communicated from kegs located in the back of trucks, stacks or cold rooms. In all cases, the wireless function is optimized to work from within the chimes, and within proximity of a metal container. The antenna, frequency, radiation pattern, location, etc. is tuned for best operation on a single keg and within stacks of kegs.

The unit includes sensors. Many types of sensors are useful for measuring and communicating physical characteristics of the container and its contents. Sensors may include GPS, attitude/position, acceleration, temperature, pH, clarity, acoustic, proximity, spoilage, time/temperature expiration, alcohol percentage, bitterness, brand (multiple sensors combined to automatically determine which beer is in keg), etc. Depending on the sensor, it may be embedded completely within a chime, may interface with or be attached to the spear or valve on the keg, may be attached to an auxiliary port on the keg, may penetrate and/or be inside the keg, etc. The sensor may make use of measured differences between when the keg is tapped vs untapped, right side up vs upside down, stacked vs unstacked, etc. Multiple sensors can be placed at different locations in the top and/or bottom chime. Communication between them can be wired (if in same chime), wireless (between chimes), or use the container itself for communication (acoustic, vibration, capacitance).

The hardware is designed to be embedded or mate with the rubber/plastic chimes. It is possible to cast the unit into the rubber/plastic during molding; however, in this case the heat applied to the unit and its battery must be controlled. By putting insulation around the unit, and cooling it ahead of time, the amount of heat that is transferred to the unit can be kept within acceptable limits. If pre-cooled the battery acts as a stabilizing heat sink for the entire unit. Insulation keeps the heat of the soft molding material (plastic/rubber) from being transferred to the unit. In cases where molding temperatures and/or cooling time prevent a battery from being cast into the chime, the electronics (PCB, etc.) can be insert molded, and the battery added after cooling. In cases where molding temperatures and/or time prevent any parts of the unit from being insert molded, a cavity is molded into the chimes and the tracking unit inserted into the cavity after cooling. This could also be advantageous to allow the hardware to be upgraded, the battery changed, or other modification to the tracker without requiring the chime to change. This cavity might only be accessible when the chime is removed from the keg. The cavity might be hidden behind a deformable portion of the chime.

The surface or other physical characteristic of the tracker may be important to the overall construction of the chime— for example, to display a QR code. When inserted into a cavity in the chime, a cover may be placed over the surface of the cavity with features or procedures to hide the presence of the cavity. The unit might be within a carrier unit. The unit may be glued or mechanically affixed within the handles of the chime. It is important to be able to retrofit existing kegs. Some types of chimes are replaceable while leaving the main keg body intact; in this case, older chimes can be swapped out for new chimes which have embedded hardware. In cases where the chimes are not easily replaced (for example, bonded rubber chimes), the existing chime is drilled or cut to make a cavity into which the hardware can be inserted. As described previously, after insertion the unit can either be hidden or exposed. For speed and tool cost reasons, a through-hole may be easier and cheaper to make than a blind hole. The hidden/exposed characteristics apply in either case.

As previously described, the unit may be designed to be attached within a carrier unit/fixture. In this case, only the carrier needs to be attached/inserted into existing chimes. The unit can also be attached using glue, heat, mechanical fasteners, cams or locks to existing chimes without modifying them. A way to do this without extending the normal boundaries of the keg is to place the tracker inside one of the chime handle holes.

The unit provides indication of battery life, visible or acoustic alerts—Usually the most desirable display of battery life and other alerts is via app software on a mobile device, or web-based software. However, in some cases it may be useful to have visual or audio alerts on the keg itself—for example, to sound an alarm if a keg is moved, or to have an indicator that lights up when a keg is nearly empty, or indicates how full a keg is. The hardware supports these functions.

In the case of LEDs, the LED can either be visible when off (protrudes surface of chime), or only visible when lit (under the surface of chime) (see FIG. 59A). The tracker hardware can support either case, depending on how it is attached to the keg. If insert molded, the tracker can be located in the mold so that the LED itself is only just under the surface of the finished chime. If glued or left partially visible, the LED can be a feature of the tracker housing. The same is true of an acoustic driver, although due to heat considerations, mounting with an exposed surface of the tracker is the best option for acoustic drivers (see FIG. 59B). Piezo drivers can withstand heat better. A multicolor LED can be used to indicate different levels of keg fill—green is half-full, yellow is 25% full, red is 10% or less. In a crowded cold room, this indicator can help staff locate the empty keg.

Alternatively, frequency of flashing can indicate fill level, with a progression from intermittent flashing to fast flashing to steady signal indicating the keg becoming empty. The same can be accomplished with an acoustic transmitter. The LED can be under the QR code, such that it shines through the label.

Battery level is transmitted encoded in the wireless packet as either number of days or voltage. If number of days, the life calculation is determined inside the unit; if voltage, the life calculation can be on the server. Battery life can also be inferred by amount of time since charge, number of radio packet transmissions, or other values. This is used when a transmission from the keg with an actual data value is not available, or to supplement those values.

The hardware is designed to detect whether the keg it is attached to is inside a stack or not (see FIG. 60A). RSR kegs are typically designed so that the bottom chime of one keg nests with the top chime of a lower keg. A pressure switches embedded in the top chime can detect if a bottom chime is nested inside it. Proximity switches or radio transmission between the top and bottom chimes can also detect stacking, as shown in FIG. 60B. Communication of weight between units or of both the top and bottom units allows separation of the weight of the bottom keg from those above it. By measuring a change in the antenna/broadcast/receive characteristics due to another large piece of metal being nearby/on top/below. The impedance and reflectivity changes with the other keg being near (see FIG. 60B).

Detection of a tap connected to neck of keg can determine whether it is possible for a keg to be stacked on top. Measurements may be limited to when the tap coupler is attached to keg, since in this case it is not possible for a keg to be on top, and this is also when volume in the keg will be changing. A removable cap (see FIGS. 61A and 61B) over top of keg also accomplishes determination of when the keg is tapped.

Measurements are used to generate events and notifications to any interested parties in the distribution system. For example, alerts may be generated on temperature being out of bounds (i.e., keg gets too hot for contents). Alerts may be generated when keg is misplaced or outside expected locations. Alerts may be generated when contents are low, or are not being used, or are too old. Alerts may be generated based upon a user being nearby. Alerts may be generated based upon entering or exiting a location. Alerts may be generated based upon being in a location too long. Alerts may be generated based upon a detection device being nearby. Alerts may be displayed/received/shown/communicated on a mobile device. Alerts may be displayed/communicated on the keg itself.

The hardware is capable of calculating the weight of the container using load cells. This allows the amount of liquid in the container to be determined. Readings from multiple load cells around base of the container may be combined to determine weight. Shape and construction of chime, materials used, and embedded hardware is used to facilitate accurate function of load cells.

In order to facilitate sensor contacting with liquid inside keg, while being able to use existing tap couplers and not modify overall size of kegs, a "double neck" fitting is used on keg (see FIG. 63A). The larger neck is cast into metal keg, the larger neck accepting an adapter which receives normal keg spears (see FIG. 63C). The adapter allows normal unmodified keg spears to be used in keg, and the adapter itself can be removed for servicing. The adapter is fitted with sensors and/or batteries, and may communicate with other sensors inside or outside of the keg.

A donut-shaped float is installed in each keg (see FIG. 63B) constructed to be lighter than contents so it floats on surface of liquid inside keg. The spear in the keg provides an axis along which float travels, and the distance from the top or bottom of the keg to the float is measured. Measuring location of the float within the keg can be accomplished by several means:

a. by varying resistance along the length of the spear b. by time of flight of a signal generated by float c. by bouncing a signal off the float d. by measuring the reflections generated by the float transmitting e. by a sensor on the spear that detects location of float relative to it f. by the float measuring reflections or physical attributes, and communicating this information The float apparatus is designed to not fall into hot sanitation liquid when keg is upside down. When a battery is used, battery life is designed to last long enough so it may be replaced when spear is typically serviced, but it may also be serviced at any time by removing spear. Power may come from battery inside float, or when using double-neck adapter, from the adapter, or from converting motion of the keg or its contents into charging.

An extra sensor port is put in the keg and hidden under the rubber/plastic chime (see FIG. 64). This port allows direct access to liquid inside keg, facilitating measurements. Using double neck adapter or extra sensor port, sensors may contact liquid inside keg and make physical measurements such as pH. These sensor measurements are combined with other sensor measurements (such as temperature) to determine if the product in the container is within desired specifications. It can also determine if the product has spoiled, if contaminants have occurred, if the keg was cleaned adequately, if the keg has been sanitized, etc.

One embodiment uses an unpaired radio mode. Specific measures are taken to insure the wireless data is encrypted, private and anonymous. Because the radios operate in an unpaired fashion, a typical smart phone can pick up the wireless data passively (no pairing function has to be performed to read data). Because the data is encrypted, the data is anonymous, in the sense that the mobile device might not understand the encrypted signal and what it means without a decoding key. It is not necessary to keep track of the particular user and/or particular mobile device receiving the data, so that the user/device that picked up the data is also anonymous (to comply with local privacy laws). Many users pick up data that is private and not necessarily of use to them (i.e., they pick up signals from 10 kegs and only 5 are theirs and 5 belong to someone else—the user only has decoding rights for his 5 kegs). Every phone picks up (passively) any broadcasted (unpaired, encrypted) data and forwards it on to the servers. A specific notable case is when a user has no decoding keys, and only picks up data and forwards it. This user anonymously and passively picks up data that is meaningless (i.e., encrypted so it is really just a meaningless sequence of bits) that is of no use to him personally, but at a system level the user's mobile device is feeding valuable data into the network. The user might do this for other reasons—for example, to receive promotions, participate in interest groups, receive abstracted and market-level summarized reports, etc. The encryption technologies used insures that rogue users cannot inject bad data into the system—it is possible to verify the data received by the system is valid. In this way, data collection is separated from data ownership and data display. Every user may collect data he has no interest in personally, in a cooperative fashion, so that collectively all the users benefit from getting data forwarded to them that each does care about and can display. In this way data collection is anonymous; data display is only to authenticated users with decoding keys; decoding keys are only given to users who have ownership rights in a particular subset of data. This provides ability to leverage a much larger pool of data collectors than normal. Any user can be a passive data collector—there is no requirement for ownership in any hardware, to install any gateways, to perform any device pairing, perform network provisioning, understand or decode the signal from the radios, etc.

By purposefully leveraging this large pool of passive data collectors, the wireless device is smaller, is cheaper to manufacture, is easier to install, and has greatly increased battery life. Using one-way communication (broadcast, non-connected) as opposed to two-way communication (connected, pairing) achieves twice the battery life for the wireless transmitter, or one-half the battery size. The battery is a major portion of the size, cost and weight of the transmitter.

RFID usually has a single unique serial number (UUID) that does not change (it is important not to change so that it is always clear which tag it is). This has the drawback that the serial number is publicly visible over the radio. In contrast to this, the presently disclosed device uses the onboard processor to cryptographically rotate keys so the broadcast UUID is constantly changing, and only someone with a decoding key can make any sense of the broadcasted data. The same encryption and key rotation applies to the sensor data and all information broadcast by the radio. Typical RFID solutions broadcast an unchanging UUID. This allows someone to detect the assets of its competitors—tracking each of the competitors containers as they travel through the distribution chain. This allows them to gain valuable insight into their competitors' sales volumes, sales outlets, distribution routes, delivery days and timings, etc. In contrast to this, the presently disclosed device has a signal that is encrypted and cannot be monitored in this way.

One way companies try to partially mitigate against RFID or other wireless devices publicly broadcasting the UUID is by requiring pairing. But even then, the pairing signal itself can be monitored. This is why encrypting and rotating keys is advantageous.

The electronic circuitry 190/305 of the radio transmitter encodes the communicated data, using cryptographic encryption, authentication or other types of encoding. Encryption hides data being communicated from being eavesdropped upon, while authentication securely identifies the radio transmitter electronic circuitry 190/305. An example of the type of algorithm used for encryption are families of asymmetric public key algorithms such as elliptic-curve, RSA, Cramer-Shoup and others. An example of the type of algorithms used for authentication are secure hash functions such as MD5, SHA, BLAKE and others. In both cases the keys are ideally generated algorithmically based upon timestamp, unique identifiers, and/or shared secret methodologies as would be readily appreciated by the skilled addressee. This mode may optionally use major/minor numbers, wireless parameters, serial number of board, processor identifier, hardware source of randomness, or other inputs to generate keys. Unique identifiers, shared secrets or other input to the algorithm may be established at time of manufacture, before deployment, or at other times of configuring or updating the device, using wired (for example UART), wireless (for example, GATT) or other communication means with the device. Over-the-air firmware updates or other wireless update mechanisms may be used to update or change parameters to the algorithm.

By using a timestamp as part of the algorithm, the keys can rotate automatically on a time interval, and the broadcasted identification information also similarly rotated. Only someone knowing the matching key and algorithm can successfully follow the data changes as the keys rotate. Symmetric encryption algorithms such as AES, BlowFish, ChaCha, RC4, Salsa20 or others can be used on the basis of a shared secret. Such shared secret is ideally algorithmically generated using timed key rotation.

Part of the shared secret may be based upon a customer identifier, sales identifier, or batch number. In this way, each customer is able to have unique keys which allow tracking and decoding only that customer's devices, and does not decode any other devices.

Part of the shared secret may be based upon an individual device identifier. If such identifier is randomly generated and kept secret by the system, each device will have unique encryption/decryption keys known only to the system, and by controlling access to these keys the system is able to control who has access to track and decode data from each device.

Using encryption and authentication in a broadcast only mode achieves the lowest possible power usage, while also protecting the data from being eavesdropped, and also authenticating each device. Algorithms that are implemented in hardware on the main processor are generally lower power than those implemented entirely in software (for example, some processors provide built-in AES encryption engines).

The encryption and authentication may or may not leverage the wireless communication medium. Bluetooth LE used in broadcast mode, for example, does not natively implement encryption nor authentication—the encryption and authentication is performed by the processor before transmitting the data packet. Other wireless mediums such as cellular might have encryption and/or authentication built-in to the protocol.

Any key rotation to mask the identity of the wireless device (to prevent surreptitious tracking as described below) needs to rotate all the identifying information, including any unique identifiers provided in the native protocol itself (for example, the Bluetooth BD_ADDR).

A simplified example of a data transmission might be:
Section 1, Bytes 1-4: H1 known identifier
Section 2, Bytes 5-8: H2 device identifier bytes
Section 3, Bytes 9-24: D1, encrypted data
Section 4, Bytes 25-32: H3, authentication bytes
Section 1, H1 is a secure hash of K+T, where K is a known value and T is the time interval from an agreed upon starting time. Because the system knows both K and T, it can compute H1. H1 is used to distinguish our wireless devices from other wireless devices. This allows the system to quickly find devices it knows about, and to determine whether to perform the calculations in the following sections, whether to forward the data anonymously, etc. K may be a static value, a value determined algorithmically, etc.

Section 2, H2 is a secure hash of S+T, where S is a shared secret unique to each device, and T is the time interval since S was stored on the device. The shared secret S is stored on each of our devices, and all the shared secrets are known only to the system. Because the system knows both S and T, it can compute H2 for its list of known devices to determine which device is broadcasting. Any H2 that does not match the system's list of known devices invalidates the data transmission.

Section 3, D1 is an encryption of the data D (including unique identifier) using S+T as the source of keys. Since the system knows both S and T and the algorithm to generate the keys, it can compute the keys and decrypt D1 to get D. Data D contains sensor, state information or other data.

Section 4, H3 is a secure hash of D before encryption. After decrypting D1 to get D, the system can compute the hash of D, and compare to Section 4. A valid comparison authenticates the decrypted data. If the data does not authenticate, the data transmission is invalidated. Invalidated data is rejected by the system.

The sections may vary in size (number of bytes) according to the needs of the system. Sections may be omitted. This example is for illustration purposes only, and the actual format of the sections and data may vary according to the algorithms chosen, wireless networks used, level of encryption and authentication required, size of transmitted data, error rate of wireless medium, error correction, retransmission, crowdedness of radio spectrum, and other factors.

In some cases it may be advantageous to transmit some of the values in plain text. For example, H1 may be a static value instead of the described hash output. This would allow a receiver to more easily recognize known devices (no hash function calculation required).

Referencing FIG. 18 and FIG. 15 in the present application, the radio has been specifically designed to provide private secure communication with anonymous store and forwarding.

RFID and similar technologies publicly broadcast their unique serial number (UUID). Any RFID reader can read any RFID tag. This means once a UUID is associated with a particular keg, it is possible for someone to eavesdrop on the wireless signal and surreptitiously track the location of that keg in the distribution chain—all they have to do is listen for the UUID being broadcast. Such kegs are loaded onto shared shipping vehicles, stored in shared warehouses, distributed to public restaurants with multiple vendors—all places where kegs are already being tracked, by competitors who gain by eavesdropping on the signals.

By detecting and tracking the publicly broadcasted UUID, competitors can gain valuable insight into the business and operations of the owner of the keg—they can determine product sales volumes, locations of distributors and vendor outlets, distribution networks, delivery routes, delivery days and timings, etc.

In addition, anyone having once eavesdropped on the UUID can deceive the system by transmitting the UUID again somewhere else. Broadcasting the UUID in location Y will make the system think the keg is at location Y—when actually it might not be there at all.

Pairing does not protect against this type of public tracking. Pairing is a user activity done on a device-to-device basis—the idea being if a given device has not been paired, it cannot be interacted with. However, pairing is of limited value for security against tracking—the pairing function itself requires the device being paired to identify itself (so the user can verify the correct device is being paired). So eavesdroppers can simply listen for the pairing signal to uniquely identify a device. It is necessary to specifically design into the system as a whole, and into the wireless device itself, measures to prevent against this type of surreptitious tracking.

Pairing has a further limitation—it severely limits the number of receivers/gateways that can track a given device. Only those receivers that have completed pairing can track a device. It places a burden on the user to complete the pairing activity for each receiving device.

The present invention is specifically designed to overcome these limitations. Using CPU 172 and electronic circuitry 190/305, asymmetric and algorithmically derived keys are used to prevent eavesdropping. In addition, no pairing function is required, allowing passive and anonymous data collection by a much greater pool of reading devices than is possible in the previous art. The encrypted radio frequency signals broadcast by the transmitter of the apparatus of the present invention have been designed such that any normal, ubiquitous smart phone can receive the signal passively, without requiring pairing or any user interaction. In addition, since the data is optionally encrypted with an asymmetric key, although any mobile device can receive the signal, it cannot be decoded without a corresponding decryption key. The UUID and all sensor data is hidden from eavesdropping, and the broadcast signals are meaningless, secure and private without the corresponding decryption key.

Because the encrypted signal is advantageously generated algorithmically using a timestamp, the decryption key and broadcasted signal constantly changes, preventing tracking of individual devices. In addition, the optional asymmetric encryption technique allows all data to be independently verified as being authentic, such that it is not possible to send deceptive data into the system.

Because the encryption technique verifies valid data, it is not necessary to know which device/user picked up the data. The encryption and authentication technique allows all data to be independently verified as being authentic irrespective of which user/mobile device picked it up. This allows completely anonymous data collection, protecting the privacy of the individual users participating in the system, and allowing the system to adhere to local privacy laws.

The present device may use more than one radio—one radio might be for short range, accurate and more frequent location determination (i.e., bluetooth, WiFi, UWB, etc.) and another radio for long range, less accurate and less frequent location determination (i.e., LPWan, UNB, LoRa, NB-IOT, cellular, satellite, etc.). By leveraging both technologies we can achieve longer battery life and a combination of both long range and accurate location. At least one of these will typically have the anonymous, encrypted features described above (usually the short range more accurate one).

Additionally, blockchain technologies can be used to keep a ledger of broadcasted data, state, location or other information in the system, such as the states in FIG. 51B. Such ledgers can authenticate the state of the product in the attached container in distribution network 10. Entries in the ledger can be authenticated by the system as whole, in order to enable distributed ledgers. Individual devices such as radio transmitter 16 or tap handle flow measuring and reporting apparatus 301 can have their own ledger and/or feed transactions into a product ledger. Ledgers can be created for groups of devices such as all the devices owned by a customer. Public distributed ledgers enable the storage to not be required on the wireless device 190/305. The system may update the ledgers automatically based upon determined movement, physical state, or other measurements in distribution network 10.

The present device integrates well with under-counter storage and cooling cabinets as shown in FIG. 65. When used in such cabinets, the cabinets may incorporate a stationary reader 1411 to detect kegs that are inside the cabinet. Sensor readings may combine with POS systems, flow meters, and/or weighing systems in the cabinet. Weighing mat 250 may be used in the cabinet to measure volume of liquid inside the keg.

The present device supports use of portable cooling and dispensing devices as show in FIG. 66. In such portable devices, the present device may be used to track the location of and measurements about the portable cooling and dispensing device (such as temperature), and/or capture measurements about the keg inside it. The portable cooling and dispensing device may incorporate weighing mat 250 to measure the weight of the liquid inside the keg.

In summary, a liquid product distribution network monitoring and reporting system here disclosed includes a keg distribution monitoring and reporting apparatus for operation in association with a tap handle flow monitoring and reporting apparatus. The keg distribution monitoring and reporting apparatus include a radio transmitter device comprising a low-energy consumption radio/processing module. Sensing circuitry associates with the radio transmitter device for sensing and communicating to the radio/processing module physical properties associating with the keg. Radiofrequency signal transmission circuitry associates with the radio/processing module for transmitting radiofrequency signals without the use of geographic position or cell radio circuitry.

The tap handle flow monitoring and reporting apparatus includes circuitry for sensing flow of a liquid through a tap positioned to dispense a liquid from the keg. The tap handle flow monitoring and reporting apparatus includes a tap handle radio transmitter device for fitting within and being protected by a tap handle and comprising a low-energy consumption tap handle radio/processing module. The tap handle sensing circuitry associates with the tap handle radio transmitter device for sensing and communicating to the tap handle radio/processing module physical properties associating with liquid dispensed from the keg.

Tap handle radiofrequency signal transmission circuitry associates with the tap handle radio/processing module for transmitting radiofrequency signals from the tap handle flow monitoring and reporting apparatus without the use of geographic position or cell radio circuitry. A tap handle battery power supply fits within and protected by the tap handle and electrically powers the tap handle radio transmitter device.

A mobile communications device including geographic position sensing and cell radio circuitry for moving to a plurality of locations within the keg distribution network and configured to selectively receive and process the radiofrequency signals from the small form factor and reporting device and/or the tap handle flow monitoring and reporting apparatus passively and without user interaction. The mobile communications device further includes memory circuitry for storing data and computer processor executable instructions relating to the keg and the keg distribution network. The mobile communications device further includes computer processing circuitry for processing the data and executing the executable instructions for monitoring and reporting the physical properties and location of the keg within the keg distribution network, without otherwise using network uplink/gateway circuit device.

The keg distribution monitoring and reporting apparatus and the tap handle flow monitoring and reporting apparatus may operate independently or collaboratively for sensing and reporting the status of fluid storage, flow, and financial operations relating to the distribution of the liquid product throughout the liquid product distribution network.

Because a user operates the tap handle, the tap handle sensing device may incorporate sensors which can distinguish between different people operating the same handle. For example, the tap handle incorporates an NFC detection circuit to detect a bracelet or ring worn by each employee; could incorporate a fingerprint reader; or other biometric sensor to distinguish who is operating the handle. This could be anonymous—merely distinguishing between individuals—or particular and a security function—only allowing certain people to operate the handle.

Combining the above data collection with a record of beverages dispensed provides a cross-reference of employee activity with sales activity.

FIG. 54 illustrates a keg 500 for transporting liquids in a liquid product distribution network, according to an embodiment of the present disclosure. Liquid product distribution network (or distribution network) is a system for monitoring, controlling and/or optimizing flow of products delivered to customers via containers (for example containers such as keg 500) that flow in a distribution network. Alternatively, distribution network is a system for monitoring, controlling and/or optimizing use of equipment and/or resources that are spread out in a geographic area, move between or among locations, and have usage, contents, or other state information associated with them.

Distribution network enables optimization and efficiency in the delivery, pickup, and tracking of kegs 500 and/or keg content. Tracking of kegs and detailed knowledge of keg 500 contents makes possible automatic restaurant menu changes, automatic stock ordering, data for supplier manufacturing forecasts, automatic marketing and advertising messages, automatic and real-time inventory in warehouses and storage areas such as cold rooms, automatic check-in and check-out of containers, and optimization of replenishment delivery schedules and/or routing. Distribution network also enables determining how long a keg 500 or similar piece of equipment has been in service for triggering maintenance schedules, automatically generate invoices, monitoring lease compliance, measuring market trends and forecasts, and generating alarms. Distribution network further enables monitoring temperature of contents for legal and regulatory compliance, reporting a "good" state of keg contents, as well as reporting over/under temperature procedures. For this purpose, several sensing devices may be installed in the keg 500. In present embodiments, the keg 500 includes a main cylindrical body 502 manufactured from a metal such as steel or other material. The keg 500 further includes a top chime 504A and a bottom chime 504B usually made of rubber such that the top chime 504A and the bottom chime 504B shields the metal body 502 from top and bottom respectively. The keg 500 comprises the keg distribution monitoring and reporting apparatus installed in the chimes 504A and 504B as depicted in FIG. 55A through FIG. 58 in accordance with various embodiments of the present disclosure.

FIGS. 55A-55G illustrate a sensing and reporting device 602 installed in the chimes 504A and 504B of the keg 500, in accordance with various embodiments of the present disclosure. The sensing and reporting device 602 comprises sensing circuitry embedded in the top chime 504A or bottom chime 504B of the keg 500 without extending any keg physical boundaries in any dimension. The top chime 504A or bottom chime 504B physically protects the sensing circuitry during keg distribution in the keg distribution network for sensing at least one of physical properties and location associated with the keg 500. The sensing and reporting device 602 comprises a radio transmitter device comprising a low-energy consumption radio/processing module, and a radio frequency signal transmission circuitry associated with said radio/processing module for transmitting radiofrequency signals from the sensing and reporting device 602.

The sensing and reporting device 602 may include an outer housing for enclosing the sensing circuitry, the radio transmitter device and the radio frequency signal transmission circuitry. The outer housing encompassing the components of the sensing and reporting device 602 secures to top chime 504A or bottom chime 504B using screws or other fastening mechanism. In one embodiment, the outer housing further comprises a unique identifier (as may be clearly seen in FIG. 55E) fixed to the exposed surface of the outer housing, because the unique identifier of the sensing and reporting device 602 uniquely identifies the keg 500, distributor and brand, the status of the keg 500 may be automatically relayed to brewery or distributor.

According to the teachings of the present disclosure, wherein width of the sensing and reporting device 602 appears less than 2 inches in order that sensing and reporting device 602 may fit on either the top chime 504A or the bottom chime 504B of a keg 500.

Figure 55A:
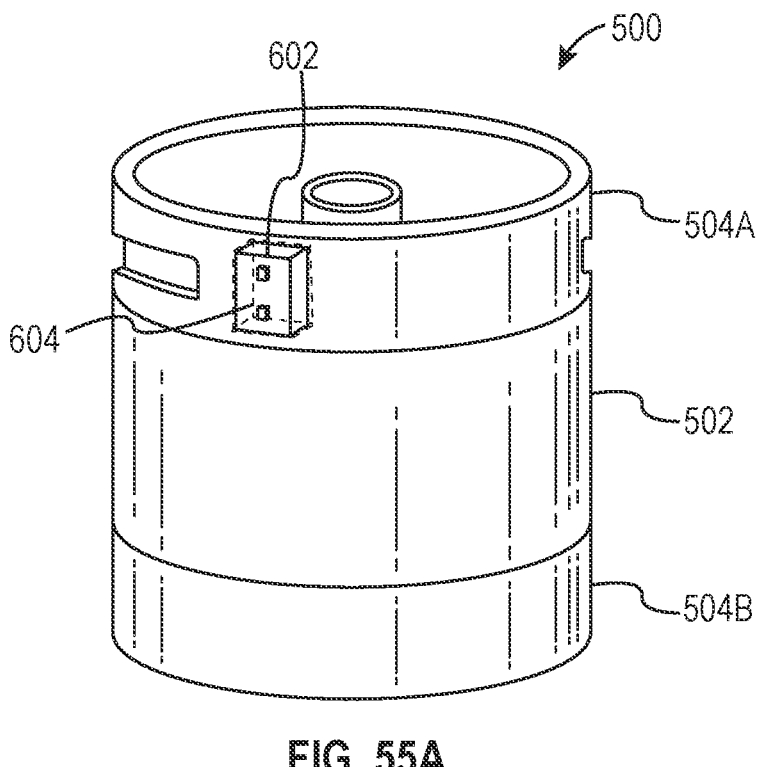

As illustrated in FIG. 55A, the sensing and reporting device 602 is placed inside a cavity 604 carved in the top chime 504A of the keg 500. Herein, the cavity 604 is carved by cutting through the top chime 504A to allow for the placement of the sensing and reporting device 602. The cavity 604 is carved at a circumference of a rim of the top chime 504A or the bottom chime 504B.

Figure 55B:
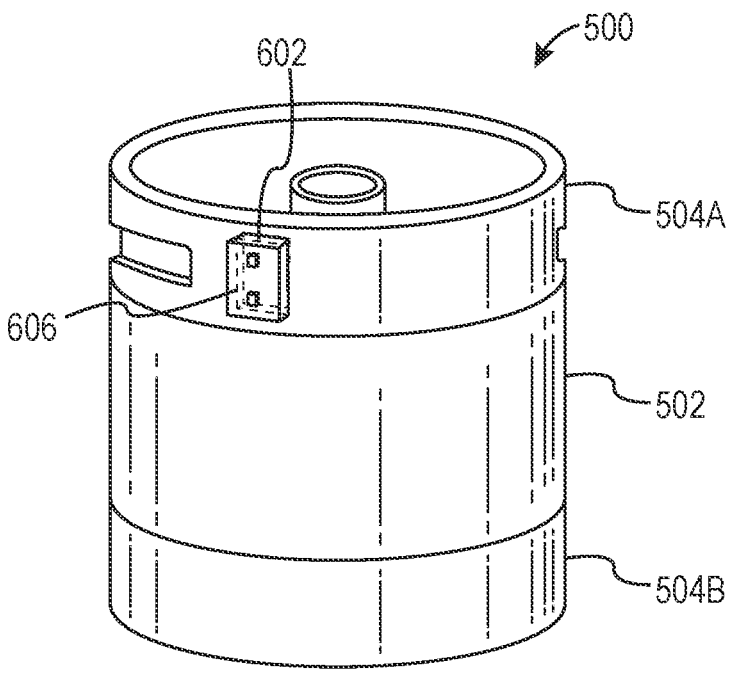

As illustrated in FIG. 55B, the sensing and reporting device 602 is placed inside a cavity 606 carved in the top chime 504A of the keg 500. Herein, the cavity 606 is carved by making a small recess (not carved all the way through) in the top chime 504A to allow for the placement of the sensing and reporting device 602. The cavity 604 is carved at a circumference of a rim of the top chime 504A or the bottom chime 504B.

Figure 55C:
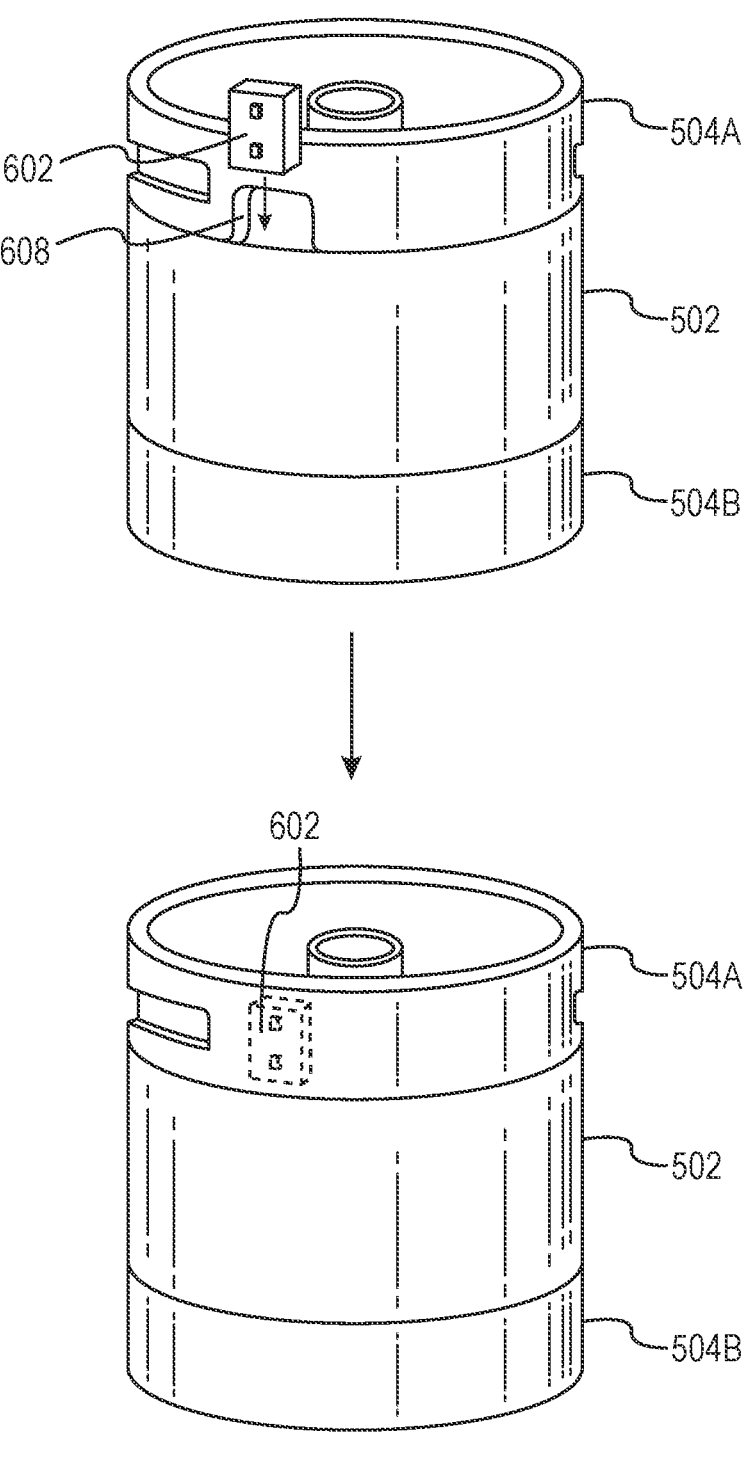

As illustrated in FIG. 55C, the sensing and reporting device 602 is placed inside a rim of the top chime 504A. As shown, a portion of the rim 608 is moved away from the keg 500 to expose a small recess where the sensing and reporting device 602 is placed. Then the moved portion of the rim is replaced, hiding the device. As may be seen, the sensing and reporting device 602 is placed in the exposed and recess and is shielded inside the rubber chime 504A, thereby securing the sensing and reporting device 602. Such a placement of the sensing and reporting device 602 inside the rubber chime 504A is easy to install and requires minimal resources. Optionally, the sensing and reporting device 602 is securely arranged in the recess of the chime 504A or 504B using one or more fastening mechanisms such as adhesives, screws, pins and so forth.

Figures 55D, 55E:
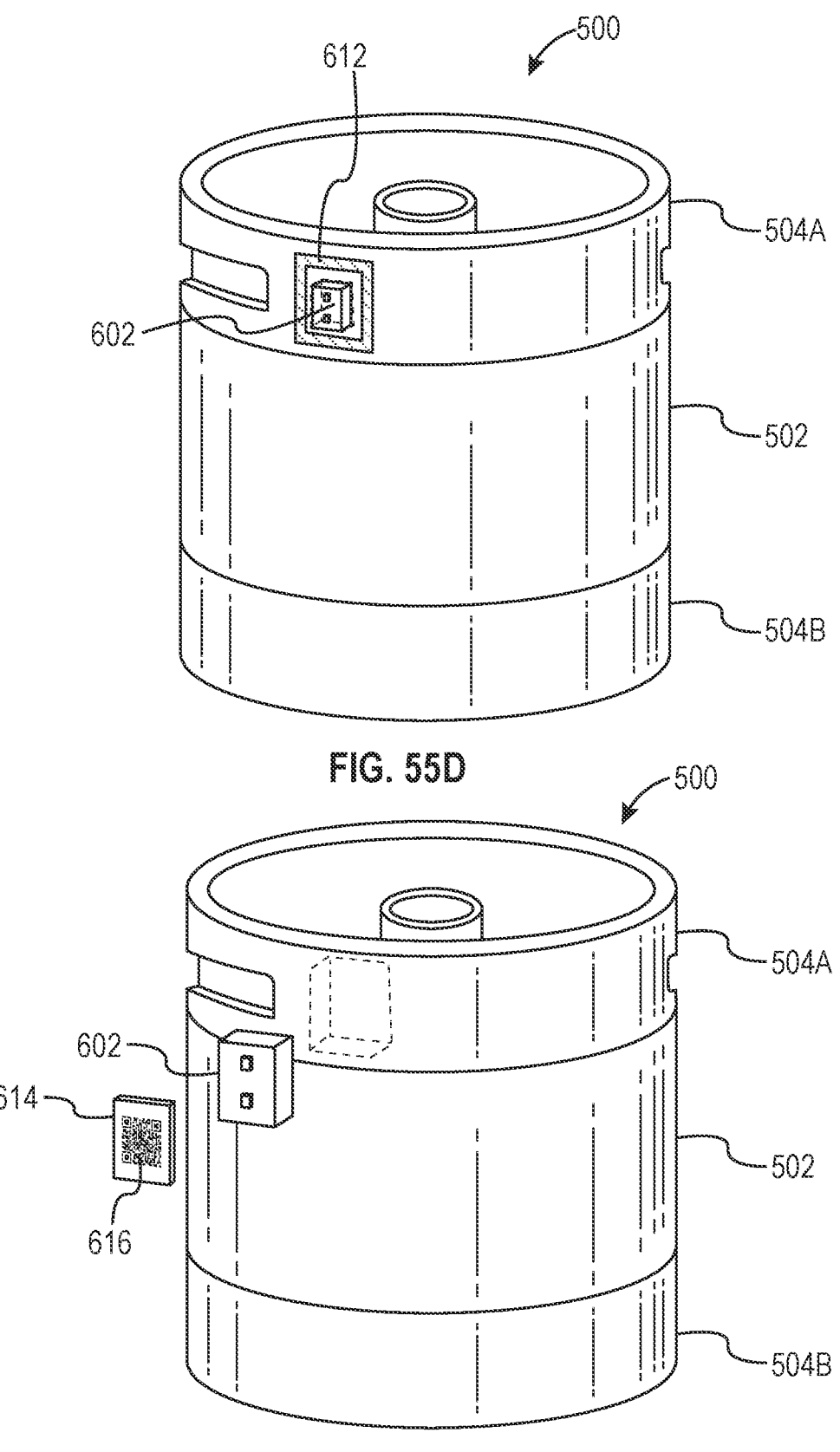

As illustrated in FIG. 55D, the sensing and reporting device 602 is insulated by putting an insulation 612 around the sensing circuitry to sink heat produced from one or more components of the sensing and reporting device 602 such a battery power supply unit. Further, the insulated sensing circuitry is embedded in mold for the forming the top or bottom chime 504A or 504B of the keg 500 with the sensing circuitry embedded therein.

As illustrated in FIG. 55E, the sensing and reporting device 602 is arranged in the top chime 504A of the keg 500. In this embodiment, the sensing and reporting device 602 is covered with a covering or a lid 614. The lid 614 is arranged to protect the sensing and reporting device 602 from any damage that may incur during storage or transporting. Optionally, an exposed surface of the lid 614 may include a unique serial number 616 such as a bar code, QR code, or other coding visible on its outer side. Note that the lid serial number may be different from radio serial number to discourage spoofing. The lid 614 may include variety of tamper resistant mechanisms for preventing unauthorized removable of the sensing and reporting device 602. The lid 614 may also include an integrated desiccant container for protecting against moisture condensation in varying temperatures. The lid may be an integrated portion of the main housing 602. Beneficially, the arrangement of the lid 614 ensures that prying or depletion of the rubber chime 504A can be avoided when the sensing circuitry needs to be examined or the battery power supply unit needs to be replaced.

Figure 55F:
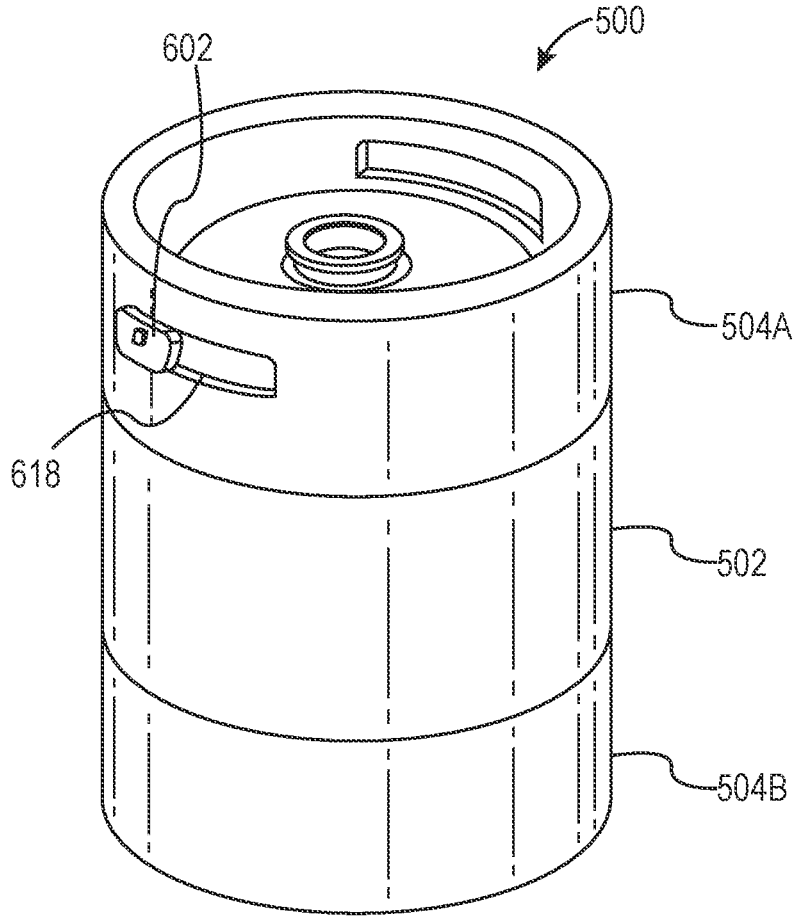

As illustrated in FIG. 55F, the sensing and reporting device 602 is placed inside a handle 618 of the top chime 504A. The sensing and reporting device 602 is secured in an inner recess on the handle 618 by using any of the fastening mechanisms such as screws, pins, ties, adhesive material, or mechanical or electronic locks.

Figure 55G:
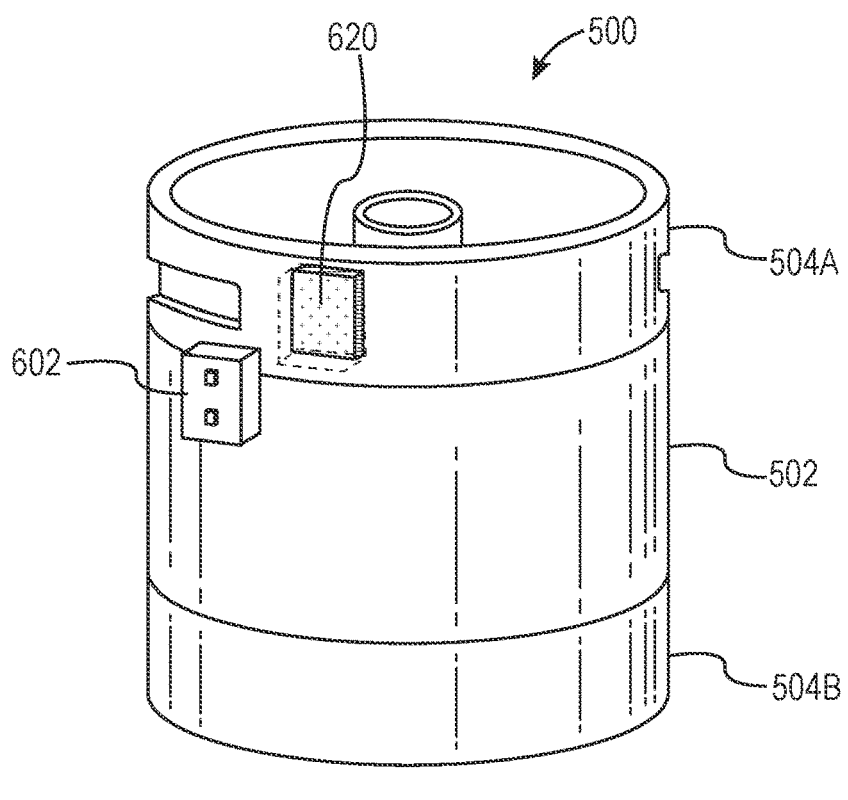

FIG. 55G depicts an exemplary mode of attaching the sensing and reporting device 602 of the present disclosure to keg 500. For example, using an epoxy layer 620, attachment of sensing and reporting device 602 may be secure and waterproof to protect PCB/batteries assembly. Epoxy layer 620 may be applied to attachment space which provides a small volume into which an enough proxy may be applied for a firm setting of the sensing and reporting device 602 on keg 500. Alternatively a less permanent adhesion mechanism such as velcro can also be used. By using the same epoxy that mounts housing to keg 500, manufacturing steps can be skipped. The outer housing allows the sensing and reporting device 602 to interface with three-dimensional curved keg 500 surfaces, maximizing adhesion and protection afforded by keg 500 chimes, while minimizing heat transfer from the keg 500 body.

FIGS. 56A-56C illustrates mechanisms for recharging the battery power supply unit 702 according to various embodiments of the present disclosure. Using rechargeable battery power supply unit 702 allows the sensing and reporting device 602 to be completely sealed, where only electrical contacts on the outside provided to charge the battery 702, or wireless charging methods may be employed to the recharge the battery 702. As illustrated in FIG. 56A, the battery power supply unit 702 is charged using wireless methods such as wireless charging inductive loop or thermoelectric generator 704 provided at the top chime 504A and/or bottom chime 504B. Providing an inductive loop 704 or other contactless charging mechanism allows penetration of the housing to be avoided, decreasing manufacturing cost, and allowing less precise interface between housing and charging station. As illustrated in FIG. 56B, the said battery power supply unit 702 is rechargeable and is charged by charging contacts 705 provided at the top chime 504A and/or bottom chime 504B. Charging contacts or metal contact pins 705 may appear at surface or outside of housing for connecting associated sensing circuitry on PCB/battery assembly for creating a conductive circuit. That is, contact pin 706 may make electrical contact with rim of the keg 500, which permits electrical current flow to contact pin 705. The resulting circuit uses minimal voltage, and current to provide indication that the sensing and reporting device 602 is firmly secured on the keg 500. Using a rechargeable battery 702 allows the unit to be completely sealed, and only electrical contacts on the outside provided to charge the battery 702. As illustrated in FIG. 55C, the battery power supply unit 702 is charged using kinetic charging means 708 provided in the top chime 504A and/or bottom chime 504B to covert motion of the keg or its contents into electrical power.

FIGS. 57A-57C illustrates mechanisms for replacing a chargeable or non-rechargeable battery power supply unit 702 according to various embodiments of the present disclosure. In an embodiment, the said battery power supply unit 702 is non-rechargeable and is optimized in a manner that the said sensing and reporting device 602 operates for a period of up to five years. Herein, the top chime 504A and/or bottom chime 504B includes means to allow for removing and replacing the said battery power supply unit 702. As shown in FIG. 57A, the battery power supply unit 702 is detachably arranged in the top chime 504A, such that the battery 702 can be replaced when the battery 702 becomes non-functional after a period of time. As shown in FIG. 57B, the sensing and reporting device 602 may comprise a main battery power supply unit 702 is and a secondary battery power supply (not shown) enclosed in a housing 710. The main battery power supply unit 702 may be removed and replaced, while the secondary battery power supply unit keeps the sensing circuitry functional. This ensures that the operations of the sensing circuitry are affected while the main battery power supply unit 702 is being replaced. As shown in FIG. 57C, the said battery power supply unit 702 is detachably coupled to a carrier 712 embedded in the top chime 504A or bottom chime 504B of the keg 500 and is charged by detaching the battery power supply unit 702 from the carrier 712. Herein, the keg distribution monitoring and reporting apparatus further comprises a secondary battery power supply unit (not shown) for powering one or more of the sensing and reporting device and the radio transmitter device when the said battery power supply unit 702 is detached from the carrier 712. The battery power supply unit 702 may be attached to the carrier 712 by an authenticated attachment mechanism that provides a secure attachment of battery power supply unit 702 to the carrier 712, while allowing nondestructive detaching/replacement by only authorized parties. Authenticated attachment mechanism operates within radio frequency transmitter, housing, and attached to hook and catch. Mechanical hook and catch provides a permanent fixture for battery power supply unit 702 to carrier 712. The hook is hidden from external tampering—only an internal actuator (electromagnet, motor, etc.) can disengage the hook, thereby preventing tampering from unauthorized personnel.

FIG. 58 illustrates one or more sensors 802A-D arranged in the top chime 504A and/or bottom chime 504B of the keg 500 according to an embodiment of the present disclosure. Many types of sensors 802A-D are useful for measuring and communicating physical characteristics of the container and its contents. The one or more sensors 802A-D may include GPS sensor, attitude/position sensor, acceleration sensor, temperature sensor, pH sensor, clarity sensor, acoustic sensor, proximity sensor, spoilage sensor, time/temperature expiration sensor, alcohol percentage determination sensor, bitterness sensor, brand (multiple sensors combined to automatically determine which beer is in keg), etc. Depending on the sensor 802A-D, it may be embedded completely within a chime, may interface with or be attached to the spear or valve on the keg, may be attached to an auxiliary port on the keg, may penetrate and/or be inside the keg, etc. The sensors 802A-D may make use of measured differences between when the keg is tapped or untapped, right side up or upside down, stacked or un-stacked, etc. The one or more sensors 802A-D can be placed at different locations in the top and/or bottom chime. The one or more sensors 802A-D are configured to communicate with each other for exchange of data and/or information. Communication between the sensors can be wired (if in same chime), wireless (between chimes), or use the container itself for communication (acoustic, vibration, capacitance).

FIGS. 59A and 59B illustrate mechanism for indicating a remaining life of a battery power supply unit, in accordance with various embodiments of the present disclosure. The remaining life of the battery power supply unit can be indicated by use of light emitting diodes (LEDs) or acoustic devices embedded in the top and/or bottom chime of the keg 500. As shown in FIG. 59A, LEDs 902 are arranged to be visible from outside. The LEDs 902 are connected to the battery power supply unit 904. A battery level is transmitted encoded in the wireless packet as either number of days or voltage. The number of days of remaining battery life, the life calculation is determined inside the unit or on a server. Battery life can also be inferred by amount of time since charge, number of radio packet transmissions, or other values. This is used when a transmission from the keg 500 with an actual data value is not available, or to supplement those values. Herein, the LEDs 902 can either be visible when OFF (protrudes surface of chime), or only visible when lit (under the surface of chime). If the LEDs are insert molded, the sensing and reporting device 602 can be located in the mold such that the LED 902 itself is only just under the surface of the finished chime. If glued or left partially visible, the LED 902 can be a feature of the housing of the sensing and reporting device 602. Optionally, the LEDs 902 can be under the QR code, such that it shines through the label. A multicolor LED 902 can be used to indicate different levels of contents filled in the keg 500. In an example, green LED indicates that keg is half-full, yellow LED indicates that the keg is one-fourth full, and a red LED indicates that the keg is almost empty. Optionally, in a crowded cold room, the LED indicators i.e., Red LEDs indicator can help to locate the empty kegs. Alternatively, frequency of flashing can indicate fill level, with a progression from intermittent flashing to fast flashing to steady signal indicating the keg becoming empty.

As shown in FIG. 59B, acoustic drivers 906 such as speakers are arranged in the top chime 504A and/or bottom chime 504B. The acoustic drivers 906 are connected to the battery power supply unit 904. Battery level or other alarm is transmitted from the unit embedded in the chime. The transmitted audio may have characteristics to communicate data, identification, fill level or other information, either for a human to hear or for another device to hear. The speakers 906 may produce a modulated signal to indicate different levels of the contents in the keg or other data.

FIGS. 60A and 60B illustrate means for determining stacking of a first keg on top of a second keg, in accordance with various embodiments of the present disclosure. As may be seen in FIGS. 60A and 60B the sensing and reporting device of the keg distribution monitoring and reporting apparatus further comprises one or more of proximity sensor, pressure sensor and radio impedance/reflectivity sensor arranged in the top and/or bottom chimes. Notably, when two kegs are stacked with one above the other, the one or more of proximity sensor, pressure sensor and radio impedance/reflectivity sensor in lower keg of the two kegs detects upper keg stacked thereon, or vice-versa. As shown in FIG. 60A, a first keg 1002 is stacked upon a second keg 1004. Herein, the first keg 1002 comprises grooves 1006 on the bottom chime that are to be fitted onto pressure sensors 1008 arranged on the top chime of the second keg 1004. When the first keg 1002 is stacked on top of the second keg 1004, pressure is applied on the pressure sensors 1008 which is turn indicates that the first keg 1002 is stacked on top of the second keg 1004. As shown in FIG. 60B, the first keg 1002 is stacked upon the second keg 1004. Herein, the first keg 1002 comprises proximity sensors 1010 on the bottom chime and the second keg 1004 comprises proximity sensors 1012 arranged on the top chime of the second keg 1004. When the first keg 1002 is stacked on top of the second keg 1004, proximity sensors 1010 and 1012 are activated which in turn indicate that the first keg 1002 is stacked on top of the second keg 1004. Sensors 1010 and 1012 may communicate data with each other using wireless, electrical, mechanical or other means facilitated by their proximity FIGS. 61A and 61B depict a mechanism for determining whether a tap or cap is secured at an opening of the keg, in accordance with various embodiments of the present disclosure. The event of arrangement of keg tap or removal of keg cap is used by distribution network. By using keg cap, distribution network may determine with high probability if keg has been put on tap. In an example, a vendor will usually not remove keg cap until the keg is put on tap, because keg cap keeps dirt and food out of the keg opening. As shown in FIG. 61A, the event of arranging a tap 1102 on a neck or opening of the keg 500 is detected by an emitter 1104 and receiver 1106 based sensing means for detecting attachment of a tap or a coupler thereof at a neck of the keg. Herein, the emitter 1104 and receiver 1106 based sensing means may be line of sight sensors, such that the emitter 1104 and the receiver 1106 fail to communicate with each other when obstructed with an obstacle such as a tap. Therefore, when the tap 1102 is placed between the emitter 1104 and the receiver 1106, the connection between the emitter 1104 and the receiver 1106 is broken thereby indicating that the keg 500 has been tapped. As shown in FIG. 61B, a cap cover 1108 is placed over the opening of the keg 500 connected to a switch 1110. The cap 1108 protects the contents of the keg 500 from contamination when the keg is stored or transported. The sensing and reporting device 602 of the keg distribution monitoring and reporting apparatus further comprises a removable cap cover switch 1110 for detecting opening of a cap 1108 from a neck of the keg 500. When the cap 1108 is removed from the neck of the keg 500, the cap cover switch 1110 is opened, thereby indicating that the cap 1108 is removed from the neck of the keg 500.

FIG. 62 illustrates arrangement of load cells 1202 to determine a weight of the keg 500 according to an embodiment of the present disclosure. The load cells 1202 are configured to weigh the keg 500 when it is placed thereon. By being inside the bottom chime, the load cells do not extend the boundaries of the keg. The one or more load cells 1202 are arranged inside a bottom chime 504B of the keg 500 for determining a weight of the keg 500.

FIGS. 63A-63C illustrates a double neck fitting adapter and a float sensor for measuring a level of contents in the keg 500, according to an embodiment of the present disclosure. As shown in FIG. 63A, a double neck fitting adapter 1302 is adapted to fit into an opening in the neck 1304 of the keg 500 and allow for attachment of a standard tap or a coupler thereof at a neck 1304 of the keg 500. Notably, the larger neck is casted into metal keg, the larger neck receives the adapter 1302 which receives normal keg spears 1306. The adapter 1302 allows normal unmodified keg spears 1306 to be used in keg, and the adapter 1302 itself can be removed for servicing. As shown in FIG. 63C, the adapter 1302 comprises one or more sensors 1308 arranged therein. The one or more sensors 1308 may include power supply or charging devices 1310, temperature sensors, humidity sensors, pH sensors and other sensors that determine physical properties of the contents of the keg 500. As shown in FIG.

63B, the sensing and reporting device 602 of the keg distribution monitoring and reporting apparatus further comprises a float sensor 1312 arranged in the double neck fitting adapter 1302. The float sensor 1312 is configured to measure properties of the liquid product contained in the keg 500. The float sensor comprises a disc 1314 supported by a wire 1316 attached to the double neck fitting adapter 1302 and inserted into a spear 1306 extending from the double neck fitting adapter 1302 to inside the keg 500. Herein, the disc 1314 is configured to float over a surface of the liquid product contained inside the keg in contact therewith. A position of the disc 1314 is determined to measure the contents inside the keg 500. The position or location of the disc 1314 within the keg 500 can be determined by varying resistance along a length of the spear 1306 by time of flight of a signal generated by disc 1314, by bouncing a signal off the disc 1314, by measuring the reflections generated by the disc 1314, by a sensor on the spear 1306 that detects location of disc 1314 relative to it, by the float measuring reflections or physical attributes, and communicating this information to a processor or server. Such measurement may be accomplished without a wire to attach 1314 to 1302. The disc float apparatus is designed to not fall into hot sanitation liquid when keg is upside down. When a battery is used, battery life is designed to last long enough so it may be replaced when spear 1306 is typically serviced, but it may also be serviced at any time by removing spear. Power may come from battery inside disc 1314, or from the double neck fitting adapter 1302, or from charging circuits contained in the adapter or chimes. In some embodiments the disc is not powered but is used as a signal reflector.

FIG. 64 illustrates a sensor port 1402 formed in the main body of the keg, and molded under the top and/or bottom chime, to allow for direct access to the liquid product contained inside the keg 500, according to an embodiment of the present disclosure. The sensor port 1402 may be casted in the metal body of the keg 500 and hidden under the top and/or bottom chime such that when a sensor is placed therein, the sensor may have access to the liquid product contained in the keg 500. In an example, the one or more sensors may be a pH measurement sensor. This sensor measurements may be combined with other sensor measurements (such as temperature) to determine if the product in the container is within desired specifications. It can also determine if the product has spoiled, if contaminants have occurred, if the keg was cleaned adequately, if the keg has been sanitized, and so forth.

FIG. 65 illustrates an under counter cooler cabinet used for storing kegs attached to faucets on the counter above, with stationary reader 36 to detect kegs inside the cabinet, similarly to cold room 12 in FIG. 17 and/or cold room 278 in FIGS. 38A and 38B. Under counter cooler 1410 may optionally contain weighing mat 250.

FIG. 66 illustrates a portable cooler which can contain one or more kegs. The portable cooler can contain its own sensor for detecting movement of it within distribution network 1412, as well as being able to detect and collect data from sensor 1414 attached to keg. An optional weighing mechanism can be used, similar to weighing mat 250, for measuring amount of liquid inside the enclosed keg.

Furthermore, the mobile and communication device is configured to generate alerts any interested parties in the distribution system. In an example, alerts may be generated on temperature being out of bounds (i.e., keg gets too hot for contents), alerts may be generated when keg is misplaced or outside expected locations, alerts may be generated when contents are low, or are not being used, or are too old, alerts may be generated based upon a user being nearby, alerts may be generated based upon entering or exiting a location, alerts may be generated based upon being in a location too long, alerts may be generated based upon a detection device being nearby, alerts may be displayed or received or communicated on the mobile communication device. In an embodiment, alerts may be displayed or communicated on the keg itself.

The benefits and advantages that may be provided by the present invention has been described above regarding specific embodiments. These benefits and advantages, and any elements or limitations that may cause them to occur or to become more pronounced are not to be construed as critical, required, or essential features of any of any or all of the claims. As used herein, the singular forms "a", "an", and "the" are intended to include the plural forms as well, unless the context clearly indicates otherwise. It is further understood that the terms "comprises" and/or "comprising" or "includes" and/or including", or any other variation thereof, are intended to be interpreted as nonexclusively including the elements or limitations which follow those terms. Accordingly, a system, method, or other embodiment that comprises a set of elements is not limited to only those elements, and may include other elements not expressly listed or inherent to the claimed embodiment. These terms when used in this specification, specify the presence of stated features, regions, integers, steps, operations, elements, and/or components, but do not preclude the presence or addition of one or more features, regions, integers, steps, operations, elements, components, and/or groups thereof.

I claim:

1. A liquid product distribution network monitoring and reporting system, comprising:

a container distribution monitoring and reporting apparatus associated with a container adapted for containing a liquid product, the container distribution monitoring and reporting apparatus comprising:

a sensing and reporting device comprising:

a housing for fitting on and attaching to the container, sensing circuitry secured inside the housing for sensing at least one of physical properties and location associated with the container;

a radio transmitter device comprising a low-energy consumption radio/processing module; and radio frequency signal transmission circuitry associated with said radio/processing module for transmitting encrypted radio frequency signals from the sensing and reporting device;

a battery power supply unit fitted within and protected by the housing, for electrically powering the sensing and reporting device; and a mobile communications device comprising cell radio circuitry, and configured to receive and process encrypted radiofrequency signals from the radio frequency signal transmission circuitry of the container passively and without user interaction, wherein said mobile communications device further comprises memory circuitry for storing data and computer processor executable instructions relating to the container and a liquid product distribution network, and further comprises computer processing circuitry for processing said data and executing said executable instructions for monitoring and reporting the physical properties and location of the container within the liquid product distribution network and wherein the radio frequency signal transmission circuitry is configured to communicate with a communication processing device associated with a vehicle or transport environment within the liquid product distribution network for monitoring, controlling, and/or optimizing flow of liquid products for delivery to consumers via liquid product dispensing containers.

2. The liquid product distribution network monitoring and reporting system of claim 1, wherein the radio frequency signal transmission circuitry is configured to establish a mesh network with other radiofrequency signal transmission circuitries of other container distribution monitoring and reporting apparatuses associated with corresponding multiple containers in the liquid product distribution network monitoring and reporting system, for facilitating transmission of radiofrequency signals from respective sensing and reporting devices of the other container distribution monitoring and reporting apparatuses.

3. The liquid product distribution network monitoring and reporting system of claim 1, wherein the communication processing device is operable to control dispensing operations based on real-time data received from the container distribution monitoring and reporting apparatus.

4. The liquid product distribution network monitoring and reporting system of claim 1, wherein the sensing and reporting device of the container distribution monitoring and reporting apparatus further comprises sensors for detecting attachment of a valve, tap, cap cover or a coupler thereof at a neck of the container.

5. The liquid product distribution network monitoring and reporting system of claim 1, wherein the sensing and reporting device of the container distribution monitoring and reporting apparatus further comprises sensors for determining a fill level of the container.

6. The liquid product distribution network monitoring and reporting system of claim 1, wherein the radio transmitter device of the sensing and reporting device of the container distribution monitoring and reporting apparatus supports more than one type of radio communication and can choose among available connection points.

7. The liquid product distribution network monitoring and reporting system of claim 1, wherein the said battery power supply unit is rechargeable or replaceable.

8. The liquid product distribution network monitoring and reporting system of claim 1, wherein the container distribution monitoring and reporting apparatus further comprises a sensor port formed in a container body to allow direct access to the liquid product contained inside the container.

9. The liquid product distribution network monitoring and reporting system of claim 1, further comprising data and instruction for storage and executing on said computer processing system for associating events that may influence a transition of container states as monitored liquid product dispensing containers transit across various geographic regions.

10. The liquid product distribution network monitoring and reporting system of claim 1, further comprising data and processing within said liquid product distribution network for performing marketing or sales of liquid products in the liquid product distribution network.

11. A method for monitoring and reporting a liquid product distribution network, comprising:

operating a container distribution monitoring and reporting apparatus associated with a container adapted for containing a liquid product, said container distribution monitoring and reporting apparatus operating steps comprising:

fitting and attaching a housing to the container, comprising steps of:

securing inside the housing a sensing and reporting device;

embedding sensing circuitry in the sensing and reporting device for sensing at least one of physical properties and location associated with the container, attaching a radio transmitter comprising a low-energy consumption radio/processing module in the housing, and associating radio frequency signal transmission circuitry with said radio/processing module for transmitting encrypted radiofrequency signals from the sensing and reporting device;

fitting a battery power supply unit within and protected by the housing, for electrically powering the sensing and reporting device; and utilizing a mobile communications device for:

receiving and processing the encrypted radiofrequency signals from the radio frequency signal transmission circuitry of the container passively and without user interaction, storing data and computer processor executable instructions relating to the container and the liquid product distribution network, and processing said data and executing said executable instructions for monitoring and reporting the physical properties and location of the container within the liquid product distribution network, wherein the radio frequency signal transmission circuitry is configured to communicate with a communication processing device associated with a vehicle or transport environment within the liquid product distribution network for monitoring, controlling, and/or optimizing flow of liquid products for delivery to consumers via liquid product dispensing containers.

12. The method of claim 11, further comprising steps of establishing a mesh network with other radiofrequency signal transmission circuitries of other container distribution monitoring and reporting apparatuses associated with corresponding multiple containers in the liquid product distribution network, for facilitating transmission of radiofrequency signals from sensing and reporting devices from the other radiofrequency signal transmission circuitries.

13. The method of claim 11, further comprising steps of using the communication processing device for monitoring, controlling, and optimizing flow of liquid products for delivery to consumers via liquid product dispensing containers.

14. The method of claim 11, further comprising steps of detecting attachment of a valve, tap, cap cover or a coupler thereof at a neck of the container.

15. The method of claim 11, further comprising steps of determining a fill level of the container.

16. The method of claim 11, further comprising steps of choosing among available connection points.

17. The method of claim 11, further comprising steps of recharging or replacing a battery.

18. The method of claim 11, further comprising steps of directly accessing the liquid product contained inside the container via a sensor port.

19. The method of claim 11, further comprising steps of associating a computer processing system for processing data and executing instructions associating events that may influence transition of liquid product states as monitored liquid product dispensing containers transit across various geographic regions.

20. The method of claim 11, further comprising use of a network uplink/gateway circuit device in operation of said liquid product distribution network.

21. The method of claim 11, further comprising steps of performing marketing or sales of liquid products in the distribution network based upon data and processing within said liquid product distribution network.

22. A liquid product distribution network monitoring and reporting system, comprising:

at least one liquid product container, said at least one liquid product container comprising:

a container distribution monitoring and reporting apparatus, said container distribution monitoring and reporting apparatus comprising:

a sensing and reporting device comprising:

a housing for fitting on and attaching to the at least one liquid product container, sensing circuitry secured inside the housing for sensing at least one of physical properties and location associated with the at least one liquid product container;

a radio transmitter device comprising a low-energy consumption radio/processing module; and radio frequency signal transmission circuitry associated with said radio/processing module for transmitting encrypted radio frequency signals from the sensing and reporting device;

a battery power supply unit fitted within and protected by the housing, for electrically powering the sensing and reporting device; and a mobile communications device comprising cell radio circuitry, and configured to receive and process encrypted radiofrequency signals from the radio frequency signal transmission circuitry of the at least one liquid product container passively and without user interaction, wherein said mobile communications device further comprising memory circuitry for storing data and computer processor executable instructions relating to the at least one liquid product container and a liquid product distribution network, and further comprising computer processing circuitry for processing said data and executing said executable instructions for monitoring and reporting the physical properties and location of the at least one liquid product container within the liquid product distribution network, wherein the radio frequency signal transmission circuitry is configured to communicate with a communication processing device associated with a vehicle or transport environment within the liquid product distribution network for monitoring, controlling, and/or optimizing flow of liquid products for delivery to consumers via liquid product dispensing containers.

23. The liquid product distribution network monitoring and reporting system of claim 22, wherein the radio frequency signal transmission circuitry is configured to establish a mesh network with other radiofrequency signal transmission circuitries of other container distribution monitoring and reporting apparatuses associated with corresponding multiple containers in the liquid product distribution network monitoring and reporting system, for facilitating transmission of radiofrequency signals from sensing and reporting devices from the other radio frequency signal transmission circuitries.

24. The liquid product distribution network monitoring and reporting system of claim 22, wherein the radio frequency signal transmission circuitry is configured to communicate with the communication processing device for monitoring, controlling, and optimizing flow of liquid products for delivery to consumers via liquid product dispensing containers.

25. The liquid product distribution network monitoring and reporting system of claim 22, wherein the sensing and reporting device of the container distribution monitoring and reporting apparatus further comprises sensors for detecting attachment of a valve, tap, cap cover or a coupler thereof at a neck of the at least one liquid product container.

26. The liquid product distribution network monitoring and reporting system of claim 22, wherein the sensing and reporting device of the container distribution monitoring and reporting apparatus further comprises sensors for determining a fill level of the at least one liquid product container.

27. The liquid product distribution network monitoring and reporting system of claim 22, wherein the radio transmitter device of the sensing and reporting device of the container distribution monitoring and reporting apparatus supports more than one type of radio communication and can choose among available connection points.

28. The liquid product distribution network monitoring and reporting system of claim 22, wherein the said battery power supply unit is rechargeable or replaceable.

29. The liquid product distribution network monitoring and reporting system of claim 22, wherein the container distribution monitoring and reporting apparatus further comprises a sensor port formed in a body portion of the at least one liquid product container to allow direct access to liquid product contained inside the at least one liquid product container.

30. The liquid product distribution network monitoring and reporting system of claim 22, further comprising data and instruction for storage and executing on said computer processing system for associating events that may influence transition of container states as monitored liquid product dispensing containers transit across various geographic regions.

31. The liquid product distribution network monitoring and reporting system of claim 22, further comprising a network uplink/gateway circuit device used in the operation of said liquid product distribution network monitoring and reporting system.

32. The liquid product distribution network monitoring and reporting system of claim 22, further comprising data and processing within said liquid product distribution network for performing marketing or sales of the liquid products in the distribution network.

* * * * *